Sept. 7, 1943.   J. W. BRYCE ET AL   2,328,610
MULTIPLYING AND DIVIDING MACHINE
Filed June 10, 1938   28 Sheets-Sheet 1

Sept. 7, 1943.　　J. W. BRYCE ET AL　　2,328,610
MULTIPLYING AND DIVIDING MACHINE
Filed June 10, 1938　　28 Sheets-Sheet 2

Sept. 7, 1943.   J. W. BRYCE ET AL   2,328,610
MULTIPLYING AND DIVIDING MACHINE
Filed June 10, 1938   28 Sheets-Sheet 3

INVENTORS
James W. Bryce
Arthur H. Dickinson
BY
Cooper, Kerr & Dunham
ATTORNEYS

Sept. 7, 1943. J. W. BRYCE ET AL 2,328,610
MULTIPLYING AND DIVIDING MACHINE
Filed June 10, 1938 28 Sheets-Sheet 4

INVENTORS
James W. Bryce
Arthur H. Dickinson
BY
Cooper, Kerr & Dunham
ATTORNEYS

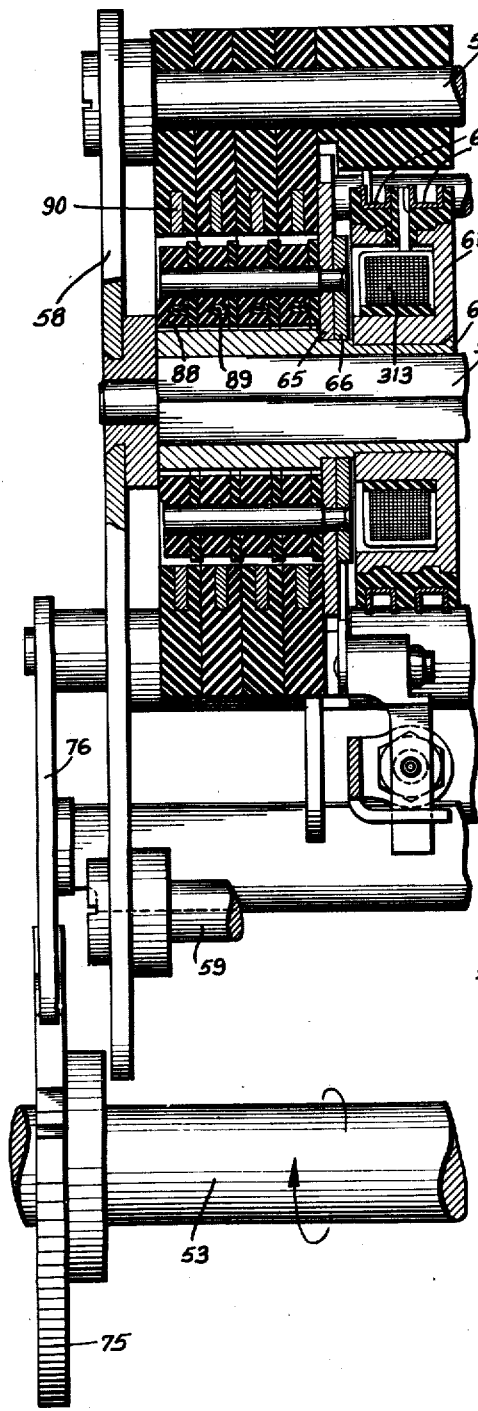
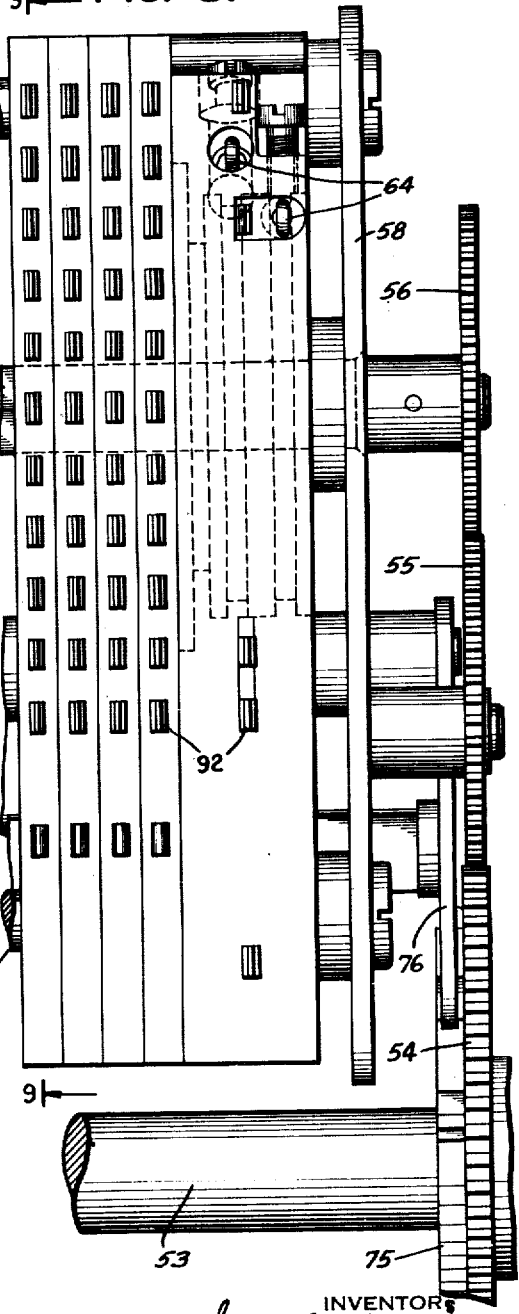

Sept. 7, 1943.  J. W. BRYCE ET AL  2,328,610
MULTIPLYING AND DIVIDING MACHINE
Filed June 10, 1938   28 Sheets-Sheet 6

James W. Bryce
Arthur H. Dickinson
INVENTORS

BY Cooper, Kerr & Dunham
ATTORNEYS

Sept. 7, 1943.   J. W. BRYCE ET AL   2,328,610
MULTIPLYING AND DIVIDING MACHINE
Filed June 10, 1938   28 Sheets-Sheet 7

INVENTORS
James W. Bryce
Arthur H. Dickinson
BY
Cooper, Kerr & Dunham
ATTORNEYS

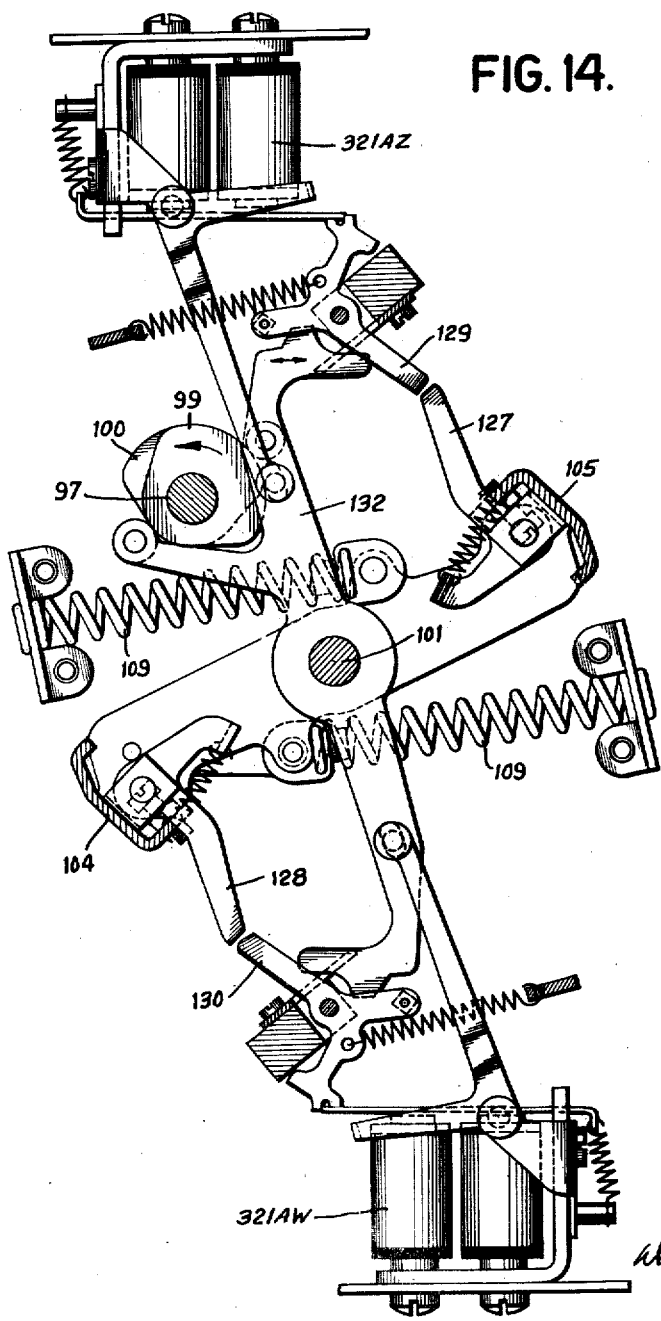

Sept. 7, 1943.  J. W. BRYCE ET AL  2,328,610
MULTIPLYING AND DIVIDING MACHINE
Filed June 10, 1938   28 Sheets-Sheet 10

INVENTORS
James W. Bryce
Arthur H. Dickinson
BY
Cooper, Kerr & Dunham
ATTORNEYS

Sept. 7, 1943. J. W. BRYCE ET AL 2,328,610
MULTIPLYING AND DIVIDING MACHINE
Filed June 10, 1938   28 Sheets-Sheet 11
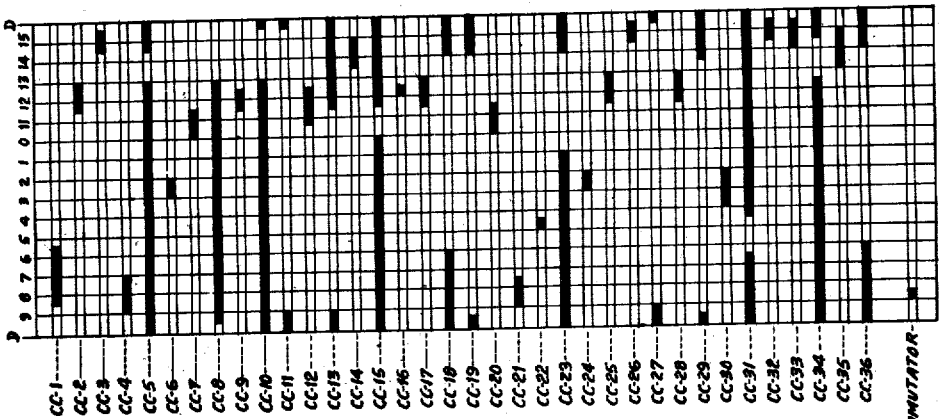
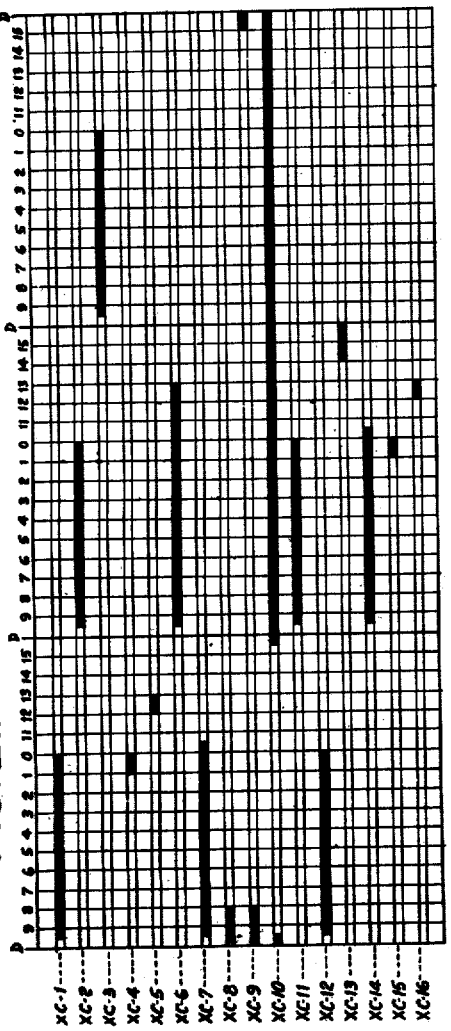
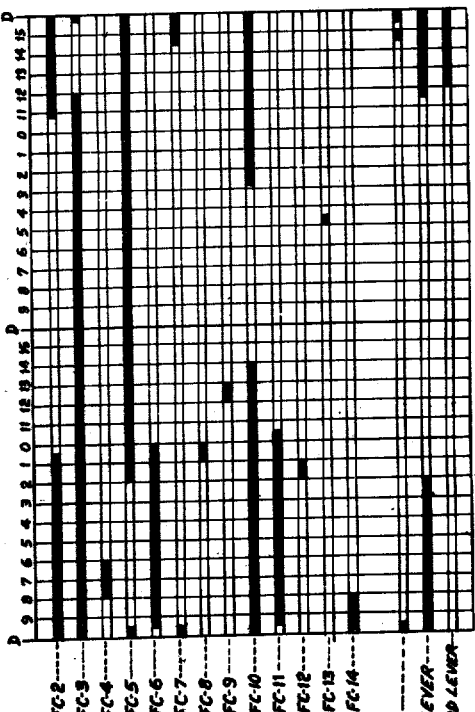

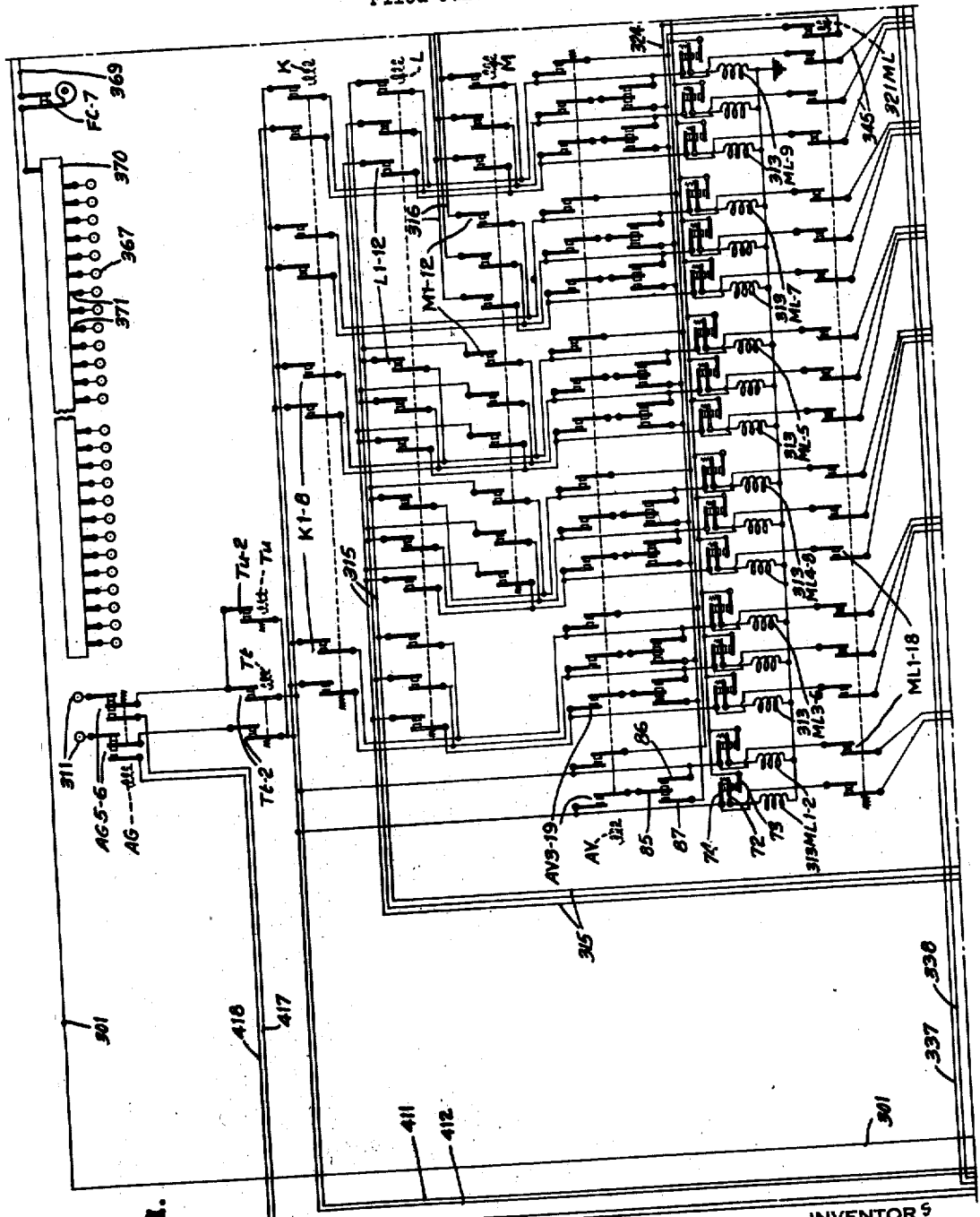

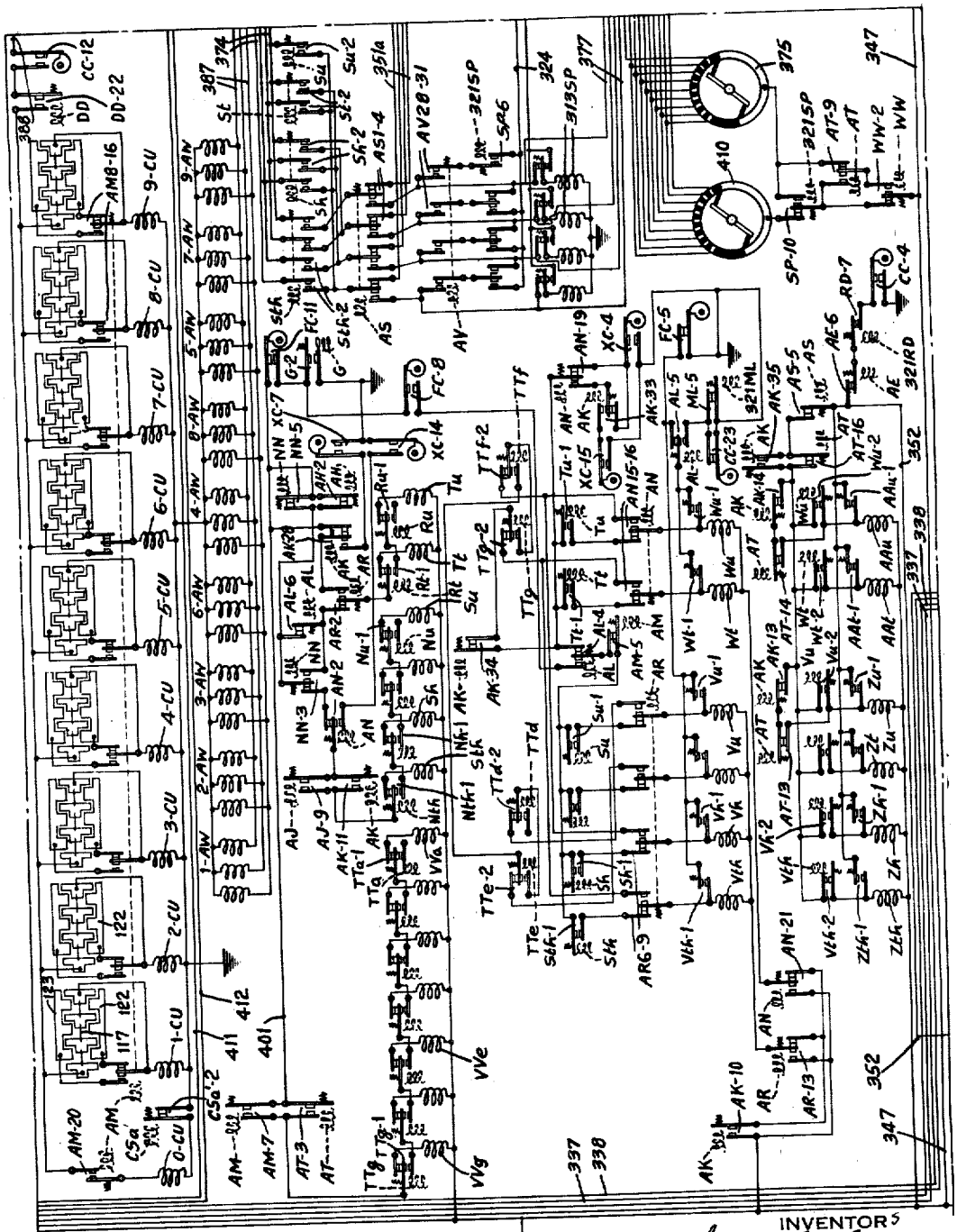

Sept. 7, 1943.  J. W. BRYCE ET AL  2,328,610
MULTIPLYING AND DIVIDING MACHINE
Filed June 10, 1938  28 Sheets-Sheet 15

INVENTORS
James W. Bryce
Arthur H. Dickinson
BY
Cooper, Kerr & Dunham
ATTORNEYS

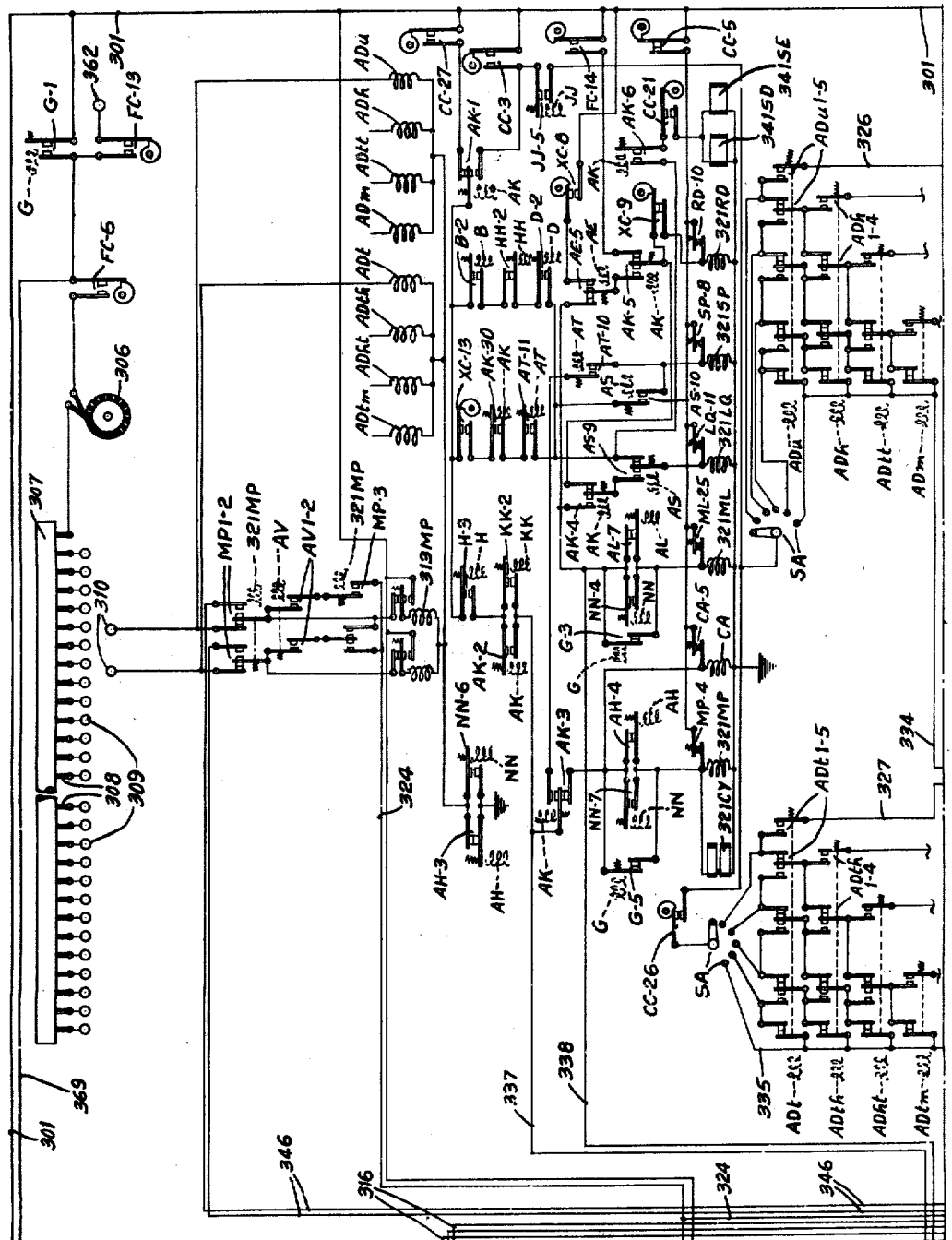

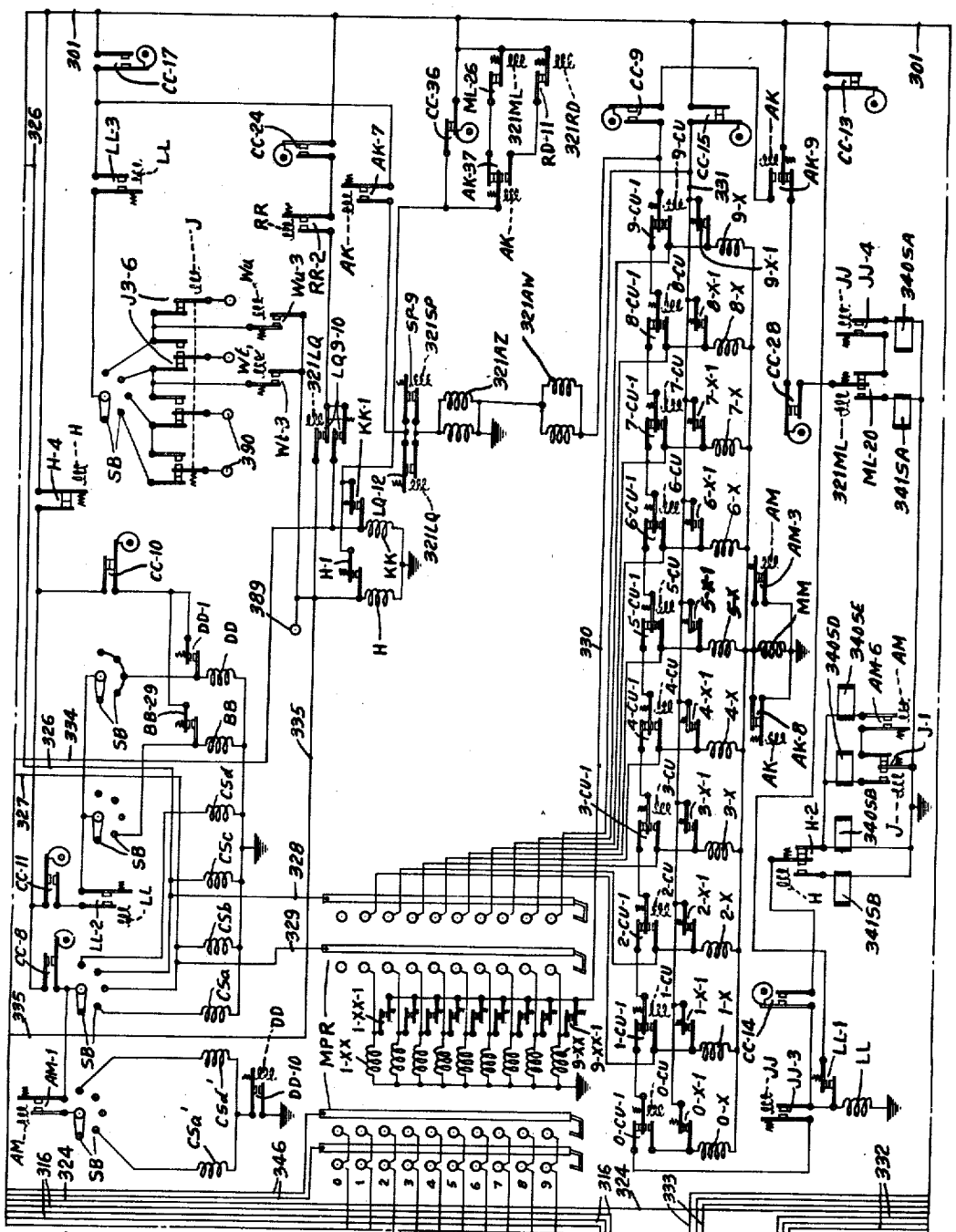

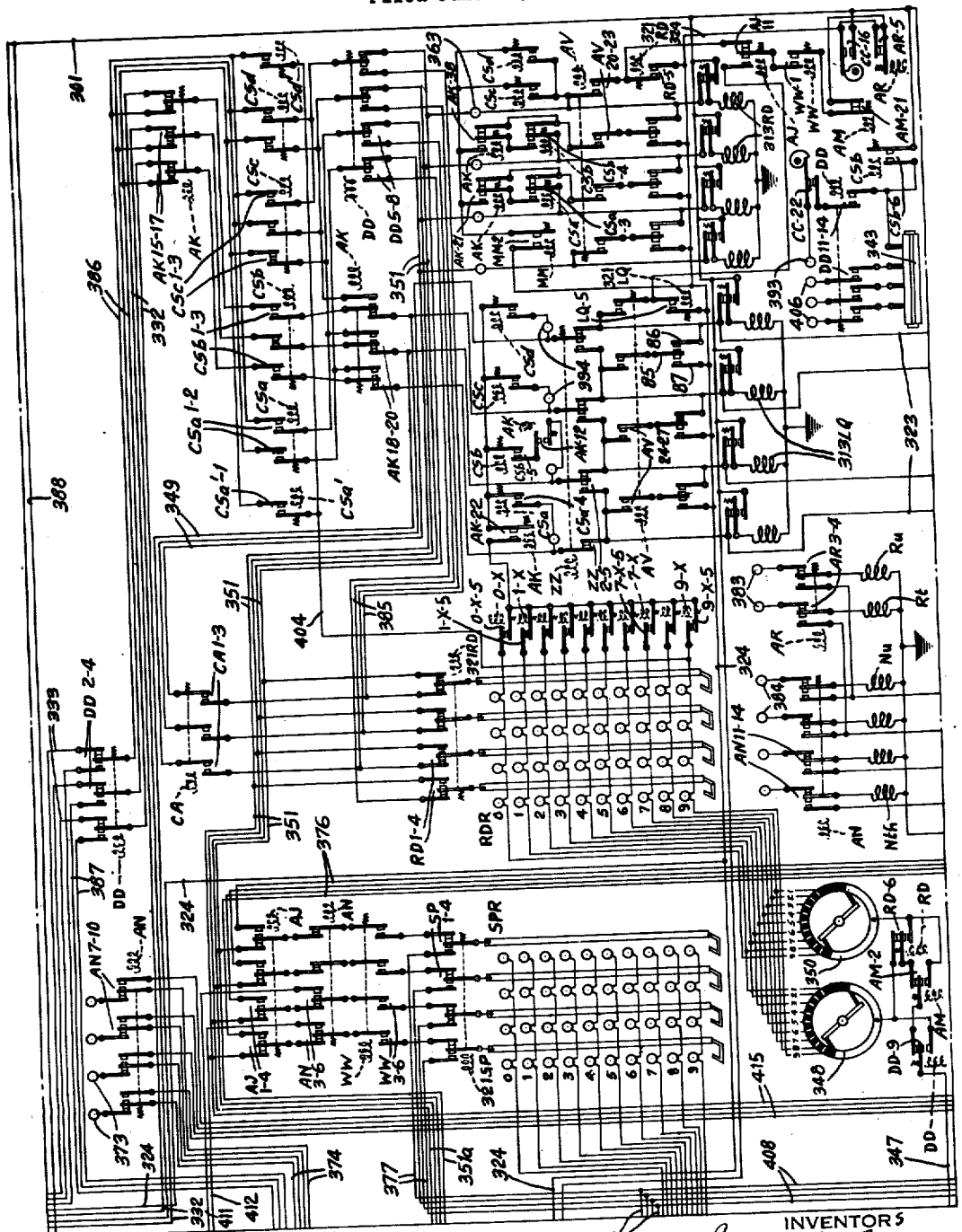

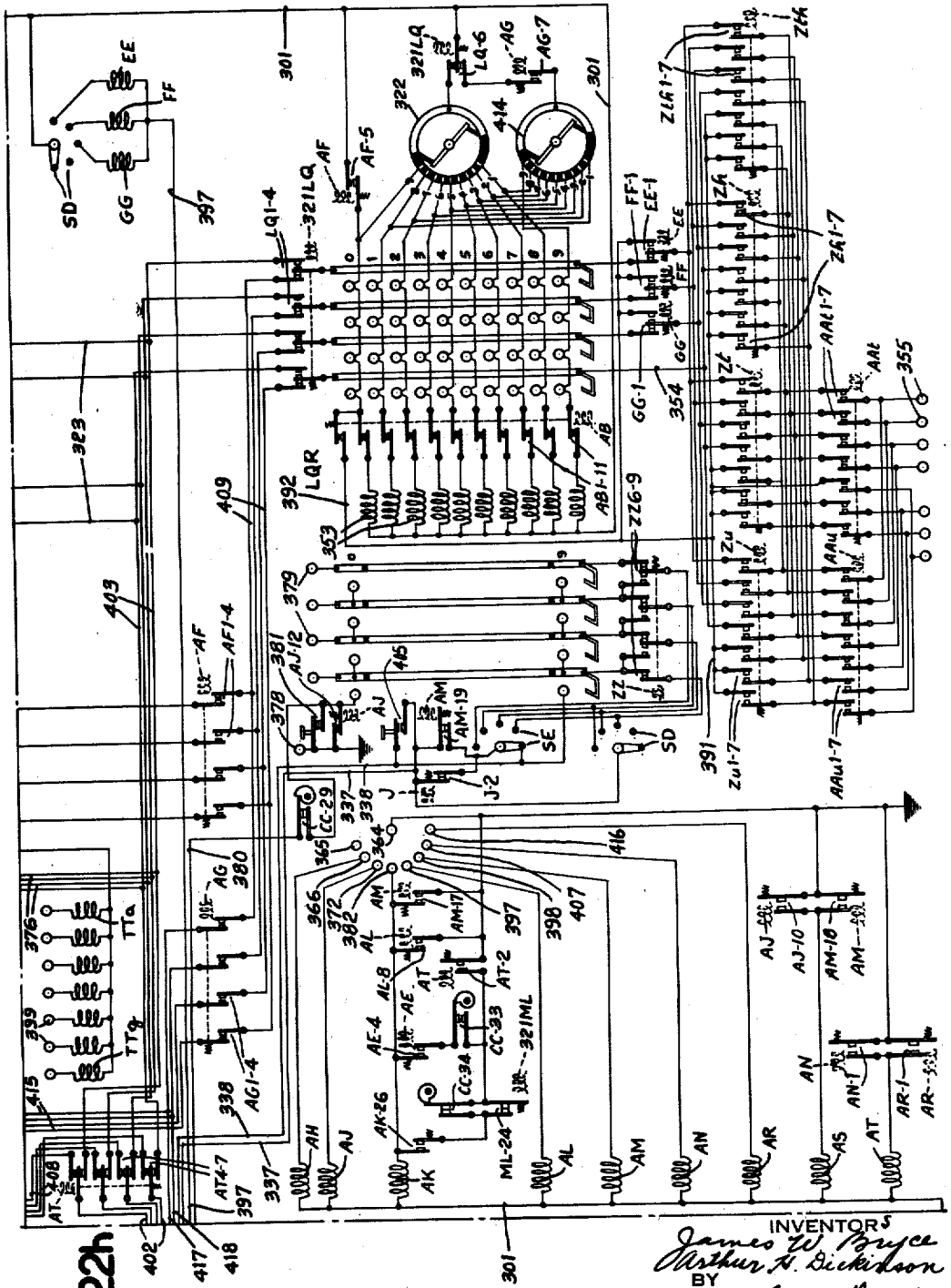

Sept. 7, 1943.    J. W. BRYCE ET AL    2,328,610
MULTIPLYING AND DIVIDING MACHINE
Filed June 10, 1938    28 Sheets-Sheet 20

INVENTORS
James W. Bryce
Arthur H. Dickinson
BY
Cooper, Kerr & Dunham
ATTORNEYS

Sept. 7, 1943.    J. W. BRYCE ET AL    2,328,610

MULTIPLYING AND DIVIDING MACHINE

Filed June 10, 1938    28 Sheets-Sheet 22

James W. Bryce
Arthur H. Dickinson
INVENTORS

BY Cooper, Kerr & Dunham
ATTORNEYS

FIG. 31. MULTIPLYING

FIG. 32. CHECKING MULTIPLYING

FIG. 33. DIVIDING

Sept. 7, 1943.  J. W. BRYCE ET AL  2,328,610
MULTIPLYING AND DIVIDING MACHINE
Filed June 10, 1938   28 Sheets-Sheet 24

CHECKING
DIVIDING
a $\dfrac{A \times B}{C}$
b $\dfrac{A}{B \times C}$

INVENTORS
James W. Bryce
Arthur H. Dickinson
BY
Cooper, Kerr & Dunham
ATTORNEYS

Sept. 7, 1943.  J. W. BRYCE ET AL  2,328,610
MULTIPLYING AND DIVIDING MACHINE
Filed June 10, 1938  28 Sheets-Sheet 25

INVENTORS
James W. Bryce
Arthur H. Dickinson

BY
Cooper, Kerr & Dunham
ATTORNEYS

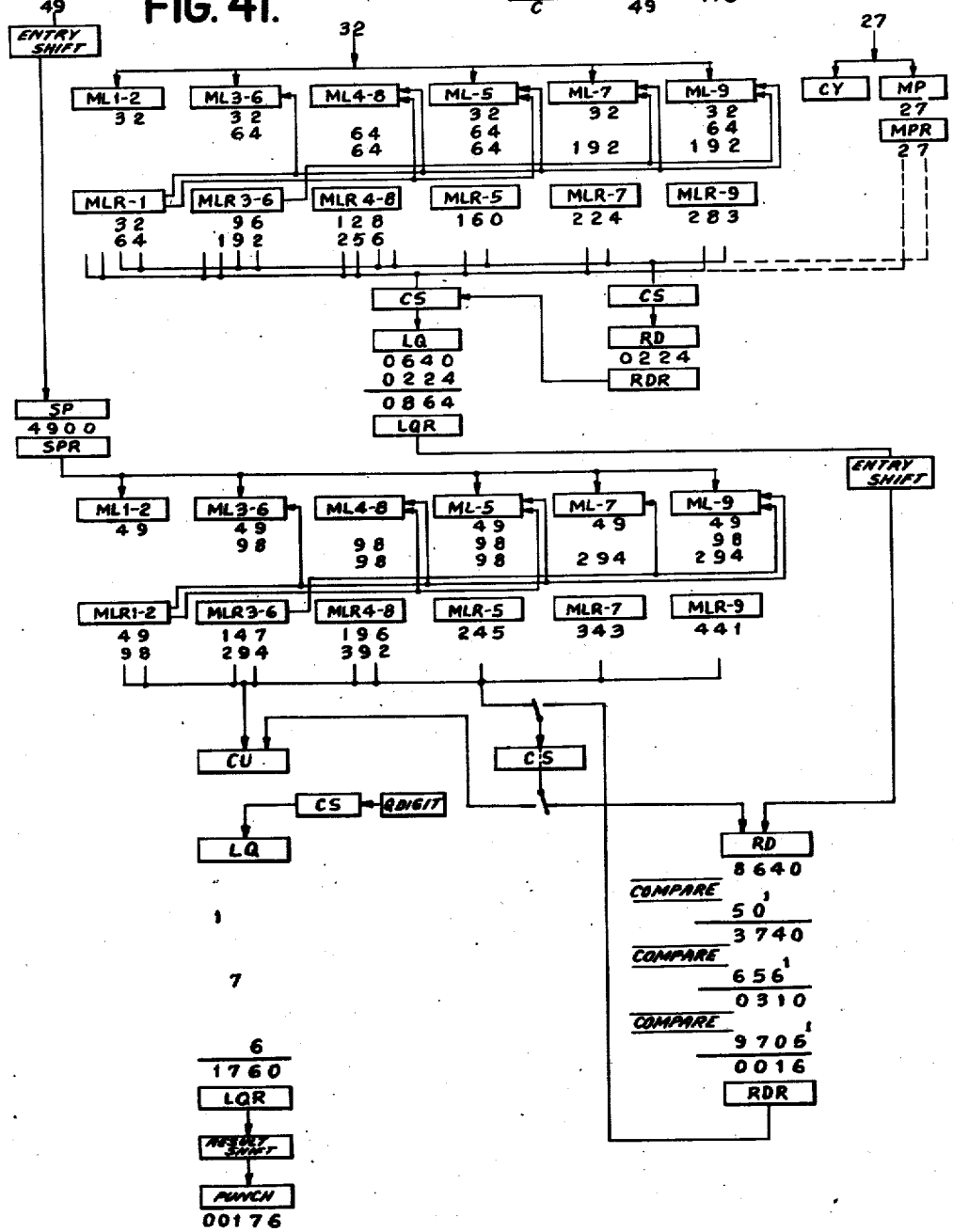

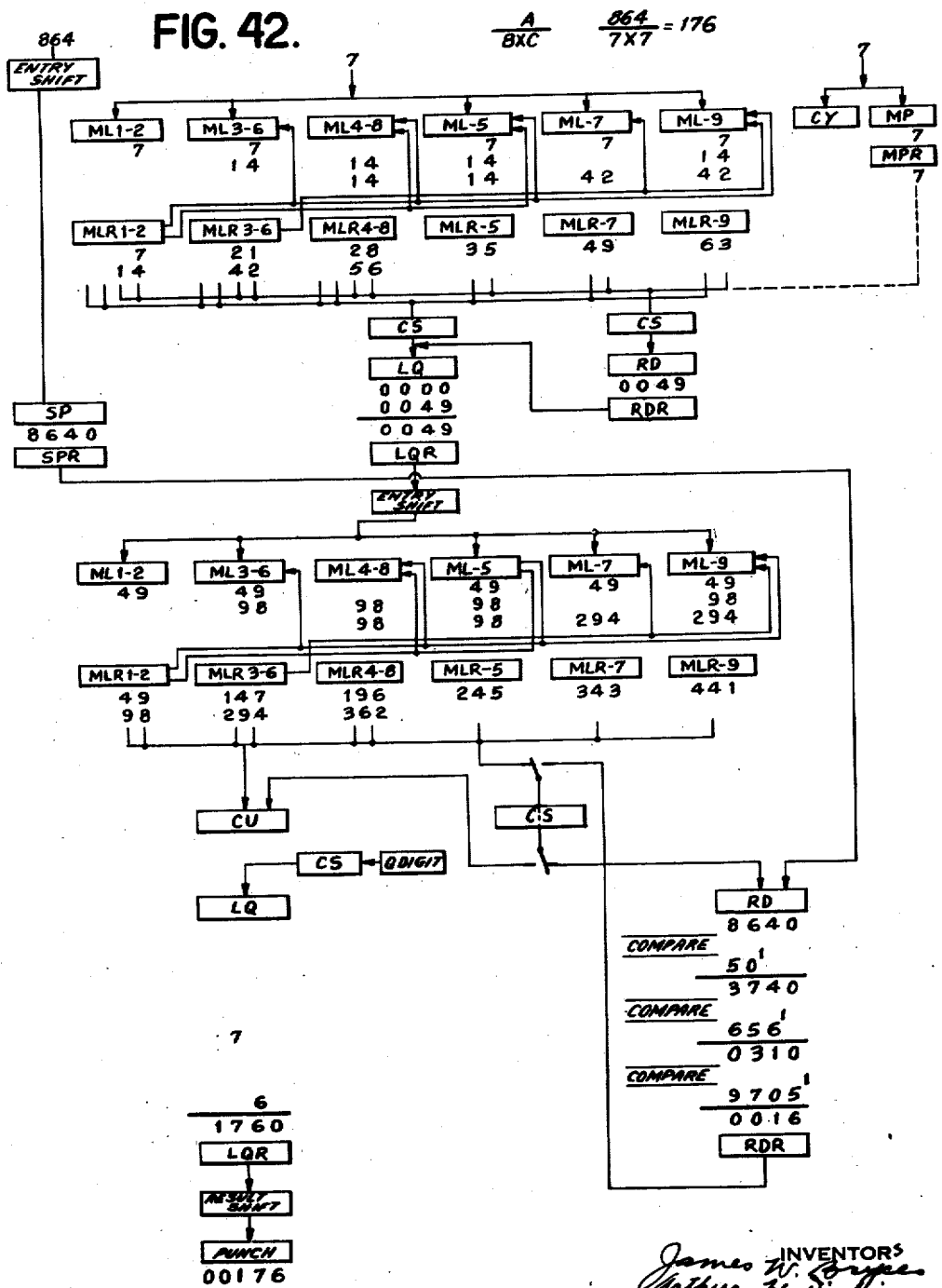

Patented Sept. 7, 1943

2,328,610

UNITED STATES PATENT OFFICE 2,328,610

MULTIPLYING AND DIVIDING MACHINE

James W. Bryce, Glen Ridge, N. J., and Arthur H. Dickinson, Bronxville, N. Y., assignors to International Business Machines Corporation, New York, N. Y., a corporation of New York Application June 10, 1938, Serial No. 213,044

19 Claims. (Cl. 235—61.7)

This invention relates to a record controlling accounting machine which is capable of effecting both multiplication and division. Before setting forth the objects of the invention, certain nomenclature will be explained.

"Regular" multiplying operations are those operations wherein the multiplier amount and a multiplicand amount is derived from each detail card, the factors multiplied and the product punched back on each detail record.

"Rate card" multiplying operations embrace those types of operations wherein the multiplier amount is derived from a master or rate card with the multiplicand amount derived from each of a plurality of detail cards which are interspersed between the rate or master cards. The multiplier amount derived from each rate card multiplies the multiplicand amount as derived from each detail card and the product is recorded on each detail card.

"Checking" multiplying operations refer to operations wherein previously computed cards are re-run through the machine and wherein product amounts are re-computed and the re-computed amounts checked with the previously recorded product amounts. Checking is individual for each card.

"Regular dividing" operations refer to computations wherein the divisor and dividend are derived from each card, the dividend divided by the divisor and the quotient result recorded on each detail card.

"Rate card dividing" operations embrace those operations wherein the divisor amount is derived from each rate or master card and the dividend amount is derived from each interspersed detail card. The quotients are computed and recorded by punching on each detail card.

"Checking dividing" operations refer to types of computations wherein previously computed cards are placed in the machine, the divisor, dividend and quotient derived therefrom, and the dividing operation checked card by card by a re-computation which is effected in a different manner, with the final checking of the re-computed quotient against the quotient derived from the card.

Special computations as hereinafter explained, refer to combined multiplying and dividing computations such as the multiplication of two factors and the division of the result by a third term or the division of a term by the product of two factors.

The present invention has for its general object the provision of a construction of machine which will have extremely high speed of operation for either multiplication or division or both and wherein the construction is such that the minimum number of working parts and units are required for attaining high speed.

A further object of the present invention resides in the provision of a construction wherein diversity of functions, results and calculations may be secured with the utilization of common operating parts.

A further object of the present invention resides in the provision of a construction which includes simple means for setting up the machine and for controlling the parts and units for performing a wide variety of kinds or types of computations.

A further object of the invention resides in the provision of a calculating machine, including automatic controls which are automatically effective upon completion of one type of calculation (e. g., multiplication) to cause the machine and its parts, units and controls to be automatically adjusted to carry out another type of calculation (e. g., division).

Subordinate to the last mentioned object, a further object of the present invention resides in the provision of a construction wherein the machine, after completing a second calculation of a combined calculation, is automatically readjusted to a status which may resume calculation pertaining to a new computation or problem and repeat the foregoing combined calculation.

A further object of the present invention resides in the provision of a record controlled calculating machine adapted to perform either multiplication or division by a calculating mechanism which utilizes a set of all the digital multiples of one of the factors, i. e., the multiplicand upon multiplication and the divisor upon division.

A further object of the present invention resides in the provision of a record controlled accounting machine with means for calculating according to the general equation $$\frac{A \times B}{C}$$

wherein terms A, B and C are derived from a common record.

A further object of the present invention resides in the provision of a record controlled calculating machine with means for calculating according to the general equation $$\frac{A}{B \times C}$$

wherein terms A, B and C are derived from a common record.

A further object of the present invention resides in the provision of a record controlled calculating machine adapted to perform rate dividing operations.

A further object of the present invention resides in the provision of a calculating machine with means manually settable by the operator and with simple controls such as a single plug connection, to enable the machine to perform at the will of the operator any selected one of the following operations:

Regular rate or checking multiplying operations; regular rate or checking dividing operations; or either of two special combined calculations which include both multiplication and division.

A further object of the present invention resides in the provision of a dividing machine of the type which effects division by comparing the different digital multiples of the divisor, which are available upon storage means therefor, successively with successive comparison portions of the dividend in a dividend receiving device, wherein a plurality of comparing units are provided which retain a setup of all the different multiples during comparing and deducting operations.

A further object of the present invention resides in the provision of improved place limiting mechanism and simplified controls therefor.

A further object of the present invention resides in the provision of a place limiting mechanism which controls the machine operation automatically in accordance with the size of the divisor amount, the size of such amount being automatically detected.

Subordinate to the last mentioned object, the present invention also has for its object the provision of a combined automatic and manually set place limiting mechanism wherein the automatic place limiting mechanism supercedes and takes control from the manually set mechanism in the event that the latter is adjusted for computations which exceed the columnar capacity of the machine or in the event that the latter is not set.

A further object of the present invention resides in the provision of a record controlled calculating machine adapted for either multiplication or division, and/or both, of terms derived from each of a succession of records wherein common calculating and result receiving mechanism is employed for either division or multiplication and which common mechanism is selectively associated with the special mechanisms and controls which are required for one or the other of the kinds of calculations. Shiftable interrelating means are provided which may be easily set by the operator or which may be brought into operation automatically when the machine is set for calculations which involve both multiplication and division.

A further object of the present invention resides in the provision of a machine with improved cycle controller features.

A further object of the present invention resides in the provision of controls for calculating machines including special controls and controls common to both special controls which are brought into operation when either of the special controls is effective.

In the drawings:

Figures 1 and 1a, taken together with Fig. 1a to the right of Fig. 1, show the somewhat diagrammatic view of the various units of the machine and the drive therefor;

Fig. 7 is another fragmentary sectional view of the accumulator unit of Fig. 2, the view being taken substantially along line 7—7 of Fig. 2 looking in the direction of the arrows. This view in particular shows the readout structure in cross-section;

Fig. 8 is an elevational outside rear view of the accumulator unit of Fig. 2, the view being taken from the left of Fig. 2, looking to the right;

Fig. 11 is a somewhat diagrammatic view showing the card handling and sensing section of the machine. The card handling section is shown diagrammatically in Fig. 1a;

Fig. 14 is another detail sectional view of certain parts of the comparing unit, the section being taken substantially on line 14—14 of Fig. 12, looking in the direction of the arrows;

Fig. 19 is a cam timing diagram showing the timing of the various CC cams;

Fig. 20 is a cam timing diagram of the FC cams; and

Fig. 21 is a cam timing diagram of the XC cams;

Figs. 22a, 22b, 22c, 22d, 22e, 22f, 22g and 22h, taken together, show the complete circuit diagram of the machine. In arranging these figures, Figs. 22a to 22d are arranged vertically in the order named with Fig. 22a at the top. Figs. 22e to 22h are also arranged vertically in the order named with Fig. 22e at the top and such figures are placed to the right of Figs. 22a to 22d respectively.

Figs. 23 to 30 inclusive, show the plugging on the insertible plugboard for different calculations which the machine is adapted to perform. Accompanying each figure is a suitable descriptive legend designating the computation for which the plugboard is plugged;

Figs. 31 to 36 inclusive, are sequence of operation diagrams for different typical calculations which the machine is adapted to perform. These diagrams show the successive cycles of operation for these different computations. The respective diagrams also bear suitable designating legends indicating the type of computation to which the diagram relates;

Figs. 37 to 42 inclusive, show flow diagrams of typical computations as performed by the machine. These show illustrative problems and the manner of effecting entry into the various receiving devices and how the machine performs different typical computations. Each diagram is accompanied by a designating legend giving the particular calculation which is illustrated in the diagram.

Machine drive

Figure 1:
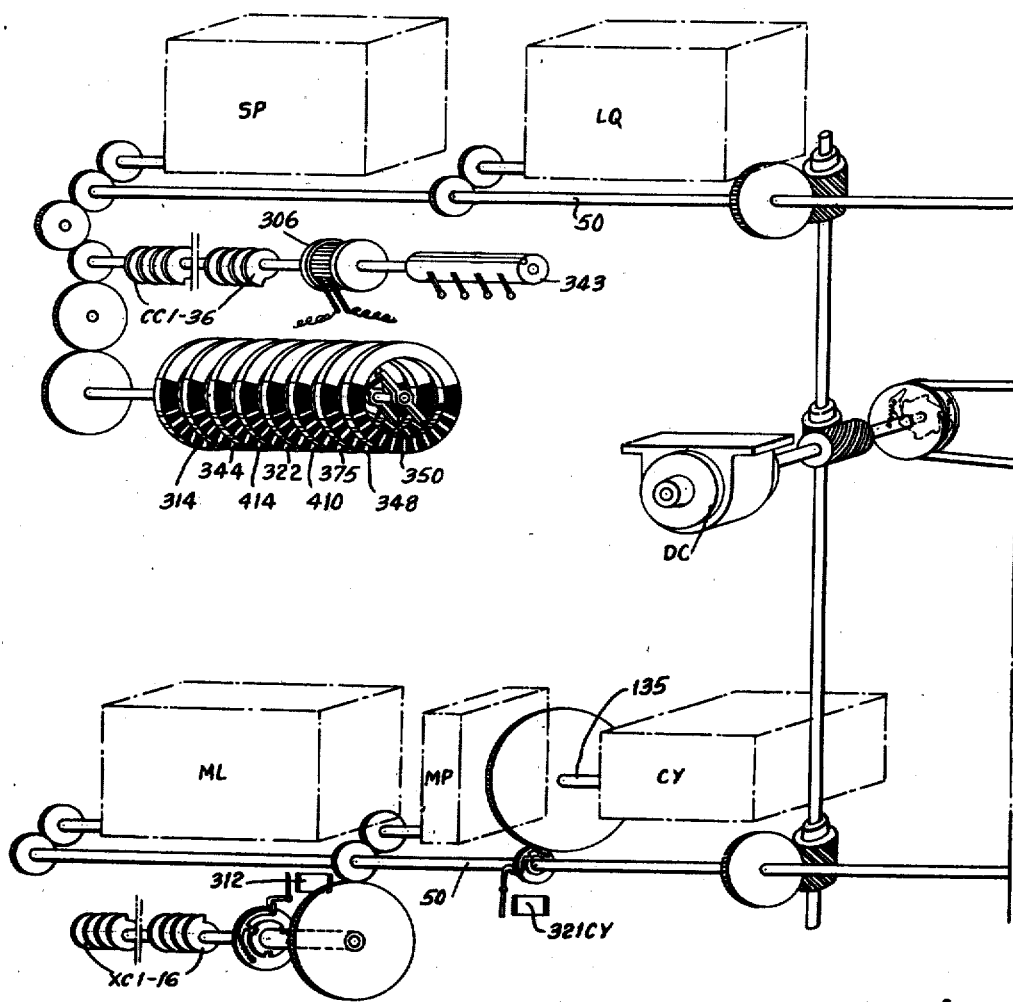
Figure 1A:
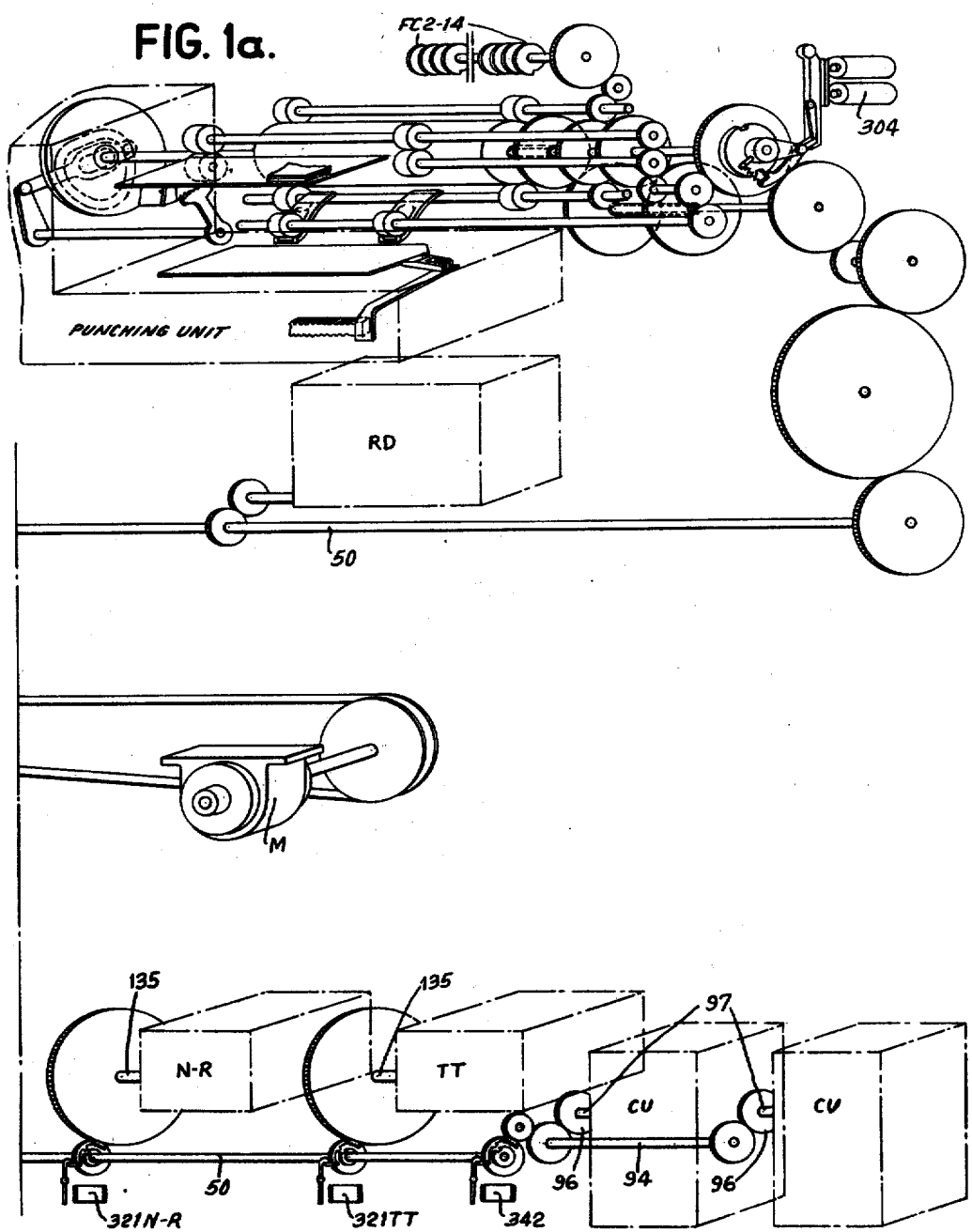
Figure 2:
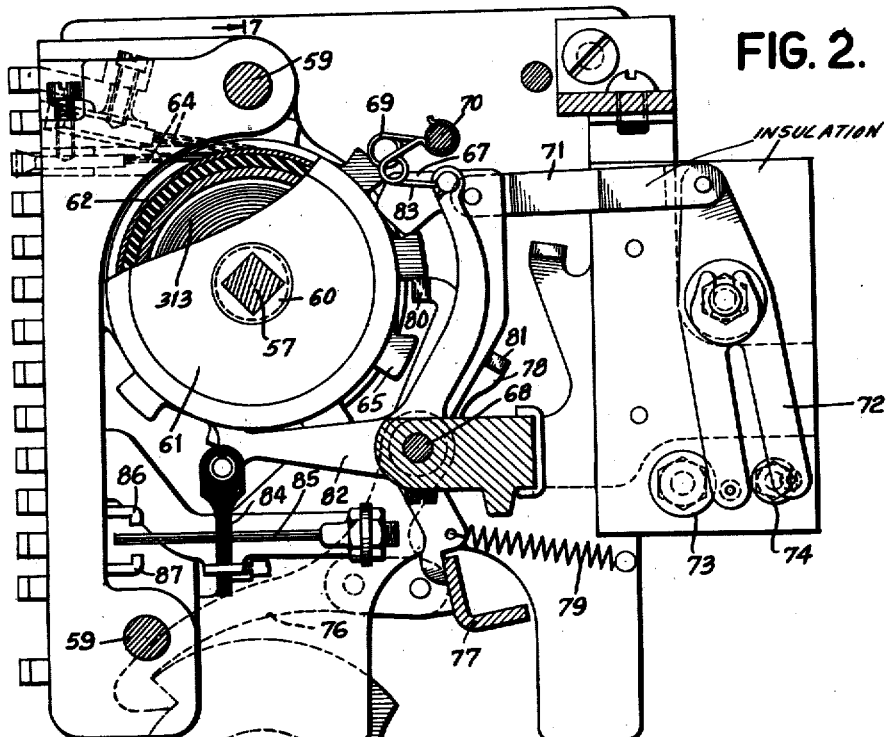
Fig. 2 is a detail sectional view of the accumulator taken along the dividing line between two adjacent denominational orders of such accumulator or entry receiving devices.

Referring first to Figs. 1 and 1a, in general the machine comprises five accumulating units which are respectively designated SP, LQ, RD, ML and MP. It may be explained that the unit ML contains accumulators and readouts from which all of the nine digital multiples of the divisor or multiplicand can be derived depending upon whether the machine is used for division or multiplication. The MP receiving device receives the multiplier upon entry in multiplying calculations. Such unit is not utilized on dividing. The accumulating units LQ and RD receive components of the products upon multiplication with the final product formed in LQ and on division LQ receives the quotient amount and RD the dividend. The SP unit is utilized on checking computations. This unit is also utilized on special computations which involve both multiplication and division. The various accumulating units are driven by the gearing delineated from the driving motor M. The machine is also provided with a direct current generator DC. The card handling and feeding section of the machine is of customary form like that shown in Daly Patent No. 2,045,437 and is driven in the usual manner. The FC cam contacts are also driven in the customary manner in synchronism with the drive of the card handling section of the machine. The units designated CY, N—R and TT are electromechanical relay setup units of the general construction shown in Figs. 16 and 17. Each of these units is adapted for reset from the constantly running drive shaft by the customary one revolution clutch arrangement. The reset magnets for the units are respectively designated 321CY, 321N—R and 321TT. The comparing units are shown diagrammatically at CU—CU. These comparing units are of the form shown in Figs. 12 to 15 inclusive and such units are adapted to be driven from the drive shaft by the use of the well known one revolution clutch, the clutch magnet being designated 342.

Also driven from the main drive shaft are the usual CC cams, designated CC1—36, and an impulse distributor 306, a constantly running commutator 343 and in addition there are also provided eight impulse emitters which are designated 314, 344, 414, 322, 410, 375, 348 and 350.

Referring now to the XC1—16 cam contacts, such cam contacts are driven from the drive shaft through a one revolution clutch which is controlled by magnet 312. The driven side of the one revolution clutch receives its drive from the main drive shaft through the gearing shown, which drives one of the XC1—16 cams one revolution for each three revolutions of the main drive shaft.

For clarity and susbequent description, the upper and lower drive shafts will be given a like reference numeral 50.

Accumulators and entry receiving devices

As stated, the SP, LQ, RD, ML and MP units are accumulators of electromechanical type. These accumulators are identical in construction except for the number of readout sections, some accumulators having four readout sections and others having two. The accumulator which is here employed may be of various types known in the art, more particularly the type of accumulator having electrical transfer and electrical reset. Suitable accumulators of this type are shown and described in United States Patent No. 1,834,767 and suitable readout structure may be that shown in United States Patent No. 2,062,117 employing the electric reset of Patent No. 1,834,767, modified as per British Patent No. 422,135.

The present invention involves transfer total arrangements according to British Patent No. 422,135.

While the aforesaid accumulators are of suitable type for use with the present invention, preferably a preferred accumulator is of the form illustrated and described in Lake and Pfaff Patent No. 2,232,006, dated February 18, 1941. This accumulator will now be briefly described.

In lieu of driving the accumulator by the customary jaw clutch, the present accumulator which is shown in Figs. 2 to 10 inclusive, is of the form in which a magnetic clutch is used for driving the accumulator element. Suitable circuit making and breaking devices are provided to enable the differential clutch action to take place at a differential time of the cycle depending upon the time of sensing. These devices cause the magnetic clutch to remain in action until a definite point in the cycle whereby definite amounts of rotation of the accumulating wheel are obtained in accordance with the initiating differential impulse.

Figure 10:
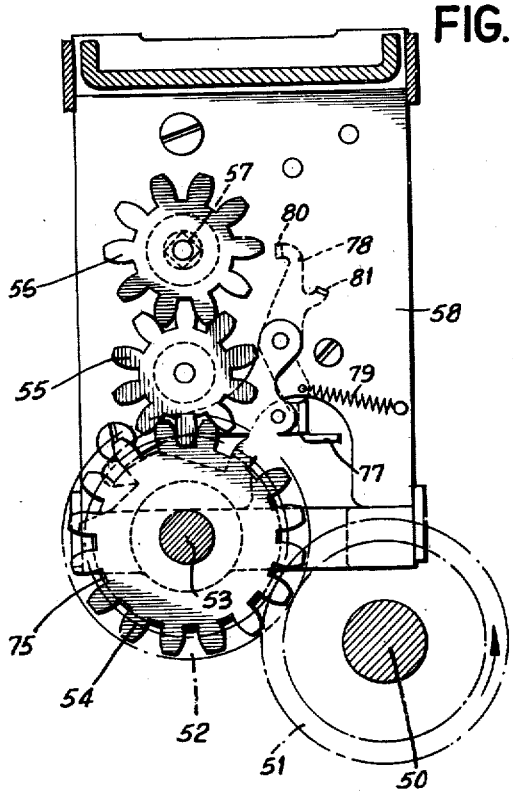
Fig. 10 is an outside view of the accumulator, viz. the view taken from the right of Fig. 8 and looking to the left and which view shows the gear drive for the accumulator unit.
Figure 9:
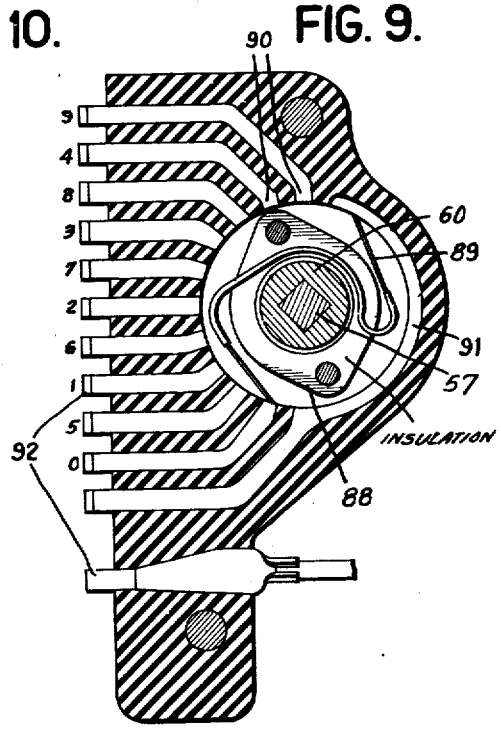
Fig. 9 is a detail view of the readout commutators and wiring to the plug prongs, the section is taken substantially on line 9—9 of Fig. 8.

Referring to Fig. 10, 50 is the drive shaft which is in constant rotation. This drive shaft through suitable gears such as 51 and 52 drives an accumulator drive shaft 53. Shaft 53 carries a gear 54 which through an idler 55 drives a gear 56 carried by a square shaft 57 which is thus also in constant rotation. The shaft 57 is suitably supported in bearings carried in the side plates 58 of the accumulating unit. Between the side plates are suitable spacing cross bars 59 (see Figs. 2 and 7), holding the plates in spaced relationship and aiding in the support of the accumulator mechanism. The accumulator units may be made in any desired number of orders. On the square driving shaft is a fitted bushing 60 (see Figs. 7 and 9). Around this bushing 60 there is rigidly secured a magnet yoke 61.

Carried about the periphery of yoke 61 and insulated therefrom and from each other there are a pair of channel shaped collector rings 62 to each of which is connected one end of a magnet winding 63 secured and positioned within the yoke. Trailing against each ring 62 there is a brush 64 which is carried in a suitable brush holder. The yoke with its winding rings constitute the driving element of the accumulator clutch whose driven elements include the toothed wheel 65 and tens carry cam 66. The wheel and cam are riveted together as indicated in Fig. 7 and the rivet fastenings also afford driving means for the readout brush holders. Such parts are mounted for free rotation on the bushing 60. As shown there is a slight air gap between the end of the yoke 61 and the carry cam 66. Wheel 65 is provided with ten teeth (see Figs. 3 and 4), between two of which when the wheel is at rest there extends the nose of a lever 67. Such lever is freely pivoted on a rod 68. Such lever is held in the position shown in Figs. 2 and 4 by a looped wire spring 69 connected at one end to a rod 70 and its other end to a pin in the nose of lever 67. The spring 69 and the lever 67 form a toggle with the pin urging the nose in contact with the wheel 65. When the clutch magnet winding is energized, the wheel 65 and the cam member 66 are magnetically clutched to the yoke 61 and commences to rotate therewith.

Figure 3:
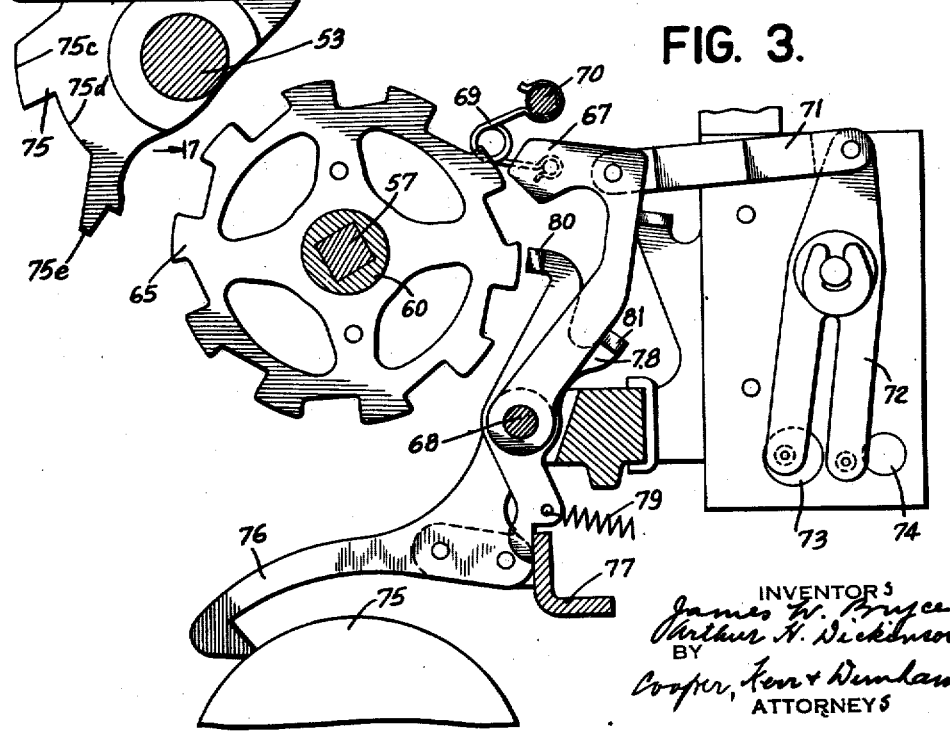
Fig. 3 shows certain parts of Fig. 2 in a different position.

Energization of the clutch magnet is afforded by the usual differentially timed impulse which may be received from the sensing section of the machine or from other controls affording an initiating timed impulse. As the wheel 65 commences to turn the edge of one of its teeth bears against the upper inclined edge of the nose on lever 67 and cams the lever clockwise as viewed in Fig. 2 about its pivot 68 carrying the lower end of the spring 69 to the right of a line between centers 68 and 70. This position of the parts is shown in Fig. 3. The parts will remain in such position until wheel 65 is again disengaged from the driver. Lever 67 when rocked by a tooth shifts an insulated link 71 shifting a contact member 72 to the position shown in Fig. 3. When in this position a circuit is completed through the forked member and a contact spot 73. This establishes a holding circuit to maintain the clutch magnet energized.

It may be mentioned that before shifting, an arm of member 72 was establishing contact with a contact point 74. The arrangement is such that a make before break action occurs as the lever shifted. It will be understood that the clutch magnet is energized at a differential time and that the amount that the wheel 65 is rotated is dependent upon the differential time of receiving an impulse. De-clutching action at a fixed time in the cycle is brought about as follows: On shaft 53 there is a cam 75 with which a follower 76 cooperates. The follower is integral with a bail 77 which extends across a plurality of units of different denominational orders. For each order there is a lever 78 pivoted on rod 68 and having a lower tail portion bearing against the bail 77 (see Figs. 2, 3 and 4). Each lever is provided with a spring 79 which urges the follower 76 against its cam 75. Each lever 78 has lateral extensions 80 and 81, the former lying in the plane of the wheel 65 and the latter extending behind lever 67.

Figure 4:
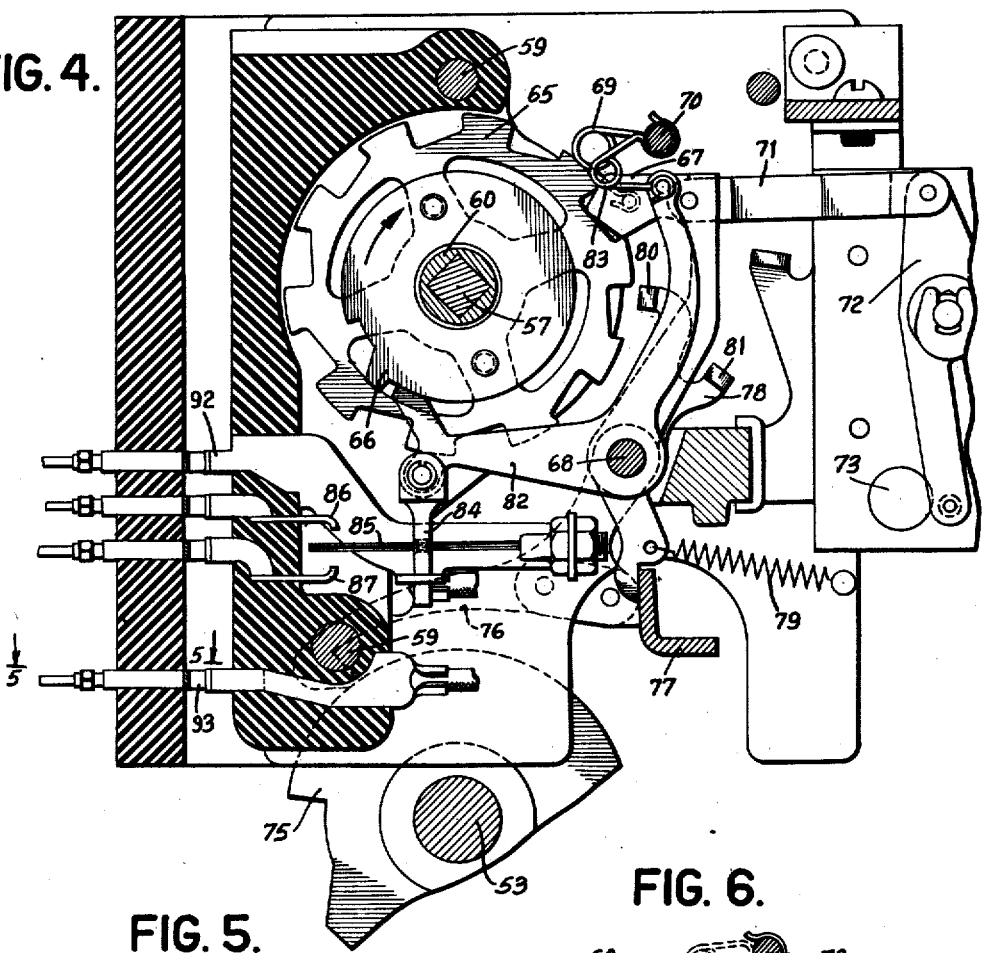
Fig. 4 is another sectional view of one of the accumulator units, the view being generally similar to Fig. 2, but taken on a somewhat different vertical plane.
Figure 5:
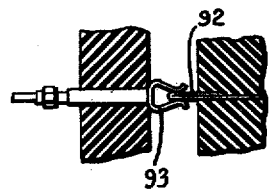
Fig. 5 is a detail view taken substantially along line 5—5 of Fig. 4.
Figure 6:
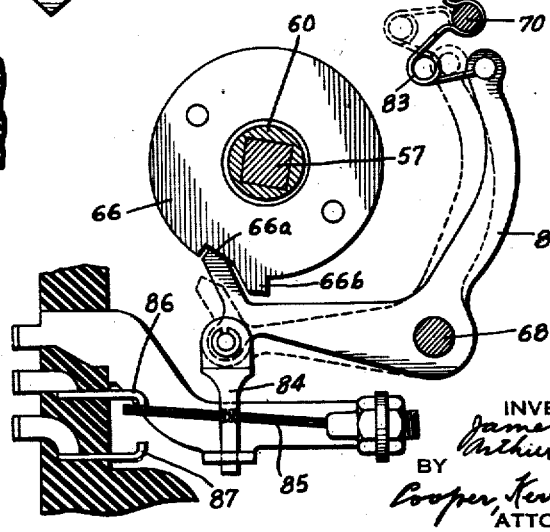
Fig. 6 is a detail view of the tens transfer or carry cam and related parts.

The operation is such that during the entering period of the cycle the follower 76 rides on the intermediate concentric portion of cam 75 holding bail 77 and through it the lever 78 in the position shown in Figs. 3 and 4. At the zero index point in the cycle the follower 76 drops off the cam and the bail 77 allows the lever 78 to rock rapidly in a counterclockwise direction bringing projection 80 into the space between two of the teeth of the wheel 65. At the same time projection 81 engages the lever 67 swinging it back from the position of Fig.3 to that of Fig. 2 thus causing the holding circuit of the clutch magnet to be broken. It may be mentioned that the clutch magnet circuit is established by the member 73 and is broken when 72 moves off this contact.

When the clutch magnet circuit is interrupted projection 80 will engage the leading edge of a tooth on the wheel 65 and positively interrupt further rotation of the now released accumulating wheel. At the same time the trailing edge of the engaged tooth is overlapped by the nose of the lever 67 to prevent retrograde movement of the parts. Continued rotation of the cam 75 will, through portion 75c thereof, again release wheel 65 for a possible tens carry operation and portion 75d will again interrupt the wheel after a single step of movement. Finally the highest portion 75e of cam 75 will cause lever 76 to rock an additional amount in a clockwise direction to restore the tens carry lever 82, if the same had previously been rocked counterclockwise by the carry devices now to be described.

*Carry mechanism*

Carry cam 66 (Fig. 6) is provided with a notch 66a and a rise 66b. The carry lever 82 pivoted at 68 has its nose held against the carry cam by means of a looped spring 83, which urges the carry lever 82 clockwise. The lever 82 carries an insulating depending member 84 through which the brush 85 extends to make contact with either of contacts 86 or 87. Normally the parts occupy the relation of Fig. 4 with the brush lying intermediate the contacts. When the wheel 65 has been advanced to a "9" position, cam 66 is in the position shown in Fig. 6, wherein the nose of the lever 82 is in the notch 66a, thereby affording contact between brush 85 and contact 86. When the wheel 65 passes through "0" rise 66b on cam 66 will rock the lever 82 to its dotted line position in which position spring 83 will now hold it since the point connection between the spring 83 and the lever 82 is now to the left of the line between centers 70 and 68. As a result the brush 85 is shifted to engage contact 87 and will remain in such position until after the carry portion of the cycle when the high portion 75e of cam 75 will cause lever 76 to rock lever 82 back to the position of Fig. 4.

*Readout structure*

Attached to each accumulator wheel is the readout mechanism. It will be understood that any desired number of brush sections can be provided driven by a single accumulating wheel 65 (see Fig. 7). According to the present invention in some instances four brush structures are driven by a single accumulator wheel and in other instances two brush structures are driven by a single wheel. Fig. 7 shows the four brush structure arrangement. Such structure comprises a holder 88 of insulating material having a wire brush 89 fitted within a groove in the holder. The groove it will be understood conforms with the general shape of the center part of the brush. In the plane of each brush 88 there are commutator segments 90 and a common arcuate segment 91. Each brush 89 serves to make electrical connection between the related common segment 91 and each of the segments 90 according to the position of the brush upon advance of the accumulating wheel 65. Since the wheel 65 has ten teeth, it moves a tenth of a revolution for each unit entered. Segments 90 are spaced one-twentieth of 360 degrees apart so that the brush 89 stops at the segments in the order in which they are numbered in Fig. 9. In the position shown zero segment 90 is connected with the common segment 91.

The segments 90 and 91 as well as the circuit to the carry brush 85 terminate in beveled contacts 92 (see also Fig. 5) so that ready connection can be made to the unit by means of the bifurcated blades 93.

*Comparing units*

The comparing units of the present machine are of the form more fully described in the copending United States application of Ralph E. Page, Serial No. 117,493, filed December 24, 1936. As shown in Fig. 1a, two comparing units are illustrated, each designated CU. These comparing units receive their drive through the one revolution clutch 342 from the drive shaft 50. Upon energization of the clutch magnet 342 the shafting and gearing generally designated 94 is caused to rotate through one complete revolution. It may be explained that for dividing calculations the comparing unit drive is maintained in constant motion. Such comparing unit is wholly disconnected upon multiplying calculations.

Figure 13:
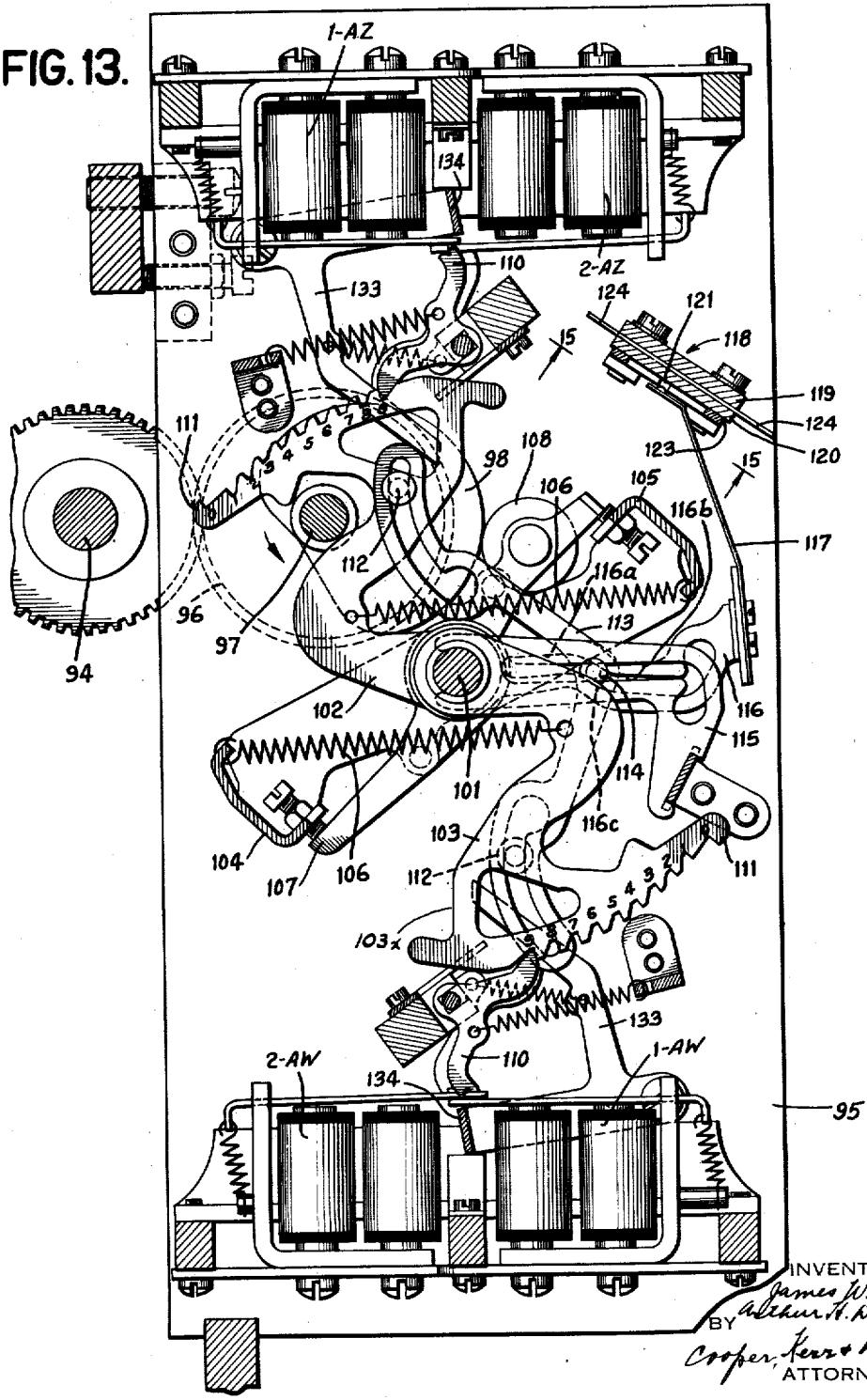
Fig. 13 is a detail sectional view of the parts for one order of a comparing unit, the section being taken along line 13—13 of Fig. 12.

Comparing units will now be more specifically described. Each comparing unit comprises supporting side plates 95 which are secured together by suitable cross members which also afford support for various parts such as magnets, bails and springs. Each comparing unit is provided with a drive gear 96 (see Figs. 12 and 1a). Such gear 96 is fast to the comparing unit drive shaft 97 (see also Figs. 12, 13 and 14). Each shaft 97 has secured to it a pair of bail operating cams 98 and a pair of restoring cams 99 and 100. Suitably secured in the side plates is a cross-shaft 101 on which are pivotally mounted in interspaced relation two series of sectors, one of which is designated 102 and the other of which is designated 103 in Fig. 13. It will be understood that there is a pair of such sectors 102 and 103 for each denominational order in which comparison is to be effected. The sectors are adapted for pivotal rocking movement on the supporting shaft 101 and timed rocking movement is imparted to the sectors by bails 104 and 105 which bails are each connected to their respective sectors by springs 106. The bail 104 projects through the planes of the sectors 132 and is connected to the sector by means of the springs 106 which tend to hold the surfaces 103x of the sectors in abutting engagement with the bail 104. Similar abutting engagement is provided for between sectors 102 and bail 105. In Fig. 13 the sectors are shown arrested and the bails have moved away from the sectors. Initially and during the bail and sector movement until the sectors are arrested by the stop pawls the sectors abut and maintain contact with the bails. This mechanism is more fully described in British Patent No. 523,652.

Rocking movement is imparted to the bails by bail actuating levers 107 (one of which only is shown in Fig. 13). Each of such levers carries a cam follower roller 108 which cooperates with a cam 98. The cam follower rollers 108 are maintained in cooperation with cams 98 by means of springs 109 which are attached to the bail arms and to a fixed support as shown in Fig. 14. Differential movement of the sectors is determined by magnetically tripped stop pawls 110 (see Fig. 13). Such stop pawls are normally latched by their related magnet armatures out of the path of the ratchet teeth on the sectors. The comparing magnets are generally designated AW and AZ. It will be understood that the AZ magnets control the related upper sets of sectors 102 and the lower comparing magnets AW control the movement of the lower sectors 103. For compactness of construction the magnets are disposed in a somewhat staggered relation, which will be apparent by inspection of Fig. 12. In Fig. 13, the two lower comparing magnets 2—AW and 1—AW are adapted to control two adjacent sectors one of which is behind the other.

Upon energization of a comparing magnet such as 1—AW at a differential time its armature will release the stop pawl 110 which will swing under the influence of its spring to engage the sector ratchet and differentially stop it in a position corresponding to the differential time at which an impulse is received to energize the comparing magnet. In Fig. 13 the sector 103 is shown as stopped at the "9" index point position and likewise the sector 102 is also shown stopped at the "9" index point position. In the event that there is no energization of a comparing magnet the stop pawl 110 will stop its related sector at the "0" index point position due to the high shoulder 111 beyond the zero position.

Each sector 102 and 103 carries a pin 112 and each of these pins extends through slots in a differentially floating link 113. Each differential link has a pin 114 carried thereby and extending therethrough. Each such pin 114 is slidably guided for in and out movement with respect to the shaft 101 by means of a slotted member 115. Also cooperating with each pin 114 is a member 116. Member 116 has a cam slot portion 116a comprising a straight portion, another straight portion 116b and a connecting sloping portion 116c. The relation of parts is such that if sector 103 has the same setting as sector 102, for example at the "9" index point position as shown in Fig. 13, the pin 114 will remain at the center in the sloping cam portion 116c. Under this condition there will be no movement of the arm 116. On the other hand when pin 114 is caused to move to the right as is the case when sector 102 moves to a greater extent than sector 103, then member 116 will be rocked upwardly or counterclockwise about 101 as a pivot. This counterclockwise movement of 116 occurs when the amount set in sector 102 is less than the amount set in sector 103. On the other hand when the amount set in sector 102 is greater than the amount set in sector 103, the pin 114 will move to the left or into the 116a cam slot portion of 116. This will cause clockwise swinging of 116 about 101 as a center.

By the above mechanism for any order of the comparing unit it is possible to compare two numbers in a given order and to get three selective settings of 116. One setting is made when the numbers are equal in which case there is no movement imparted to 116, and it remains in the center position. The other conditions are an upward or downward displacement of 116.

Figure 15:
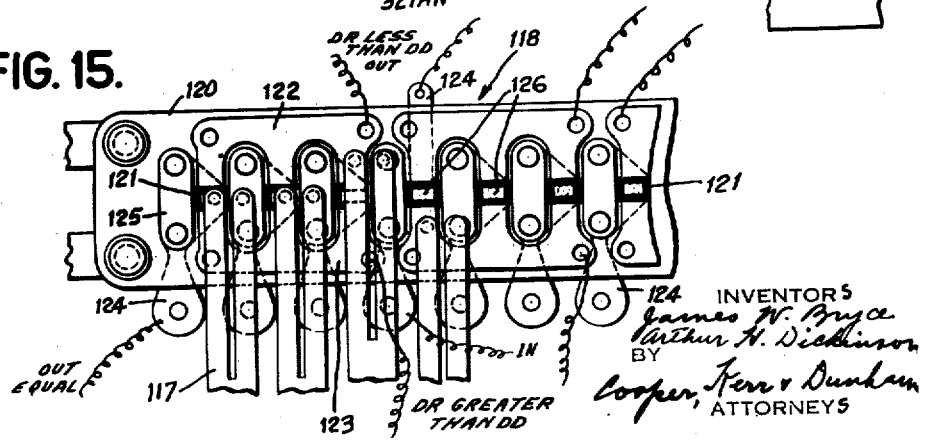
Fig. 15 is a fragmentary detail view of the comparing commutator and brush devices of the comparing unit, the view being taken substantially on line 15—15 of Fig. 13, looking in the direction of the arrows.

It will be understood that in order to provide for comparison of multi-denominational numbers that there are a pair of sectors 102 and 103 for each order and further that there is a member 116 for each order. Each member 116 has secured to it a brush contact bifurcated wiping member 117 (see Fig. 15). In Fig. 15 there are shown four wiping members 117. The two to the extreme left are in non-shifted or middle position. The second from the right is in upper position indicating that its sector 103 has moved to a less extent than its related sector 102 and the extreme right hand wiping member is in down position, indicating the reverse sector condition.

Suitably mounted upon the side plates in cooperation with the brush members 117 is a comparing commutator generally designated 118. This comparing commutator comprises a base plate 119 and a face strip 120 of insulating material supported by other strips of insulating material 121. Suitable fastening rivets secure the parts together and secured to the face of 120 are common contact strips 122 and 123. Located between the strips 119 and 120 are a series of terminal plates 124 having portions which extend beyond the edges of the commutator for circuit connections. Parts of terminal plates 124, to a certain extent, resemble triangles with their points extending to the right, note the dotted line extension in Fig. 15. Carried on the face of the strip 120 are a number of contact plates 125, each of which is connected to a related terminal plate 124. The contact strips 122 and 123 are serrated and arranged so that the serrations pass each other and extend into the spaces between the contact plates 125. The ends of the serrations of 122 and 123 and between 125 are blocks of insulating material 121 having contact rivets 126 which connect with the respective terminal blocks 124.

It may be explained that the comparing commutator is sectionalized for making comparison of three orders with three orders. With the setting shown for the three brushes to the extreme left in Fig. 15, the circuit will come in at the wire marked "In" to block 124. It will extend through 125, through the brush 117, thence to plate 122 and out on the circuit labeled "DR less than DD." However, assume that the right hand brush is in the middle position. In this event, the circuit would extend from the "In" wire to contact block 125, through brush 117, through the segment 126 of the next order to the left, thence through contact block 125, through the brush 117 of this order, again through 126 and 125 pertaining to the next order, through the brush 117 of this order, through the block 126 and 125 and out on the "Out equal" wire. On the other hand assume the right hand 117 brush of the three order unit in down position. The circuit comes in on the "In" wire, through the contact block 125, through the brush 117, and is then completed through the lower serrated member 123 to an out line labeled "DR greater than DD."

With reference to the comparing commutator, it may be explained that the first brush from the right in any group which has moved off from the central or equal position effects the control. For example, assume that the third brush 117 from the left in Fig. 15 is in middle position and the second brush from the left is in upper position, then in that event the circuit would be completed from the "In" line, through the terminal block 124, through block 125, through the brush 117 in say the hundreds order, through spot 126, through block 125, through brush 117 to contact plate 122 and out. In short, it may be stated that it is the highest order shifted brush which is controlling for purposes of comparison.

In the use of the comparing units it is desirable to set up one side of the comparing unit once and then hold the setting and it is also desirable that the other side of the comparing unit be set up, then restored and set up again for a following comparing cycle. In order to provide for this operation certain bail movement controlling mechanisms are provided, which will now be described.

Referring to Fig. 14, it will be noted that the bail 105 is provided with a spring pawl 127 and that bail 104 is provided with a spring pawl 128. Arranged to cooperate with 127 and 128 are pawls 129 and 130 which pawls may be considered as normally having the latched position as shown. Upon clockwise swinging of bails 104 and 105 the pawls 127 and 128 first yield and ride upon the face of pawls 129 and 130. When the end of the bail movement is reached, the pawls 127 and 128 snap into the position shown, thereafter both bails 104 and 105 will be latched against return movement. If it is desired therefore to retain the setting of an upper sector 102 (Fig. 13) magnet 321AZ (Fig. 14) is left de-energized. So long as this magnet is left de-energized, the previous setting of sector 102 or a plurality of such sectors will be retained.

Referring now to the lower sector 103, it is desired that this sector be reset on each comparing cycle. Accordingly, magnet 321AW (Fig. 14) is energized. Upon the attraction of its armature, pawl 130 will swing under the influence of its spring in an anti-clockwise direction out of intercepting relation with pawl 128. Accordingly, bail 104 can have an anti-clockwise restoring movement to restore the sector or sectors 103 cooperating therewith.

Arms 132 (Fig. 14) are oscillated by cams 99 and 100 once each machine cycle and such arms are provided for the purpose of knocking off the armatures of magnets 321AZ and 321AW whenever any armature has been tripped and such frame is also adapted to restore the pawls 130 and 129 to their latched position. When the bails 104 and 105 are swung counterclockwise to restore the sectors, the pawls 110 (Fig. 13) ride up on the smooth high parts of the sectors beyond the nine ratchet tooth position and thus displace the pawls out of the line of the ratchet teeth. At about this time the leading edge of a bail such as 104 engages a pivoted armature restoring member 133 and rocks it clockwise to displace the bail 134 and therefore knock off the armatures and re-latch the stop pawls 110.

*Electromechanical relay unit*

Referring to Figs. 1 and 1a there are three electromechanical relay units which are generally designated CY, N—R and TT. These units are identical in construction, except for the number of contacts and only one of them will be described. Each unit has a drive shaft 135, the drive shaft is adapted to make one-quarter of a revolution for each revolution of the main drive shaft 50 when the related one revolution clutch (for example that controlled by magnet 321CY, Fig. 1) is operated.

Figure 17:
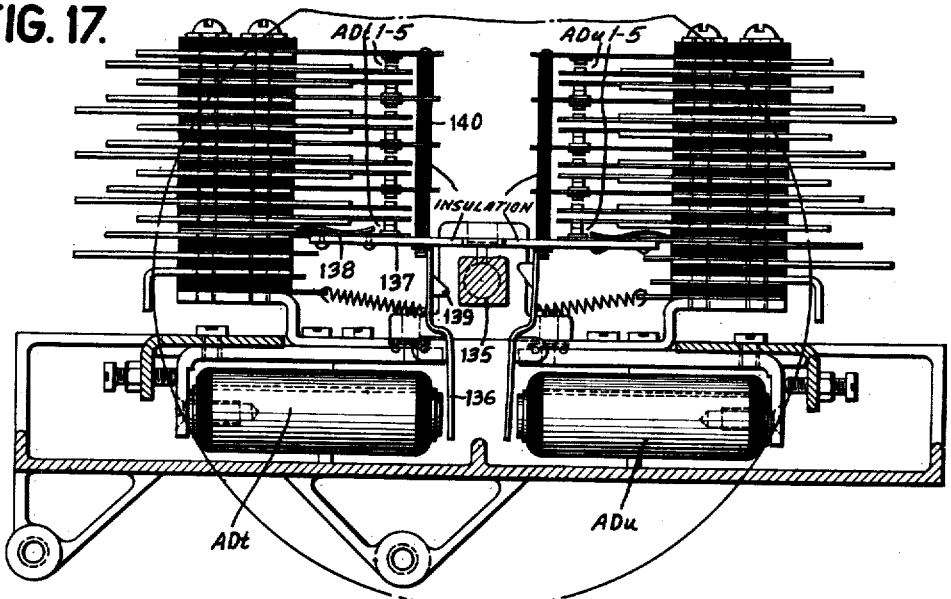
Fig. 17 is a detail sectional view of such unit, the section being taken substantially on line 17—17 of Fig. 16.
Figure 16:
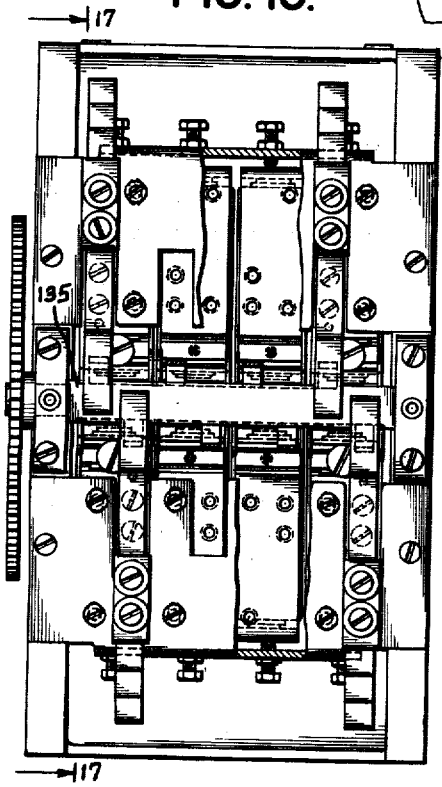
Fig. 16 is a top plan view of an electromechanical multi-contact relay unit which is used in the machine for cycle control and pre-sensing control purposes.

Referring now to Figs. 16 and 17 the shaft 135 is suitably journalled as shown and intermediate the journals the shaft is provided with a square cross-section as clearly shown in Fig. 17. In general the contact operation of this unit is as follows: Each relay unit comprises the required contacts which may include normally closed contacts, transfer or shift contacts and normally open contacts. Each set of contacts has a tripping magnet associated therewith. Such tripping magnets are ADt and ADu. Upon energization of either of these magnets their contacts will be tripped so that they shift to reverse position from that shown. Such contacts thereafter remain in such shifted position until the shaft 135 makes one-quarter of a revolution, whereupon the contacts are mechanically restored to their initial position. Such contacts are then latched in such position. The rotation of the shaft 135 also mechanically knocks off the armatures and also mechanically restores the contacts to their initial position.

The details of these electromechanical relay units form the subject matter of a copending application of James M. Cunningham, Serial No. 135,503, filed April 7, 1937.

Referring to Fig. 17, ADt is one of the tripping magnets. Cooperating therewith is a spring retracted armature 136 which has its upper portion in contact with a latch piece riveted to an insulated strip 137 to which the lowermost contact blades are riveted. Suitable springs such as 138 bias the lowermost contacts and the strip 137 downwardly. The insulating strip 137 extends along and overlies the square shaft 135. It will be self-evident that upon energization of a magnet ADt related contacts will shift to reverse position and remain in such position. Thereafter, upon one-quarter of a revolution of shaft 135 one square corner of the shaft will first abut the insulating strip 135 and lift it to upper position restoring the contacts and slightly later another corner of the square shaft intercepts a camming element 139 integral with the armature 136 and positively shifts the armature from the magnet into latching position.

The construction is substantially duplicated for the right hand section of the unit. It will be understood that the upper contacts of a set are shifted by insulating members 140.

Insertible plugboards

Figure 18:
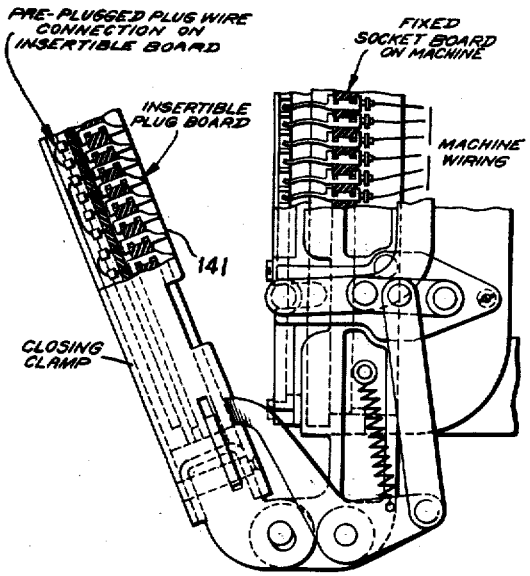
Fig. 18 is a detail view of one of the automatic plugboard units used in the machine, this view showing the plugboard unit in open position.

In order to quickly shift the machine controls from one status in which it is capable of effecting one type of computation to another status for effecting another type of computation use is made of insertible plugboard elements. This insertible plugboard construction is of a type known in the art and the insertible plug unit is generally indicated at 141 in Fig. 18. Devices of this type are generally known as "automatic plugboards" and a suitable form of such board is shown and fully described in United States patent to Lake, No. 2,111,118. Such automatic plugboard arrangement comprises a series of relative fixed machine sockets to which the fixed machine wiring is connected. Adapted for cooperation with such sockets are plug prongs carried by a replaceable plugboard assembly or unit. Such plug prongs on the replaceable board are in turn connected to plug sockets upon the replaceable board. These plugboard sockets may be in turn plugged up by the operator selectively at will or the entire board may be preplugged with a desired set of connections.

Figure 23:
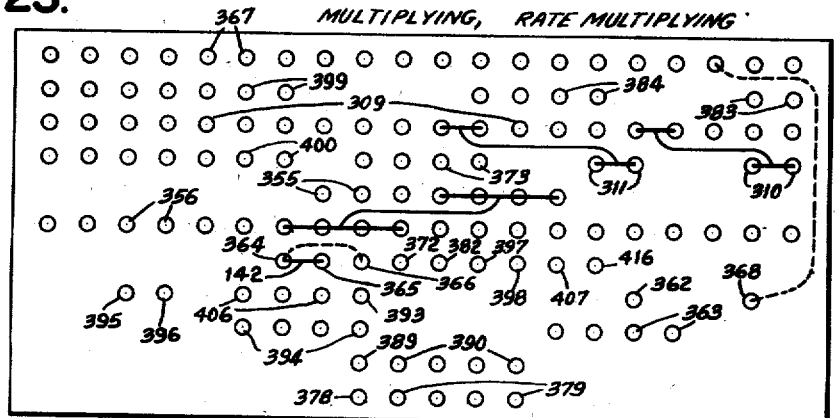
Figure 30:
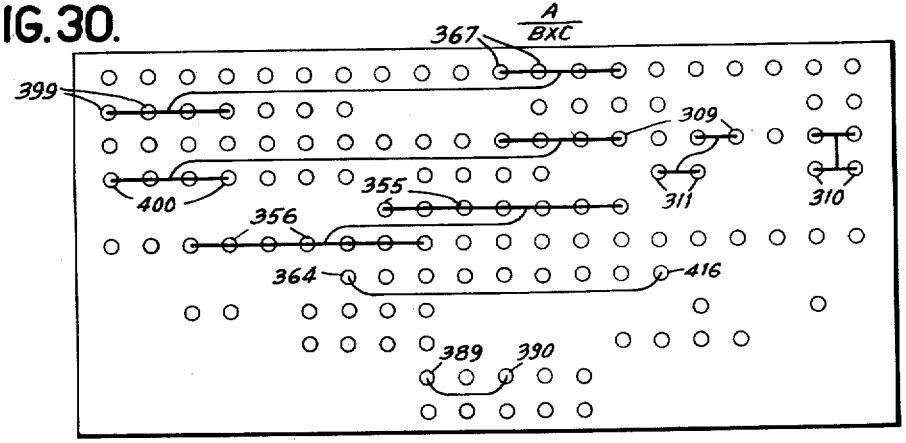

The manner in which the replaceable plugboard units 141 are wired and plugged for different computations is shown in Figs. 23 and 30 inclusive.

With reference to Fig. 23 for regular multiplying operations the dotted plug connections will be omitted. Upon rate multiplying the dotted connections will be utilized, but the solid connection designated 142 will be removed. All other solid connections will be utilized for rate multiplying.

Figure 24:
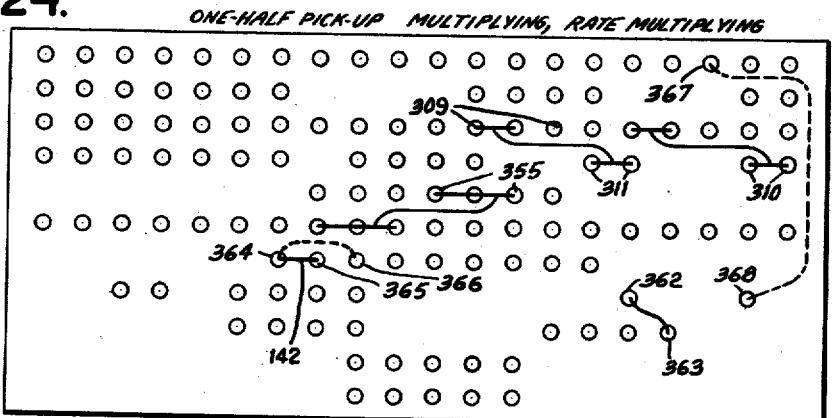

Referring to Fig. 24, the dotted line connections will be left out on regular multiplying and on rate multiplying the solid line connection 142 will be removed and the balance of the plugging will include all of the other solid line connections and the dotted line connections.

Figure 26:
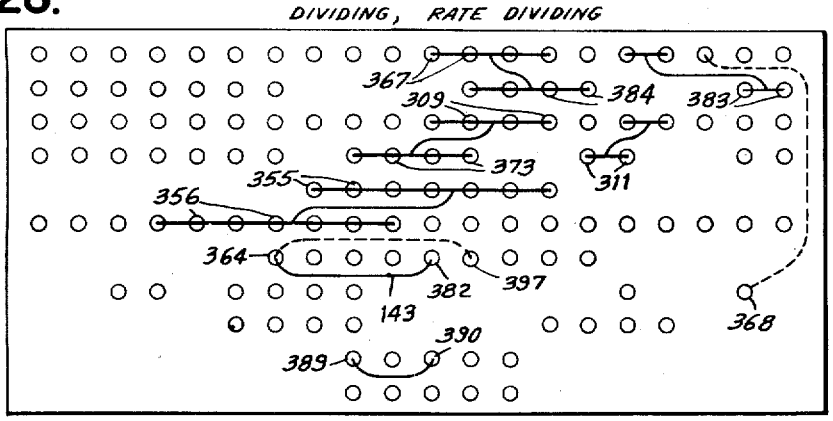
Figure 27:
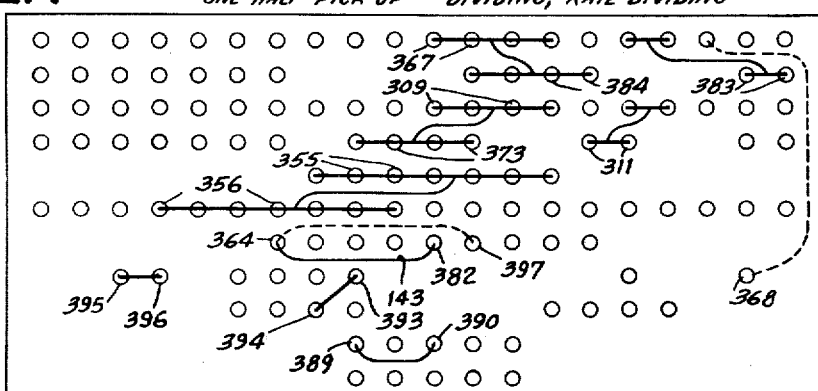

Referring to Fig. 26 on regular dividing, the dotted line connections are omitted and on rate dividing all of the dotted line connections and all of the solid line connections are utilized with the exception of solid line connection 143 which is removed. The same changes as are made for Fig. 26 are made for dividing and rate dividing in Fig. 27.

Figure 28:
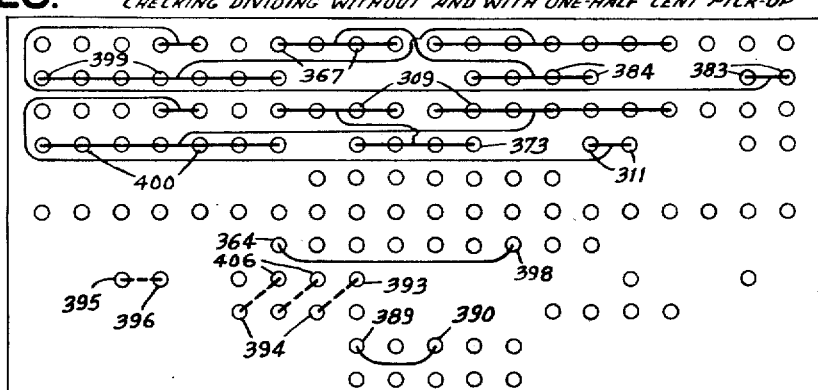

Referring to Fig. 28, the supplemental dotted line connections are used with checking dividing with the one-half pick-up and they are omitted when this feature is not used.

It may be explained that the plug socket reference numerals as used on the circuit diagram will have similar reference numerals to those used on the diagrammatic plug board views on Figs. 23 to 30 inclusive.

Cam timing diagrams

The cam timing diagrams, Figs. 19 to 21 inclusive, are self-explanatory. It should be noted that the CC cam contacts make one revolution per machine cycle. The FC cam contacts of Fig. 20 on the other hand make one revolution per card feed cycle, which comprises two machine cycles. The XC contacts of Fig. 21 make one revolution for three machine cycles.

Before describing the details of the circuit diagram and the operation of the machine the general operation both for multiplying and dividing will be briefly explained.

Multiplying

When the machine is to be used for multiplying, the amount of the multiplicand and multiplier are read from the record. The multiplicand amount is entered into five accumulative type receiving devices. The amount of the multiplier is entered into its receiving device. Following this entry cycle wherein amounts are derived from the record, there is a building up of multiples of the multiplicand. Before explaining the manner in which these multiples are built up it may be stated that certain of the entry receiving devices which receive the multiplicand amounts are provided with so-called doubling readouts. These doubling readouts are fully described in British Patent No. 456,367. In the machine cycle following the entry cycle, twice the amount of the multiplicand is read out from the doubling readout associated with the ML1—2 accumulator and such doubled multiplicand amount is entered into ML3—6, ML4—8, ML—5 and ML—9. On the following machine cycle twice the multiplicand amount is again read out from the doubling readout of ML1—2 and entered into ML4—8 and ML—5. Concurrently, and during this same cycle, six times the multiplicand amount is read out from the doubling readout associated with ML3—6 and such multiple is entered into ML—7 and ML—9. This completes the building up operation of all digital multiples of the multiplicand.

While the present description has explained the building up of multiples for multiplying operations, it may be explained that on dividing there is a similar building up of all digital multiples of the divisor in the same receiving devices.

It may be explained that upon multiplication two result accumulators are provided. By providing such two result accumulators multiplication by two orders of the multiplier may be effected concurrently and during the same machine cycle.

It may be mentioned that cycle control means are provided to control the sequence of machine cycles for significant multiplier digits only. The cycle controller will be explained in further detail subsequently.

During the computing cycles, the machine selects under the control of the multiplier entry receiving device which multiples are to be entered into the result receiving devices. Assume for example, the multiplier amount is 27. The times 7 multiple would be read out from MLR—7 and entered into the RD accumulator. The times 2 multiples would be read out from MLR—2 and entered into the LQ accumulator, the entry of the 2 multiple being affected concurrently with the entry of the 7 multiple into the other accumulator. Further computing operations would subsequently ensue for further columns of the multiplier and after entries were affected for all multiplier columns a gathering together cycle follows in which the amount in the RD accumulator is read out therefrom and entered into the LQ accumulator. Thereafter the machine is ready to record the result of the computing which recording is effected under the control of the LQ accumulator, the product amount therein being punched back on the record card.

The foregoing briefly explains the general manner of operation for effecting multiplication.

Division

For carrying out division calculations, the amount of the divisor and the amount of the dividend are read from the record card and the amount of the divisor is entered into the accumulative type receiving devices, which on multiplication received the multiplicand. Entries of the divisor and the building up of multiples of the divisor is effected in exactly the same manner as was described in connection with multiplication.

It may be mentioned, however, that upon entry of the divisor amount from the record into the receiving accumulators the divisor entry is shifted by a column shift mechanism so that the highest significant digit always appears in the extreme left hand order of the receiving accumulator ML—1—2. The dividend amount is also derived from the record and such dividend amount is entered into the RD accumulator. The dividend entry is also made in a manner such that the highest significant digit is entered into the highest order of the accumulator or clear to the left. The purpose of making the divisor and dividend entries in shifted relation is to save operating cycles during the dividing calculations. Control of entry shift for both the divisor and dividend entries is made by pre-sensing each record to ascertain the location of the highest order significant digits of both these amounts. Having ascertained the orders in which such digits of the divisor and dividend occur a selective control is set up and upon entry there is a shift to the left to an extent determined by the control which is set up.

When the machine is effecting division, certain comparing units are utilized. These comparing units are generally of a type described in the copending application of R. E. Page, Serial No. 117,493, filed December 24, 1936. Two of such comparing units having a potential comparing capacity of thirty-two columns are utilized in dividing calculations.

When dividing is to be effected a comparison portion of the dividend, i. e., a determined number of orders thereof to the extreme left, is derived from RDR and such dividend comparison portion is set up in each section of the comparing units. Concurrently and in the same machine cycle with such set up, there is also set up in each of said sections a multiple of the divisor. Different multiples of the divisor are set up on different comparing unit sections. Having set up the comparison portion of the dividend and the different digital multiples of the divisor in this manner, the comparing units proceed and affect a comparison. This comparison is effected in the same cycle in which entries of amounts were made into the comparing unit sections, comparing being instantaneously effected after entry. This comparing operation of the comparing unit sections determines which divisor multiple is greatest in magnitude that is equal to or just less than the comparison portion of the dividend. Having made such determination, a selective control is set up based on the comparison, that is to say, if the 4 divisor multiple is determined to be the greatest going multiple there is a selective control related to 4 set up.

Following the comparing operation the complement of the highest going divisor multiple is read out from its related readout and this complementary amount is entered into the RD accumulator bringing about a deduction of the divisor multiple from the comparison portion of the dividend in such accumulator. Along with this deducting operation the related quotient digit is entered into the quotient receiving accumulator LQ. The same operations are then repeated for a new comparison portion of the dividend. Before comparison is effected, of course, the dividend receiving side or sections of the comparing unit sections are restored to zero in order that a new comparison portion of the dividend may be introduced therein.

The foregoing continues with proper columnar shift after each operation until the dividing computation is completed.

It may be mentioned that the machine is provided with certain place limiting devices and controls to terminate operations when either a certain desired quotient columnar position is reached or to terminate operations when the capacity of the machine is reached.

When dividing operations are completed the machine is ready to record the quotient back on the record. However, in such recording, which is under the control of LQ, there is a relative shift back of the quotient entry on the record. This so termed "shift back" is made under control of devices which are set up according to the original shift of the divisor and dividend upon their entry. The shift back for recording is according to a definite law which will be subsequently explained in detail.

Rate multiplying

Rate multiplying follows the customary procedure, that is to say, the fixed multiplier amount is derived from a rate or master card which is provided with a special perforation. The multiplicand amount is derived from each detail card and multiples built up. The product amount is punched back on each detail card but computing and punching operations are eliminated for rate and master cards.

Checking multiplying

On checking multiplying computations, the previously computed product as recorded on the card is read out from the card and entered into the SP accumulator. On this particular computation the cards are reversed end to end with respect to their relation with the brushes used in the previous or original card run. This end to end reversal of the cards provides for checking of the operation of the brushes, plug connections, etc. On such checking computation there is also the customary reversal of the multiplier and multiplicand. That is to say, the multiplier on the original run becomes the multiplicand on the re-run and the previous multiplier now becomes the multiplicand on the re-run. Prior to computing operations there is a transfer of the amount in SP in a complementary manner into LQ to set up in LQ the complement of the previously recorded and computed product. Multiplication then ensues in the usual way and the product entries are directed into LQ in the usual way by original entries therein and a transfer entry from RD. If the computation has been made correctly and the amount checks the LQ accumulator will be brought back to zero, indicating a check condition. Thereupon a new card will be checked and so on. On a non-check condition the machine operation terminates and a manual operation is necessary to restart it and remove the incorrect card, etc.

Rate dividing

On rate dividing computations, the divisor amount appears on the rate or master cards which are provided with a special perforation. On passage of this master card through the machine the divisor multiples are built up on the various ML devices and the settings are retained until a new master card passes through the machine, whereupon there is a break down and a new multiple of the divisor is set up. The dividend amount is derived from each detail card, dividing operations occur for each detail card and the amount of the quotient is placed on each detail card. Computing and recording operations are eliminated for master cards except that the divisor multiples are built up from readings derived from such card.

On rate dividing there is a pre-sensing of the divisor field to ascertain the position of the highest significant digit containing column of the divisor. A control is set up in accordance with such pre-sensing which is retained for all succeeding detail cards of the group following the master card.

It may be also explained that all cards including the master cards and detail cards are pre-sensed in both the divisor and dividend fields, but the control from the master card is only set up from the divisor field, the pre-sensing of the dividend field of this card being ineffective. On following detail cards while there is again pre-sensing of both the divisor and dividend fields the set-up control is from the dividend field and the divisor field pre-sensing control is ineffective. Shift back on final recording is under the control devices set up from the divisor field of the master card and from the dividend fields of following detail cards.

Checking dividing

On this type of operation the different digital multiples of the divisor are built up on the various ML devices in the customary way. The dividend amount is read from the card and entered into SP in a shifted to the left relation. The previously recorded quotient is also read from the card and entered into LQ in a shifted to the left relation. Following these entries and during one of the building up cycles the complement of the dividend is read out of SP and entered into RD. Dividing operations then ensue. However, in such dividing operations in place of comparing true amounts, i. e., a true comparison portion of the dividend against the true divisor multiples, the comparison is effected between the complement of the comparison portion of the dividend against the complement of each divisor multiple. This brings about a different numerical comparison because entirely different digits are used. Having effected comparison in this complementary manner the comparing unit controls which are selected as a result of the comparison are such that they select the highest multiple whose complement is equal to or just greater than the comparison portion of the complement of the dividend. Thereafter the true amount of the multiple is entered into the RD accumulator and concurrently with this operation the complement of the quotient digit related with the selected multiple is entered into LQ. Successive complementary comparing and entry operations ensue until a number of complementary quotient digits equal in number to the number of digits in the previously computed quotient are obtained and entered. If the computations are correct the accumulator elements of LQ will stand at 9 which signifies a check condition. This condition will cause a reset of certain accumulators and an initiation of a new checking operation pertaining to a following card. If a non-check condition is detected, further machine operations terminate until there is a manual operation to re-start it and remove the incorrect card.

Half-entry feature on division

The machine includes rounding off mechanism to permit the recording of amounts to the nearest one-half. When such mechanism is used, if the machine is set say for a 3 place quotient, the use of the one-half control will cause the machine to compute to one further place in which place a 5 is added, but on final recording there is a discarding of such last place. When the one-half entry has been used on original runs for dividing and when checking is effected of such former runs which involve a one-half entry, the one-half entry is compensated for on the check run by a complementary one-half entry. That is to say, in lieu of adding 5 there is a subtraction of 5, subtraction being effected by complementary addition.

Special computation $\frac{A \times B}{C}$

In handling this computation the A amount is entered into the multiple receiving devices and the various digital multiples are built up as before. The B amount is entered into MP. The C amount is pre-sensed and is entered in shifted to the left relation in SP. The machine then computes the $A \times B$ computation in the usual way and finally the result of $A \times B$ stands in LQ. Following such computation there is a reset of all of the ML devices and the RD accumulator. There is also a testing of the setting of LQ to determine the highest order in which a significant digit appears and to set up a control related thereto. The amount standing in SP is entered into the ML devices and the various multiples of such amount C are built up in these devices. Also the product amount standing in LQ is read out and entered in RD in shifted to the left relation under the control previously mentioned and LQ is thereupon reset. With this special computation, upon completion of multiplying A×B, the machine circuits and controls are automatically shifted from the relationship which they had for multiplying for a suitable relationship for effecting division. Dividing operations then ensue in the regular way and the result amount is formed and finally set up in LQ from which it is recorded in shifted back relationship.

Special computation $\dfrac{A}{B \times C}$

In carrying out this computation the machine performs out the multiplying phase of the problem first and thereafter changes over to effect division. In carrying out this computation the B amount is entered into the ML devices and the multiples are built up in the usual way. The C amount is entered into the MP device. The A amount is pre-sensed to ascertain the highest order significant digit containing column and such A amount is entered into SP in shifted to the left relation. Multiplying operations ensue in the usual way and the product ultimately becomes set up in LQ. At the conclusion of multiplying the ML receiving devices of the RD accumulator are re-set to zero. The machine circuits and controls are shifted from a multiplying relationship to a dividing relationship. After multiplying is complete the LQ device is tested to ascertain which is the highest order significant digit containing column. Thereupon there is a transfer of the B×C product in LQ in shifted to the left relation into the ML devices and thereafter there is the building up of the multiples of such new divisor amount in ML and a reset of LQ. For this computatio there is also a transfer of the A amount from SP to RD, the A amount now being the dividend. Thereafter dividing operations ensue in the usual way and the result amount is formed in LQ and is recorded back on the card therefrom in shifted back relationship.

An incidental feature involved in both the special computations above described is the following: In each of them there is a pre-sensing of one factor prior to its entry in the machine by pre-sensing the record pertaining to the factor. This sets up one control. In each of the foregoing computations also there is a sensing or testing of a computed amount in an accumulator to determine the position of the highest significant digit containing column. With both of the computations on final recording the shift back control for such recording is dependent upon both of the foregoing set-up controls, that is to say, the shift back is based on the pre-sensing from the record and the testing of a computed amount.

There is a further feature which may be incidentally mentioned and that is, in a present machine, all recording operations, whether on multiplying computations, or dividing computations or the special computations, are effected during machine cycles which overlap operations pertaining to the following card. This has not been achieved heretofore in any machines involving division.

Regular multiplying

The operation of the machine will first be explained with reference to regular multiplying. In explaining regular multiplying the manner in which multiples of an entered amount are built up and stored in the machine will be set forth and these multiple building up operations are equally applicable to the building up of the divisor in dividing computations.

Before describing regular multiplying operations it may be stated that the circuit diagram of the instant application has been shown with a limited columnar capacity. For simplicity of illustration the capacity as shown by the circuit diagram is two columns by two columns, but it will be appreciated that in actual practice the machine would have a greater columnar capacity. Greater columnar capacity involves merely a parallel duplication of circuits and relay contacts.

Figure 22B:
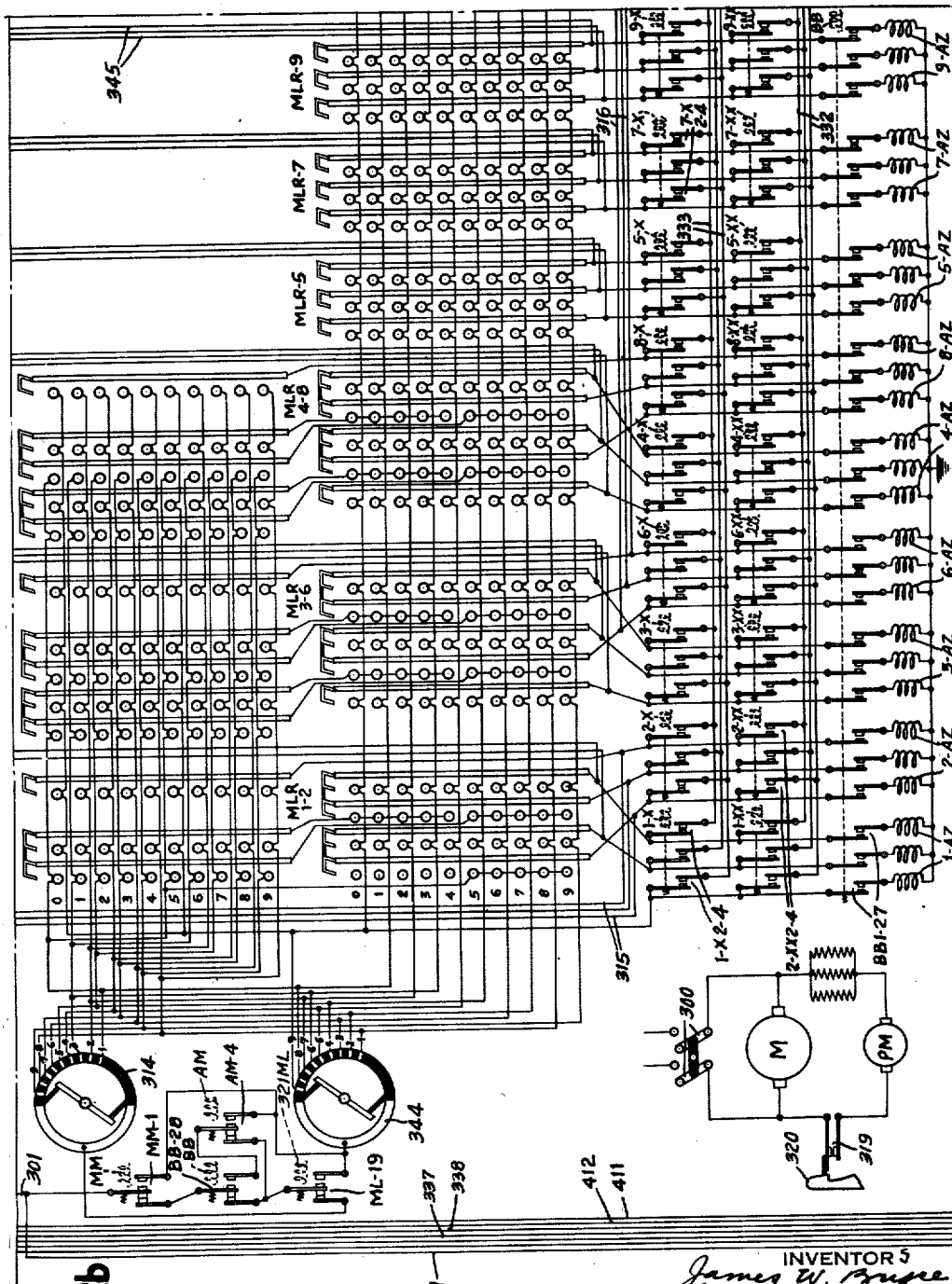

It will be assumed that a set of record cards are in place in the supply magazine of the machine. The operator then closes switch 300, supplying current to driving motor M (Fig. 22b). With the main driving motor M in operation the D. C. generator marked "DC" (Fig. 22d) is set in operation supplying current to ground and to D. C. line 301. The operator now depresses start key 302 (Fig. 22d) and a circuit is completed from ground through to the FC—3 contacts through relay contacts F—1, through the start key contacts back through relay coil E to line 301. Relay coil E upon being energized is maintained energized by a stick circuit through relay contacts E—1 and cam contacts FC—2. The energization of relay coil E closes relay contacts E—2 and a circuit is completed from ground through relay contacts AJ—12 (Fig. 22h) through cam contacts CC—29, via wire 380 through the punch controlled contacts P—1 (Fig. 22d) and the E—2 contacts now closed, through the JJ—2 contacts, through the stop key contacts 303 now closed, through the card feed clutch magnet 304, back through the D—1 contacts in the position shown to line 301. A card is now fed by the card feeding and handling section of the mahcine and is advanced towards the reading brushes in the usual way. In starting up the machine on a run of cards, the start key must be maintained depressed for two card feed cycles or it may be depressed and released and re-depressed.

During the initial card feed cycle certain idle operations occur which may be merely alluded to. The RD accumulator is reset to zero and circuits of the machine are conditioned just as if a product amount were to be punched. Punching does not occur at this time, however, because there is no product to record and the card has not reached the punch. Late in the second machine cycle of the card feed cycle, the card lever contacts 305 close bringing about an energization of relay coil G. Energization of relay coil G brings about closure of relay contacts G—1 (Fig. 22e) which affords current supply to the FC—6 contacts. These contacts upon closure permit current to be supplied to the impulse distributor 306 from which current impulses flow to the card transfer and contact roll 307. The usual regular reading brushes 308 are provided which are connected to plug sockets generally designated 309.

With the present machine, as explained before, special plugboard slides are provided for each computation. The plugboard slide for a regular multiplying operation is provided with plug connections as shown on Fig. 23 in which corresponding reference numerals appear to those on the circuit diagram. This plugboard slide will be pre-wired as shown in Fig. 23 and inserted in the slide holder prior to starting up the machine for a regular multiplying operation.

Upon re-depression or maintained depression of the start key and with relay coil G energized in the manner previously explained, relay contacts G—4 (Fig. 22d) will become closed and a circuit will be established not only to the card feed clutch magnet 304 in the manner previously traced, but a branch circuit will be established through the AT—1 contacts now in the position shown, through the now closed G—4 contacts through the now closed AL—2 contacts to a supplemental clutch magnet 312. This supplemental clutch magnet releases for rotation the group of XC cams which, upon release, functions for three machine cycles.

Figure 22D:
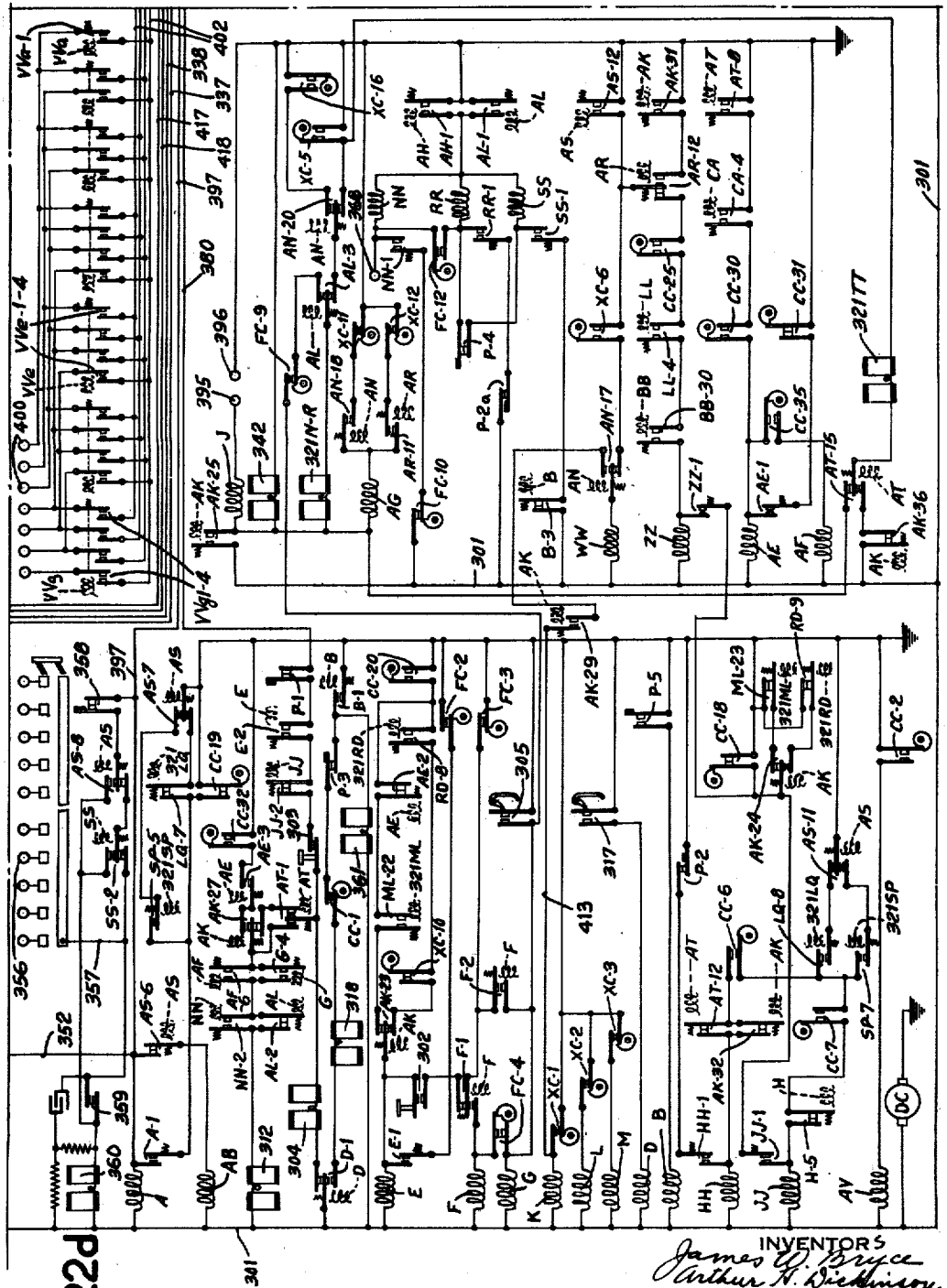

During this second card feed cycle, relay coil G causes closure of contacts G—2 (Fig. 22c). Current flows from ground through the now closed G—2 contacts, through cam contacts FC—11, through either contacts NN—5 or contacts AH—2 in closed position, through relay contacts AL—6 in the position shown, through AR—2 contacts in the position shown, through the Rt—1 contacts now in the position shown through the relay coil Tt and back to line 301. The energization of coil Tt causes closure of the group of contacts Tt—2 Fig. 22a). These contacts remain closed during the entry portion of this feed cycle. Also during the entry portion of this cycle cam contacts XC—1 close to energize relay coil K (Fig. 22d). With relay coil K energized, the K—1—8 contacts (Fig. 22a) become closed. The multiplicand amount is entered through the 311 plug sockets (Fig. 22a) through the AG—5—6 contacts, through the Tt—2 contacts now in closed position, down through the now closed K—1—8 contacts. The amount of the multiplicand is entered into the following multiple receiving devices ML—1—2, ML—3—6, ML—5, ML—7 and ML—9. On the circuit diagram the prefix reference numeral 313 refers to the accumulator magnets of these multiple receiving devices. At this point it may be explained that the multiple receiving devices are commonly used for both multiplying operations and for dividing operations. On multiplication, these multiple receiving devices are used to build up and store nine different multiples of the multiplicand and on division the same multiple receiving devices are used to store nine different multiples of the divisor. The multiple receiving devices have been previously described, these are in the form of electrically controlled accumulators with electrical readouts. The ML—1—2, ML—3—6 and ML—4—8 receiving devices are provided with doubling readouts in addition to the usual straight readouts. The other multiple receiving devices are provided with straight readouts only. On the entry portion of the feed cycle, as explained, the amount of the multiplicand is entered into five of the multiple receiving devices concurrently.

Before describing how the multiples of the multiplicand are built up, it may be stated that the multiplier is entered in the following manner. The multiplier enters through plug sockets 310 (Fig. 22e) through the MP—1—2 contacts now in the position shown to the 313MP accumulator magnets and through the normally closed AH—3 contacts to ground. The amount of the multiplier is thus entered into the multiplier receiving device.

Coincidentally with this set up of the multiplier in the multiplier receiving device there is a set up of the cycle controller and this set up is made according to the presence of significant digits in the multiplier amount. Assuming 27 to be the amount of the multiplier, at the "7" index point in the cycle, the ADu relay (Figs. 22e and 17) coil is energized and at the "2" index point the ADt relay coil is energized. "u" and "t" refer to the units and tens columnar orders. The return circuit for these cycle controller set up coils is via the normally closed AH—3 contacts to ground.

During the entry cycle, controls are set up to cut off the start key control circuit and to also maintain the operation of the machine under record card control. Referring now to Fig. 22d, early in the entry cycle cam contacts FC—4 close, energizing relay F. F being energized, it is maintained energized by a stick circuit which is completed through contacts F—1 and cam contacts FC—3. The shift of the F—1 contacts cuts off the circuit to the start key contacts 302. Energization of F closes contacts F—2 to maintain a stick circuit for relay coils F and G either through FC—3 contacts or the card lever contacts 305.

*Building of multiples*

It has been previously explained that on the entry cycle, the multiplicand amount was entered into ML—1—2, ML—3—6, ML—5, ML—7 and ML—9. On the machine cycle following the entry cycle, there occurs the first step in the building up of further multiples. As stated, the ML—1—2 device is provided with a doubling readout. This is designated MLR—1—2 on Fig. 22b. In this machine cycle cam contacts XC—2 (Fig. 22d) close, energizing relay coil L. With relay coil L energized, relay contacts L—1—12 (Fig. 22a) close and current supply is afforded for the adding emitter 314 as follows: From line 301 (Fig. 22b), through contacts MM—1, BB—28 and ML—18 in the position shown, thence to emitter 314. From emitter 314 the impulses flow over to the transverse buses of the doubling section of MLR—1—2, down through the piloting section of this readout and out via a group of lines generally designated 315. From these lines the impulses flow down through the L—1—12 contacts (Fig. 22a) which are now closed and ultimately reach the ML—3—6, ML—4—8, ML—5 and ML—9 accumulators or multiple receiving devices. This operation will have completed the building up of the 3 multiple in ML—3—6.

On the following machine cycle, the cam contacts XC—3 (Fig. 22d) close, energizing relay coil M and causing closure of contacts M—1—12 (Fig. 22a). With the emitter 314 in operation the times 2 multiple of the multiplicand is read out from MLR—1—2 and flows via lines 315 and through the M—1—6 contacts to the ML—4—8 and the ML—5 accumulators. This will have completed the setting of the 4 and 5 multiples on these receiving devices. During the same cycle in which these entries are being made, the 6 multiple of the multiplicand is read out from the doubling readout section of MLR—3—6 and such 6 multiple flows via lines 316 (Figs. 22b, 22f, 22c and 22a), through the M—7—12 contacts and finally reaches the ML—7 and ML—9 receiving devices. This operation will have completed the setting up of the 9 multiple on ML—9 and the setting up of the 7 multiple on ML—7.

The multiple building up operations are now complete.

During the second card feed cycle, the record card from which the factors were read is advanced to the punch tray in the usual manner. Upon reaching this tray, the contacts 317 close (Fig. 22d) to energize relay coil D. The energization of relay coil D shifts relay contacts D—1 to a reverse position from that shown cutting off current supply from the card feed clutch magnet 304 and providing current supply for the punch rack trip magnet 318 upon closure of cam contacts CC—1 with contacts P—3 and relay contacts B—1 closed. The relay contacts B—1 become closed upon energization of relay coil B upon closure of the customary last column punch contacts P—5. With punch rack trip magnet 318 energized, contacts 319 become closed and remain latched closed in the customary manner by latch 320 (Fig. 22b). Current supply is then provided for the punch driving motor PM and endwise card feed occurs in the usual way to feed the card to the first product punching position.

*Reset*

With relay coils B and D energized in the manner previously explained relay contacts B—2 and D—2 (Fig. 22e) become closed. Upon closure of cam contacts CC—27, current will flow from the 301 line through these contacts through the relay contacts AK—1 now in the position shown, down through the now closed B—2 contacts, the HH—2 contacts now closed, the D—2 contacts now closed and down through the AS—9 contacts now in the position shown, to and through the 321LQ reset relay coil to ground. Reset will then be effected by the LQ accumulator.

The present machine employs electric reset and provision is accordingly made to maintain the 321LQ relay coil energized during the reset cycle. This is provided for by stick contacts LQ—11, such contacts being in a stick circuit including cam contacts CC—5. Upon energization of the LQ relay, contacts LQ—6, LQ—1—4 (Fig. 22h) and LQ—5 (Fig. 22g) shift to reverse position from that shown. With LQ—6 (Fig. 22h) in reverse position current supply is afforded to an emitter 322 which is wired in a nines complementary manner to one of the LQR readouts. Complemental impulses representative of the nines complement of the amount standing in LQ flow through the now shifted LQ—1—4 contacts, through the set of lines generally designated 323 to the 313LQ accumulator magnets and back to ground (see also Fig. 22g). By thus introducing the nines complement of the amount standing in LQ the accumulator elements are restored to a 9 position. To bring the accumulator to zero from the all 9 position to zero, an elusive 1 is entered in the units order at the carry time in the cycle. This entry is provided through the contacts LQ—5 which are closed in the manner previously explained. This impulse is supplied in the following manner: From line 301, through cam contacts CC—16, via line 324, through the LQ—5 contacts, through the normal carry relay contacts AV—27 controlled by relay coil AV (Fig. 22d) down to the units order of the 313LQ magnets. The units order is thus advanced one step and the electric transfer devices of the accumulator cause advance of all the other higher orders one step.

It may be explained that as long as the machine is operating, cam contacts CC—2 close once each machine cycle at the carry time in the operation of the accumulators. Such closure of cam contacts CC—2 energizes relay coil AV. The energization of coil AV closes contacts AV—1—2 (Fig. 22e), AV—3—19 (Fig. 22a), AV—20—23 and AV—24—27 (Fig. 22g) and AV—28—31 (Fig. 22c), which are respectively associated with the MP, ML, RD, LQ and SP accumulators. Since coil AV becomes energized once each machine cycle the aforementioned relay contacts thus close at the carry time. The closure of these contacts permits the electric carry devices to be effective for performing carry operations whenever they are required in their related accumulators.

During LQ reset, provision is made to prevent repetition of such reset. This repeat reset preventing means is provided for as follows: During LQ reset, the LQ—8 contacts are closed (Fig. 22d). Accordingly, when cam contacts CC—6 close, a circuit is provided from ground through the AS—11 contacts, in the position shown, through the LQ—8 contacts, through CC—6, either through relay contacts AK—32, or through the AT—12 contacts to relay coil HH. Relay coil HH becoming energized, establishes its stick circuit through contacts HH—1 and the punch controlled contacts P—2 now closed. On Fig. 22e, the relay contacts HH—2 open and thus interrupt the reset initiating circuit to 321LQ.

Computing operations of the machine, that is to say, the adding of selected multiples of the multiplicand into the product receiving device, are initiated by LQ reset. From the LQ—8 contacts (Fig. 22d), a branch circuit extends to contacts CC—7 and upon closure of these cam contacts, relay coil JJ is energized, relay contacts H—5 being now closed. JJ once being energized, is maintained energized by a stick circuit through contacts JJ—1, through the AK—24 contacts now in the position shown, through the reset contacts ML—23 and back to ground. Coil JJ is the computing initiating control.

With the present machine for multiplying, multiplication is effected by entering into the dual product receiving devices multiples of the multiplicand from the multiple readout devices. The selection of multiples is made under the control of the MPR readout according to the amount of the multiplier standing in the MP receiving device. Inasmuch as the multiple receiving devices and readouts associated therewith provide all nine digital multiples of the multiplicand, it is possible to enter two multiples pertaining to two different orders of the multiplier concurrently into the separate sections of the result receiving devices. While multiple selection is afforded by the MPR readout for such concurrent entry there are supplemental entry controls afforded by the cycle controller. The cycle controller ascertains in which columns of the multiplier there are significant digits and in which columns there are zeros. Selective controls are set up in the cycle controller according to such zeros and significant digits and these controls determine which orders of MPR are to be effective for controlling multiple selection. The cycle controller also controls column shift action for routing of multiple entries to the result receiving devices in proper columnar relationship therein.

Before the cycle controller is further explained its principles of operation may be briefly set forth. If significant multiplier digits are present in all odd and even columns of the multiplier the machine will concurrently enter multiples pertaining to adjacent odd and even columns and thereafter advance to another pair of odd and even columns and make another concurrent multiple entry for these two columns. If zeros are present in any odd multiplier column, multiple entry cycles will be omitted for any such odd orders. Likewise where zeros appear in even orders of the multiplier amount entry cycles will be omitted for such even orders. In referring to odd and even orders of the multiplier, counting of orders is commenced from the right, that is, the units is one, an odd order, and the tens is two, an even order. The cycle control for odd orders is wholly independent of the cycle control for even orders.

In the operation of the machine, both the odd order cycle controller and the even order cycle controller must both have completed their independent control of entries before further machine operations can take place.

In substance, the machine has two independent cycle controllers, one for even orders and the other for odd orders and, in effect, multiple entries. The machine may complete one set of multiple entries under the control of one cycle controller ahead of the multiple entries which are effected under the control of the other cycle controller. However, whenever possible, concurrent entries are made into both sections of the product receiving device. The only time when such concurrent entries are not made is when zeros are present in either all odd multiplier orders or in all even multiplier orders or when one cycle controller has completed its controls in advance of the other.

The entry routing controls are so arranged that multiples pertaining to odd orders of the multiplier always go to RD and multiples pertaining to even orders of the multiplier always go into LQ.

Summarizing the machine has in effect, two cycle controllers. One cycle controller derives its control from odd numbered columns of the multiplier. The other cycle controller derives its control from even numbered columns of the multiplier. Each cycle controller tries to complete its operations in the minimum number of successive machine cycles and both cycle controllers can operate concurrently. One cycle controller will direct entries into one accumulator and the other cycle controller will direct entries into the other accumulator. In the complete wiring diagram only a dual order multiplier is utilized, but in practice, this multiplier, of course, might contain many more orders. The cycle controller is, however, here shown with provision for more than two orders in order that its principles of operation may be disclosed and understood.

Upon energization of relay coil JJ in the manner previously explained relay contacts JJ—4 (Fig. 22f) close and upon closure of cam contacts CC—28, a circuit is completed from line 301, through the AK—9 contacts in the position shown, through CC—28, through the ML—20 relay contacts in the position shown, through the JJ—4 contacts now closed, through 340SA and back to ground. Magnet 340SA is the magnet of a stepping switch SA. Such stepping switch may be of the general type shown in United States patent to Bohlman No. 1,569,450. Upon energization of 340SA, the stepping switch arms of the cycle controller are advanced from normal off contact position to the first contact position (Fig. 22e). In Fig. 22e, the first contact position is that which is in circuit with contact ADt—5 and ADu—5. The energization of relay coil JJ will have closed relay contacts JJ—5 and upon the closure of cam contacts CC—3 and CC—26 current will flow from line 301, through CC—3, through JJ—5, through the ADu—5 contacts now in closed position as brought about by the energization of the ADu magnet in the manner previously explained, down via line 326, through the column shift relay magnet CSc and back to ground. A circuit is also completed through contacts ADt—5, via line 327 to the column shift relay magnet CSb and back to ground.

The energization of CSc will close its related column shift contacts shown on Fig. 22g and direct the entry of the multiple related to the units order of the multiplier into the proper columns of the RD result accumulator. The energization of CSb will close its related column shift contacts on Fig. 22g and direct the entry of the multiple pertaining to the tens order of the multiplier into LQ. Concurrently with the energization of the above mentioned shift magnets CSc and CSb, current supply is afforded through lines 328 and 329 to the units and tens common segments of MPR (Fig. 22f). With the problem under consideration (see Fig. 37) the multiplier amount is 27 so the brush in the units order of MPR will stand on 7 and the brush in the tens order will stand on 2. With such brushes in these positions, the 7 brush in the units order will allow current to flow to the 7—X multiple selecting relay. The circuit back to ground is through the AK—8 relay contacts now closed. The brush standing on the 2 spot of the tens order will permit energization of the 2—XX multiple selecting relay. The respective multiple selecting relays X and XX have stick contacts such as 7—X—1 and 2—XX—1 which when closed, establish stick circuits which not only maintain their related multiple selecting relays energized but also maintain the selected column shift relays energized. The stick circuit from the XX relays is via line 330, which extends back to line 301, through cam contacts CC—15. The circuit to the stick contacts of the X relays is via line 331, which extends to line 301, through cam contacts CC—15.

With the above mentioned multiple selecting relays energized, the related contacts such as 2XX—2—4 and 7X—2—4 (Fig. 22b) will become closed and a readout of the 2 multiple will be permitted from the doubling section of MLR—1—2 with the entry of such 2 multiple into LQ. The path of impulse flow from the contacts 2XX—2—4 is via a group of lines generally designated 332 (see Figs. 22b, 22f and 22g). Lines 332 extend to contacts AK—15—17 in the position shown and the impulses will flow through these contacts through the now closed CSb—1—3 column shift contacts, through the AK—18—20 contacts in the position shown, through the ZZ—2—5 contacts to the 313LQ accumulator magnets. The 7 multiple will be read out from MLR—7 and the impulses will flow through the 7—X—2—4 contacts over a group of lines 333 (Figs. 22b, 22f and 22g), through contacts DD—2—4 which are in the position shown, down through the CSc—1—3 column shift contacts, through the group of contacts DD—5—8 in the position shown, to the 313RD accumulator magnets.

It will be understood that with the foregoing computation if the multiplicand amount is 32, the 7 multiple of that amount would be 224. The 2 multiple would be 64. Accordingly, there would a concurrent entry of 64 and 224 respectively, into LQ and RD. 64 would be entered into LQ in a tens relationship. The multiplying computation so far as entry of selected multiples is concerned is now complete, but it will be understood that with a larger size machine further multiple and selecting cycles would follow. Assuming, however, that the computation is complete on the entry of two multiples for a two significant digit multiplier, the machine will now terminate multiple selecting and entering operations and controls will be conditioned for the next step of the computation. This next step involves the transfer of the amount in RD over into LQ. During this same transfer cycle there will be other operations effected as follows: The multiple receiving devices and the MP receiving device will all be reset to zero. There will also be a reset of the cycle controller set up unit. During this same cycle in which these resets take place, the stepping switch SA will be restored to its normal or non-advanced position.

Near the end of the multiple entering cycle cam contacts CC—28 (Fig. 22f) reclose and again energize 340SA. The stepping switch arms (Fig. 22e) will be advanced to the second contact position. Contacts ADt—4 and ADu—4 will be in shifted position and all remaining cycle controller contacts such as ADh—1—4, ADth—1—4, etc., will be in non-shifted position. Upon closure of CC—3 and CC—26 current will flow through the JJ—5 contacts now closed, through the switch arms of the stepping switch, through the ADu—4 (Fig. 22e) contacts, through the lower pyramidical contacts, out via line 334, down through relay coil KK (Fig. 22f) and back to ground. Another circuit will be established through the contacts ADt—4 (Fig. 22e), through the lower pyramidical contacts, through line 335, down through relay coil H (Fig. 22f). In the event that relay coils H and KK are concurrently energized, the subsequent controls are brought into action, but if one or the other of these coils H or KK is not energized and the other one is energized, the controls now to be described will not be effective.

Upon energization of coils H and KK, these coils are maintained energized by stick contacts H—1 and KK—1, respectively, the stick circuit extending through the non-shifted AK—37 contacts and the ML—26 contacts back to line 301. The energization of relay coils H and KK will cause closure of relay contacts H—3 and KK—2 (Fig. 22e) and upon closure of cam contacts CC—27, current will flow from the line 301, through the AK—1 contacts now in the position shown, through the H—3 contacts, through the KK—2 contacts, through the AK—3 contacts now in the position shown, through the AH—4 contacts in the position shown, through the 321MP reset relay and also to the 321CY reset magnet. A branch circuit is also completed to energize the CA transfer relay coil. The coils 321CY and 321MP are maintained energized by a stick circuit through contacts MP—4 which extend to line 301, through cam contacts CC—5. The CA coil has stick contacts CA—5 which connect to the above described stick circuit.

In order to reset the multiple receiving devices, the 321ML reset relay is energized. This magnet is energized in the following manner: At the time contacts KK—2 and H—3 close, a branch circuit is established traced as follows: Via line 337 (Figs. 22e, 22a, 22b, 22c and 22d), through the relay contacts J—2 now closed (see Fig. 22h), through the switch arm of the place limiting switch SE, via wire 338 (Figs. 22h, 22d, 22c, 22b, 22a to 22e), through the now closed AL—1 contacts, through the 321ML reset relay. Upon energization of this relay the ML—25 contacts close to provide a stick circuit for coil 321ML. The return circuit to line extends to cam contacts CC—5.

The foregoing description has explained the manner in which 321CY is energized. The CY unit (Fig. 1) is then reset in the customary manner. The description has also explained the manner of energization of relay coils 321MP and 321ML. Upon energization of relay coil 321MP, the relay contacts MP—1—2 and MP—3 (Fig. 22e) shift to reverse position from that shown. Upon energization of 321ML, the ML—1—18 contacts (Fig. 22a) and the ML—19 contacts (Fig. 22b) shift to reverse position from that shown. The shift of contacts ML—19 (Fig. 22) place a nines complementary emitter 344 in circuit and nines complementary impulses are emitted from this emitter through the straight readout sections of the MLR—1—2, the MLR—3—6, MLR—4—8, MLR—5, MLR—7, MLR—9 and through one section of MPR (Fig. 22f). Considering the MLR—9 readout, the nines complementary impulses of the amount standing in the related receiving device flow through it and via a group of lines generally designated 345 (Figs. 22b and 22a), through the ML—15—17 contacts to the 313ML—9 accumulator magnets and back to ground. It will be understood that such impulses flow through the previously described contacts 14 and 72 of the accumulator. By such nines complementary impulses the ML—9 receiving device is brought to an all 9 position. The closure of contacts ML—18 allows a circuit to be established to the carry impulse line 324, the circuit being completed through the now closed carry relay contacts AV—19 to the units order 313ML—9 accumulator magnet. This provides for an entry of one in the units order of this accumulator and thereafter the regular electric transfer contacts provide for carries into higher orders. This resets the ML—9 receiving device to zero. The other multiple receiving devices are reset in a generally similar manner and individual reset circuits need not be traced therefor.

Referring now to Fig. 22f, the nines complementary impulses flow through one section of MPR and up via lines 346 (see also Fig. 22e). From these lines the impulses flow through the now shifted MP1—2 contacts, through the 313MP accumulator magnets, through the AH—3 contacts now in the position shown, to ground. This brings the MP receiving device to the all 9 position. A circuit is established from the carry impulse circuit 324, through the MP—3 contacts now closed, through the carry relay contacts AV—2 now closed, back to the units order 313MP accumulator magnet. The usual transfer circuit also energizes the higher order accumulator magnet. This brings the MP accumulator to an all zero condition.

As previously explained, at the end of the computation, the amounts standing in the RD accumulator is transferred into the LQ accumulator to set up the final result in LQ. Transfer of such amount is brought about in the following manner. Referring first to Fig. 22c, a circuit is completed from line 301, via wire 347 (see also Fig. 22g), through contacts DD—9, AM—2, RD—6 all in the position shown, to add emitter 348. From the add emitter impulses are emitted to RDR and the impulses flow out through contacts RD1—4 in the position shown, through the CA1—3 contacts now in shifted position, to a group of lines generally designated 349. From these lines, the impulses flow through the ZZ3—5 contacts to the 313LQ accumulator magnets. In this manner the amount which previously stood in RD is transferred over and entered into LQ.

After the foregoing operations have been completed, provision should be made to terminate the computing initiating control, viz., to de-energize relay coil JJ (Fig. 22d). Provision should also be made to restore the cycle controller stepping relay to its off-contact position and reset of the RD accumulator should be effected and punching operations should be initiated. Furthermore a new card feed cycle should be initiated. De-energization of the JJ relay is brought about in the following manner. Energization of the 321ML relay coil (Fig. 22e) will have opened contacts ML—23 (Fig. 22d). With such contacts open and at a later time in the cycle, upon opening of contacts CC—18, the stick circuit to relay coil JJ will be broken, whereupon this relay will be de-energized. This will disable the computing initiating control circuits and allow the contacts controlled by relay JJ to return to the position shown in the circuit diagram.

Relay contacts ML—22 (Fig. 22d) become closed upon energization of relay coil 321ML and upon closure of cam contacts CC—20 a circuit is established through contacts AE—2 and AK—23 in the position shown to energize relay coil E. Relay coil E upon being energized closes contacts E—2 which permit energization of the card feed clutch magnet 304. The clutch magnet 312 for the XC cam contacts is also energized under control of the closed E—2 contacts. A new card feed cycle now ensues.

To restore the cycle controller stepping relay to normal position, relay contacts ML—20 (Fig. 22f) are provided. Such contacts shift to a reverse position upon energization of relay coil 321ML and upon closure of cam contacts CC—28, a circuit is established through the AK—9 contacts and the now shifted ML—20 contacts to energize the release magnet 341SA of the stepping relay. The stepping relay then assumes its off-contact position.

In order to reset the RD accumulator the following control circuits are provided. Referring to Fig. 22e, upon closure of cam contacts FC—14, during the re-initiated card feed cycle, a circuit is established from line 301, through the FC—14 contacts, through the AK—5 contacts now in the position shown, through the now-closed XC—9 contacts to the 321RD reset relay coil. Energization of 321RD closes stick contacts RD—10, the stick circuit being completed back to line through cam contacts CC—5. Energization of 321RD as above explained, causes the shift of contacts RD—6 (Fig. 22g) and a shift of contacts RDI—4. With such contacts shifted a circuit is established from line 301 (Fig. 22c) via wire 347 (see also Fig. 22g) to and through the DD—9 and the AM—2 contacts in the position shown, through the now shifted RD—6 contacts to emitter 350. Emitter 350 is a nines complementary emitter and with current supplied to it, nines complementary impulses are emitted through RDR and through the now shifted RDI—4 contacts to a set of lines generally designated 351. The impulses flow via these lines to the 313RD accumulator magnets and advance the accumulator elements to an all 9 position. Thereafter a carry impulse is introduced into the units order of the accumulator through the closed RD—5 and AV—23 contacts which establish a circuit from the carry impulse line 324 to the 313RD accumulator magnet in the units order. The customary electric transfer contacts in the accumulator afford carry into the higher orders of the accumulator so that all accumulator elements are brought back to a zero status.

Punching operations are initiated in the following manner. Referring to Fig. 22c relay contacts RD—7 become closed upon energization of reset relay coil 321RD. Upon closure of cam contacts CC—4 a circuit is established from ground through these cam contacts, through RD—7, through contacts AE—6, now closed, through contacts AS—5, contacts AT—16, AK—14, AT—14, all in the position shown, to relay coil AAu. A branch circuit also extends from contacts AT—16, through relay contacts AK—13 and AT—13, in the position shown, to relay coil Zu. In order to maintain relay coils AAu and Zu energized, a special stick circuit control is provided. Closure of contacts RD—7 and cam contacts CC—4 also establishes a circuit via wire 352 (Fig. 22c and Fig. 22d), which circuit extends to relay coil A, energizing it. Upon energization of relay coil A a stick circuit is established for A by relay contacts A—1, the circuit being completed back to ground through contacts LQ—7 and AS—1, which are now in the position shown. With relay coil A energized and relay contacts A—1 closed, a circuit to ground is afforded via line 352 from stick contacts Zu—1 (Fig. 22c) and AAu—1. It may be mentioned that another relay coil AB is also picked up and held energized as long as relay coil A is energized. The circuit for energizing coil AB is through contacts AS—6 (Fig. 22d).

The punch interposer magnet circuits will now be traced. Referring to Fig. 22h, line 301 extends to one side of the set of interposer magnets 353 and the circuit is completed through one of these magnets, through one of the AB—1—11 contacts now in shifted position, to and through LQR and for the first product punching position to an outgoing readout line 354, through one of the Zu—1—7 contacts and one of the AAu—1—7 contacts to one of the plug sockets 355, through a plug connection to one of the plug sockets 356 (Fig. 22d). In the punch the usual readout strip and brush commutator device establishes a circuit to the line 357. The circuit from wire 357 back to ground is completed through contacts SS—2 and AS—8 now in the position shown, through the usual punch escapement contacts 358, through the A—1 contacts now closed and through the circuit previously traced. The energization of selected ones of the coils 353 will cause closure of the punch interposer controlled contacts 359 and upon closure of 359 there will be an energization of the punch magnet 369. Punching now takes place for the first result punching position. The usual escapement occurs in the punch and for succeeding orders of LQR the punch circuits are established not via wire 354 (Fig. 22h), but through successive ones of the contacts GG—1, FF—1 and EE—1, which are now in the position shown.

It may be explained that concurrently with punching the result on the record card there is a new card feed cycle and that during this card cycle a new set of multiples are being entered and built up on the multiple entry receiving devices.

In the customary way the punch controlled contacts P—5 (Fig. 22d) become closed on the card reaching the beyond the last column position and closure of such contacts brings about energization of relay coil B. Energization of relay coil B closes relay contacts B—I and the circuit is completed to the usual eject magnet 361 in the punch. Upon eject of the card under the control of the eject magnet 361, the contacts P—3 and P—4 become closed in the usual way.

With the card in the beyond the last column position in the punch relay coil B will be energized and with the new card in the receiving tray of the punch relay coil D will be energized because card lever contacts 317 will have become closed. With relay coils D and B thus energized, relay contacts D—2 and B—2 (Fig. 22e) will become closed and with such contacts closed the 321LQ reset relay will have been energized through the circuit path previously traced. Reset of the LQ accumulator will then be brought about in the manner previously explained and such reset will initiate a new computing operation. During LQ reset contacts LQ—7 (Fig. 22d) open, thereby breaking the stick circuit for relay coil A, relay coil AB, relay coils ZU (Fig. 22c) and AAu.

One-half pickup on multiplying

For augmenting a result amount to the nearest one-half a plug connection is established from socket 362 (Fig. 22e) to a selected one of the sockets 363 (Fig. 22g). Then on the second half of a card feed cycle and with relay contact G—1 closed, a current impulse at the "5" index point time in the cycle will flow through the FC—13 contacts to the selected 313RD accumulator magnet. This will provide for rounding off the product result in the usual manner.

Rate multiplying

Rate multiplying in the present machine is controlled in the usual way from an X punching on the master or rate cards. As is customary in rate multiplying the multiplier amount is taken only from the rate cards and dummy multiplying cycles and punching operations are suppressed for the rate or master cards. Also the multiplicand amount is only taken from detail cards and results are punched on each detail card.

The present machine embodies simplified controls for controlling such operations and in general the simplified controls include a relay selection which dispenses with the setting of the multiplicity of switches which have heretofore been required in machines of this class for rate multiplying operations.

Referring to Fig. 22h it may be mentioned that for regular multiplying operations a plug connection is made between socket 364 and socket 365. When rate multiplying is to be effected this plug connection is removed and a plug connection established between 364 and 366. This will energize relay coil AH and such coil will be maintained energized during all rate multiplying operations. Relay coil AH on energization closes contacts AH—1—4. For rate multiplying operations a plug connection is made from a plug socket 367 (Fig. 22a), selected according to the column in which the X punching occurs on the master card, to socket 368 (Fig. 22d).

Assuming that a master card is the first card of a run and that the card is advanced to a position in which the multiplier amount is about to be read by the sensing brushes 308 (Fig. 22e). With the card in this position a circuit will be completed through the X index point position in the master card. The circuit is traced as follows: From line 301 (Fig. 22e), through the G—1 contacts now closed, through line 369 (see also Fig. 22a), through the FC—7 contacts which are closed at the end of a card feed cycle, through the advance contact block 370, through an advance sensing brush 371, via plug connection from socket 367 to socket 368 (Fig. 22d). Accordingly, relay coil NN will become energized since contacts AH—1 are now closed. During the next card feed cycle the multiplier field in the master card is read by the brushes 308 and is entered into the MP accumulator. The return circuit is completed through the now closed NN—6 contacts to ground (Fig. 22e). It may be mentioned that contacts AH—3 are now open, since the AH relay coil is energized. No amount is entered from the multiplicand field of the card because the Tt—2 contacts do not become closed. With relay coils NN and AH energized, relay contacts NN—5 and AH—2 (Fig. 22c) are both opened. Accordingly, even though contacts FC—11 close, no energizing circuit is afforded for coil Tt.

Early in the master card reading cycle, cam contacts FC—12 (Fig. 22d) close causing energization of relay coils RR and SS. The stick circuit for RR is through the RR—1 contacts, the circuit being completed back to line 301 through supplemental punch controlled contacts P—2a. The stick circuit for relay coil SS is through the now closed eject contacts P—4 and contacts RR—1 back to line through the path just traced. The master card ultimately reaches the receiving tray of the punch, closing card lever contacts 317 and energizing relay coil D. Inasmuch as relay coils B and D are now energized, relay contacts B—2 and D—2 (Fig. 22e) become closed and energization of the 321LQ reset relay coil occurs as described before.

With the master card in the punch tray with relay D energized, the D—1 contacts (Fig. 22d) shift to reverse position and upon closure of cam contacts CC—1 with relay contacts B—1 closed, there is an energization of the punch rack trip magnet 318 to feed the master card to the first punching position. Upon feed of the master card, the P—5 contacts open deenergizing relay coil B, allowing closure of B—3. With such contacts closed, the SS—1 contacts are now effective to afford a stick circuit for relay coil SS. During the feed of the master card in the punch to eject contacts P—4 are opened. Accordingly, the circuit connection between coils RR and SS is broken.

It may be mentioned that relay coils H and KK become energized before relay coil RR becomes deenergized. With coil RR still energized and the RR—2 contacts (Fig. 22f), closed circuit is completed from line 301 through cam contacts CC—24 to RR—2, through the now closed LQ9—10 contacts, to coils H and KK. These coils, once energized, are maintained energized through their related stick contacts H—1 and KK—1, the stick circuit extending back to line through contacts AK—31 and ML—26. With relay coil H energized in the foregoing manner, contacts H—5 (Fig. 22d) are opened and there is accordingly no circuit completed to JJ even though the LQ—8 contacts are closed upon LQ reset. Accordingly, the usual computing initiating controls are not set up and dummy multiplying operations are suppressed for rate cards. With such rate card operations it is desired to bring about reset of the ML receiving devices immediately following LQ reset.

With relay coils H and KK energized, the previously traced circuit is established through contacts H—3 and KK—2 (Fig. 22e) to energize the 321ML reset coil. This brings about ML reset in the manner previously explained. It is also desired to suppress MP reset and also a reset of the cycle controller set-up unit CY. The reset circuit to 321CY and 321MP is established through either of contacts NN—7 or G—5. However, contacts G—5 are now open since there are cards in the machine and contacts AH—4 are open since coil AH is energized. Contacts NN—7 are open since relay coil NN becomes deenergized when FC—10 is opened in the master card feed cycle. Accordingly, no MP or CY unit resets occur. While there is an energization of relay coil CA with this type of operation, this energization at this time is ineffective and of no consequence. The energization of reset relay coil 321ML causes closure of contacts ML—22 (Fig. 22d) to energize relay coil E and initiate a new card feed.

During such card feed cycle reset relay coil 321RD (Fig. 22e) becomes energized upon closure of contacts FC—14. Upon RD reset, contacts RD—7 (Fig. 22c) close and, as before explained, relay coils Zu, AAu, relay coils A (Fig. 22d) and AB become energized. With this type of operation relay coil SS is energized (Fig. 22d) as explained previously. Thus relay contacts SS—2 are in shifted position. Accordingly, the circuit to the punch readout strip is broken, but a circuit is established direct to the punch magnet 360. The card thereupon is skipped out by repeated energization of the punch magnet 360 under the control of the escapement contacts 358 in the usual way.

The card finally reaches the beyond the last column position, closing contacts P—5, energizing relay coil B and opening relay contacts B—3 to thereby break the stick circuit for SS. With card feed initiated by a reset of the ML devices as explained above, computing operations pertaining to a following detail card take place in the usual way. With such operations it will be understood that the return circuit from the 313MP accumulator magnets (Fig. 22e) is interrupted, since both the AH—3 and the NN—6 contacts are open. Furthermore, there is an energization of the Tt coil (Fig. 22c), since now the NN—5 contacts are closed. With coil Tt energized, the Tt—2 contacts (Fig. 22a) are in shifted position affording an entry circuit to the ML receiving devices.

On previous multiplying machines wherein rate card operations were effected there was a rather complex circuit arrangement for resetting the MP receiving device, particularly when the last card of a run had passed through the machine. With such previous machines under this condition it was arranged to reset the MP receiving device at the beginning of a new run. According to the present invention the machine is arranged to reset the MP receiving device upon the exhausting of cards in a run concurrently with ML reset pertaining to the last card in the machine. Referring to the circuit diagram (Fig. 22e) it will be noted that relay contacts G—5 are provided. Such contacts are normally open when a card is in the machine, but become closed when the last card of a run passes through the machine. Closure of such contacts affords current supply for coil 321MP and magnet 321CY concurrently with the supply of current to coil 321ML. Therefore, the cycle controller set-up unit and the MP receiving device become reset along with the ML devices on such last card condition.

Checking multiplying

According to the present invention provision is made for checking multiplying operations. Such checking is effected by re-running the previously computed and punched cards through the machine and upon such re-run, the previously recorded product is read from each card and entered into a supplemental (SP) accumulating device. The MC and MP amounts are also read from the card and entered in reversed relation in the multiplicand and multiplier receiving devices. That is to say, the previous multiplier is entered as the multiplicand and the previous multiplicand is entered as the multiplier. Following the entry operations (see Fig. 38) the complement of the amount of the previously recorded product is read out from the SP accumulator and entered into the LQ accumulator. ML multiples are built up as previously described. Multiplying cycles then ensue and if the previously recorded product checks with the re-computed product the LQ accumulator will eventually stand on zero. If such accumulator stands on zero this signifies that the re-calculation checks with the previously recorded product and the machine proceeds with the checking of a further card of the run.

This in general explains the manner of checking multiplying. A machine for checking multiplying computation in this general manner forms the subject matter of U. S. Patent No. 2,141,599.

According to the present invention in lieu of using reversing wiring for reversing the entry relations of the multiplier and multiplicand, a further expedient is adopted, viz. on placing cards in the machine for a checking run, the cards are reversed end to end. By such reversal different sensing brushes come into play and it is possible to obtain a check which will take into account possible defective brush action or defective plugging.

Figure 25:
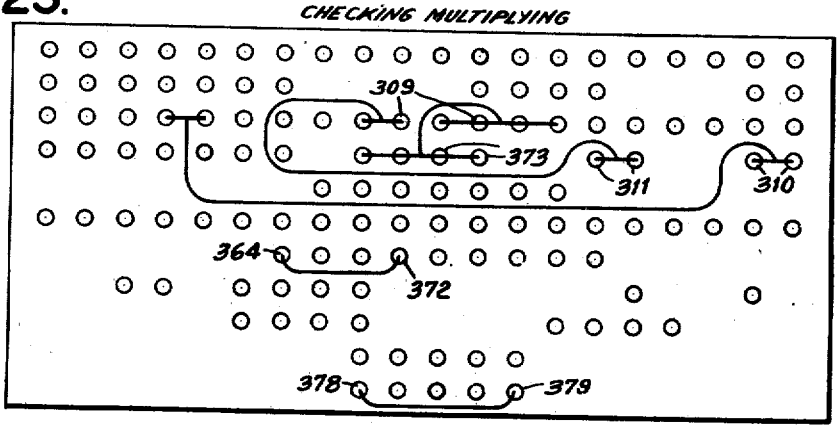

It may be explained that special insertible plug slides are utilized for checking multiplying operations (see Fig. 25). In preparing the machine for a checking multiplying run the following plug connections are made. It will be understood that such plug connections can be pre-made on the insertible plug slides. Referring to Fig. 22h, a plug connection is made between socket 364 and socket 372. The other entry circuit plug connections are made according to Fig. 25 in which reference numerals are provided to accord with the circuit diagram showing. Referring to Fig. 22h with a plug connection established from socket 364 to socket 372, relay coil AJ will be energized and maintained energized during all checking operations. With relay coil AJ energized, relay contacts AJ—10 will close and accordingly relay coil AS will also be energized during all checking operations.

Referring now to Fig. 22c in the previous description of a regular multiplying computation the manner of energizing relay coil Tt was described. On a checking operation relay coil Tt is energized in the same manner as previously explained for regular multiplying, but in addition a circuit is completed through relay contacts NN—3 and AN—2 now in the position shown, through the AJ—9 contacts now closed, down through the contacts Nth—1 now in the position shown to energize relay coil Sth. The replaceable plugboard affords plug connections between sockets 373 (Fig. 22g) and the sockets 309 (Fig. 22e) pertaining to the field of the card containing the previously recorded product. The previously recorded product is read from the card by the brushes and impulses flow to the sockets 373 (Fig. 22g) thence through the non-shifted AN—7—10 contacts, through a group of wires generally designated 374 (see also Fig. 22c) and thence through the now closed S*th*—2 contacts through the now shifted AS—1—4 contacts and to the 313SP accumulator magnets. This will afford entry of the previously recorded product into the SP accumulator. Concurrently, with such entry operation the multiplicand amount is entered into the MP receiving device and the multiplier amount is entered into the MC devices.

It will be understood that the plug connections utilized on checking have to take into account the end to end reversal of the card and a different plug connection will be required to transmit an entry pertaining to any given order. That is to say, with the card reversed end to end, the units order of the card upon reversal becomes a higher order and the plugging connection has to be made accordingly. It is by this change of plug connections that previous plugging and previous plug connections can be checked.

In the second machine cycle of a card feed cycle, provision is made to transfer the amount standing in SP over to the LQ accumulator as a complement. Referring to Fig. 22d, energization of relay coil AS will have closed contacts AS—12 and upon closure of cam contacts XC—6, relay coil WW will become energized, the AN—17 contacts being in the position shown. Energization of WW will shift the WW—3—6 contacts (Fig. 22g) and the WW—2 contacts (Fig. 22c) to reverse position from that shown. The shift of the WW—2 contacts will have placed complemental emitter 375 in circuit, the AT—9 contacts being in the position shown. Nines complemental impulses are emitted from the emitter 375 and such impulses flow through SPR, thence through the SP—1—4 contacts in the position shown, through the now shifted WW—3—6 contacts and the now shifted AJ—1—4 contacts to a group of lines generally designated 376 (see also Fig. 22h). From the lines 376 such impulses flow via lines designated 403 and 323 to the 313LQ accumulator magnets on Fig. 22g. In this manner the nines complement of the amount standing in SP is transferred over to LQ. A 1 is entered into the units order of the LQ accumulator at the carry time in the cycle in the following manner. Upon closure of cam contacts CC—16 an impulse flows through the AR—5 and AM—21 contacts now in the position shown, through the now closed WW—1 contacts, through the AJ—11 contacts now in shifted position, over through the AV—27 contacts to the units order 313LQ magnet. Thus the true complement of the product amount stands in the units order of this accumulator. Possible carries may occur in higher orders to the left, this being effected by the usual electric transfer mechanism of the accumulator. On multiplying checking operations, as soon as the amount has been transferred out of the SP accumulator, this accumulator can be reset to zero and the reset of such accumulator is utilized to initiate computing operations in place of having such initiation under the control of LQ reset as heretofore. On multiplying checking provision must also be made to suppress the LQ reset which would ordinarily occur to effect such computing initiation.

Referring to Fig. 22e, the reset initiating circuit as previously traced is through the B—2, the HH—2 and the D—2 contacts. However, with relay coil AS energized, the reset circuit to 321LQ will be interrupted by the shift of the contacts AS—9. A reset circuit is established, however, to the 321SP reset coil through the now closed contacts AS—10.

The above circuit will suppress LQ reset and initiate SP reset. Energization of the 321SP reset relay coil as just explained will shift contacts SP—10 (Fig. 22c) to reverse position. Accordingly, a circuit will be established from line 347 through the non-shifted WW—2 contacts, through the shifted SP—10 contacts, to the 375 nines complemental emitter. The impulses will flow through SPR and the now shifted SP—1—4 contacts, via a set of lines generally designated 377 which extend over (see Fig. 22c) to the 313SP accumulator magnets. This operation will set the SP accumulator wheels to an all 9 condition and following this an elusive 1 is added in the tens order by a circuit completed from wire 324 through the SP—6 contacts, through the carry relay contacts AV—31, to the 313SP accumulator magnet in units order. The usual electric carry mechanism in the accumulator provides carries to the relatively higher orders to bring all of the wheels to an all zero position.

In the description of regular multiplying operations, it was explained that relay coil JJ was the computing initiating relay. On regular multiplying such relay was energized upon LQ reset upon closure of contacts LQ—8. During checking operations, in lieu of effecting energization of relay JJ by the circuit through LQ—8, the initiating circuit is now through the SP—7 contacts and through the now shifted AS—11 contacts.

All of the various operations involved in regular multiplication such as the entries of multiples, the resets, the transfer over from one result accumulator to the other, etc., take place as before explained in regular multiplying. Ultimately, the re-computed product will have been completely introduced into LQ. If such re-computed product is the same as the product read from the record card and whose complement was introduced into LQ, the LQ accumulator will be brought back to an all on zero position.

Provision is made to test the accumulator wheels of the LQ accumulator to ascertain whether all of the elements of such accumulator stand on zero or not. If such wheels stand on zero a new card feed cycle will be initiated. On the other hand, if any wheel or wheels do not stand on zero there will be no initiation of a card feed cycle. Under this latter condition the operator will be apprised that a card is incorrect and such card can be manually removed from the machine.

Referring to Fig. 22h for checking multiplying, a plug connection will be made from socket 378 to a selected one of the sockets 379 depending upon the number of columns to be checked. Assuming all the LQ accumulator elements to stand on zero, a circuit will be completed from ground, from socket 378 through the plug connection to the selected socket 379 and thence via the brushes and zero spots of one section of LQR out and through cam contacts CC—29 via wire 380 (see also Fig. 22d) to and through the now closed P—1 contacts, through the E—2 contacts now closed, through the JJ—2 contacts now closed, through the stop key contacts 303 to the card feed clutch magnet 304 and back to line through the D—1 contacts. As in regular multiplying a branch circuit is effective to energize clutch magnet 312. This will re-initiate a new card feed. In the event that one or more of the elements of the LQ accumulator does not stand on zero, this circuit will not be completed and the operator will be apprised that an incorrect card must be removed from the card run. Upon removal of such card a new operation can be initiated by depression of a supplemental start key 381. It may be mentioned that on checking operations the AJ—12 contacts are normally in open position.

While the LQ accumulator is brought back to a zero condition, if a check condition occurs, such accumulator will not be back at zero if a check condition is not obtained. Accordingly, for a non-checking condition provision must be made for resetting the LQ accumulator to zero before a new computation pertaining to a following card can be started. Since provision must be made for LQ reset on a non-check condition, for simplicity of construction such LQ accumulator is reset both on a check condition and a non-check condition. Reset of this accumulator is timed so as to occur in the first machine cycle of the card feed cycle concurrently with RD reset. The circuit to the 321RD reset relay coil is from the AK—5 contacts, through XC—9, through 321RD. On checking operations there is a branch circuit extending from the lower of the AK—5 contacts, through the non-shifted AK—4 contacts, through the now shifted AS—9 contacts, through the 321LQ reset relay coil. This brings about LQ reset concurrently with RD reset. It seems unnecessary to trace the resetting circuits for the actual effecting of 321LQ reset as they are the same as previously traced.

On checking multiplying operations it is desirable to save time in passing the card out of the punch and to rapidly advance it to the eject position.

Referring to Fig. 22c, on checking multiplying the contacts AS—5 will be open. Likewise, contacts AS—6 (Fig. 22d) will be open and contacts AS—8 will be in shifted position. The shift of the latter contacts AS—8 will cut off the punch read-out strip. The opening of contacts AS—5 will prevent energization of Zu and AAu and the opening of contacts AS—6 (Fig. 22d) will prevent energization of relay coil AB. However, relay coil A will become energized upon closure of CC—4 when RD—7 close. Therefore, the card will be advanced through the punch with no recording thereon at the successive columnar positions.

Regular dividing

On regular dividing operations (see Fig. 39), the various ML devices are utilized to afford all nine digital multiples of the divisor. The dividend amount is introduced into the RD accumulator. The successive quotient digits as they are obtained are set up in LQ. The MP receiving device is not utilized on dividing. Likewise the SP receiving device is not utilized on regular dividing but such device is used in checking dividing. Generally, the method of dividing which is used involves the concurrent comparing of all of the available digital multiples of the divisor with a comparison portion of the dividend on the dividend receiving device. By such comparison there is a determination of which is the largest multiple of the divisor which is less than or equal to the comparison portion of the dividend. Having made such determination there is a selection of the corresponding quotient digit and such quotient digit is entered into the quotient receiving device LQ. Also the selected largest going multiple of the divisor is subtracted from the comparison portion of the dividend. Further operations then follow for another dividend comparison operation and so on until the computation is complete.

It may be further explained that if none of the divisor multiples are contained in the comparison portion of the dividend which is being compared, there is a new comparison effected immediately with a newly selected comparison portion of the dividend and that there are no idle cycles taken up either with unnecessary subtractions or for the introduction of a zero or zeros in the quotient receiving device.

Before explaining the detailed operation of the machine for dividing, it may be explained that to save calculating time on dividing, provision is made to shift the entry of significant divisor and dividend amounts to the left in their respective entry receiving devices. Such shift to the left is effected to as many columns as is possible.

It may be explained that the divisor itself is entered in ML—1—2 as far to the left as possible, but in the other ML devices which receive entries of the divisor from the card there is one clear column of each receiving device at the extreme left in order to afford columnar capacity for building up operations. In the dividend receiving device the dividend entry is made as far to the left as possible. In order to determine the extent of shift of both the divisor and the dividend, provision is made for pre-sensing the divisor and dividend fields of the card in a cycle preceding the actual entry cycle.

Adjusting the machine for dividing operations

When the machine is to be utilized for dividing the insertible dividing plugboard of Fig. 26 is first properly plugged up or it may be pre-plugged for a typical computation and thereafter this plugboard is inserted in the plugboard unit. On such insertible board there is a plug connection between socket 364 (Fig. 22h) and socket 382. With such plug connection established, relay coil AK becomes energized and such relay remains energized throughout all dividing computations. All of the various contacts controlled by relay coil AK shift to reverse position from that shown on the circuit diagram.

Pre-sensing and entry shift controls

Referring to Fig. 1a, the set-up relay units N—R and TT are provided, which in general construction, are similar to the CY unit previously described and shown in Fig. 17. In the N—R and TT units the tripping magnets are designated N and R with suitable suffixes indicating columnar order and in the TT unit the magnets are designated TT with suitable order suffixes. It will be understood that these magnets, N, R and TT are generally similar to the AD magnets of Fig. 17. Only the N—R unit, however, is used in regular and rate dividing computations.

The insertible plugboard affords plug connections between sockets 383 (Fig. 22g) and sockets 367 (Fig. 22a) for the divisor field and other plug connections are provided between 384 and 367 for the dividend field.

Figure 11:
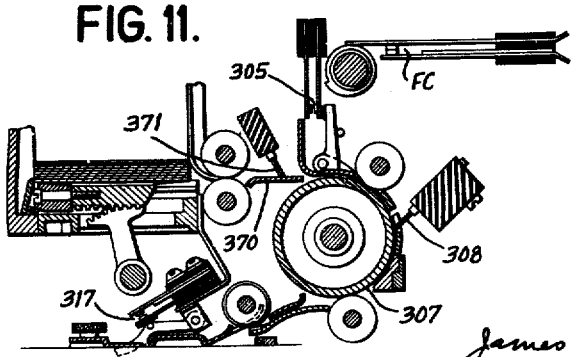
Figure 12:
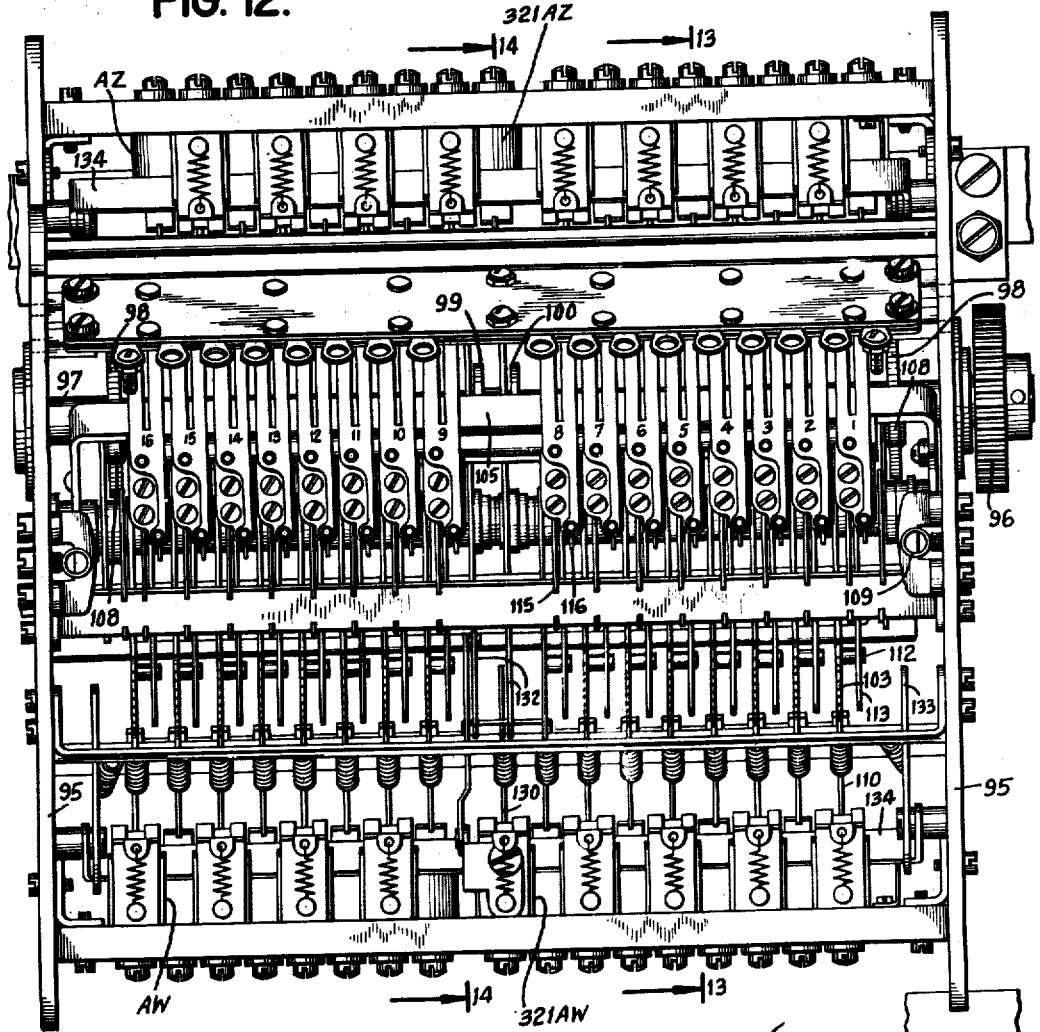
Fig. 12 is a rear elevational view of one of the so-called comparing units of the machine.

With cards in the supply magazine, machine operations are initiated by depressing the start key in generally the same manner as explained for regular multiplying operations. During the card feed cycle when the first card is brought to a position about to be traversed by brushes 308 (Fig. 11) this first card will have traversed the advance pre-sensing brushes 371. The card will finally come to rest with such advance brushes on the "11" index point, but enroute to this point the brushes will have traversed the zero index point position of the card. During such transit the advance brushes pre-sense the presence of zeros to the left of the highest order significant digit of the amount in dividend and divisor fields.

Figure 39:
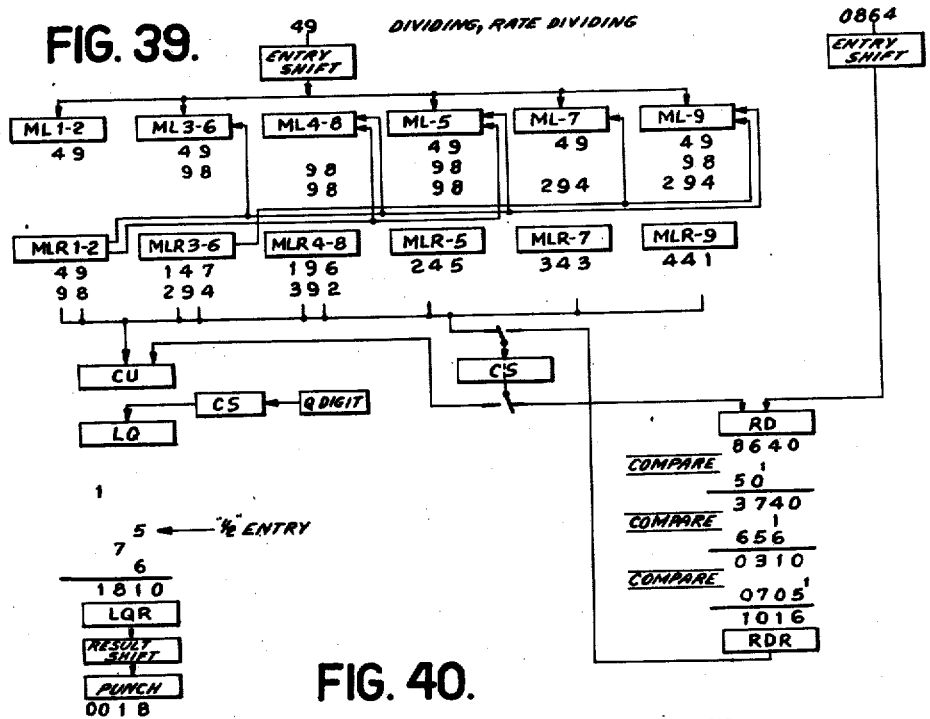

It will be assumed that the machine is performing the division calculation of Fig. 39. With this particular calculation there is a zero to the left of the highest order significant digit, i. e., 8, in the dividend field. Accordingly, on transit of the card past the advance brushes a circuit is established traced as follows: Line 301 (Fig. 22e), through the G—1 contacts now closed, via line 369, through cam contacts FC—7 (Fig. 22a) which are closed at the time the zero index point of the card passes the pre-sensing brushes, thence to common conductor 370, through one of the brushes 371, through plug connection between socket 367 and the left hand socket 384 (Fig. 22g) through the non-shifted AN—11 contacts, to and through the Nth magnet and back to ground. It will be understood that if there was a zero or zeros before the highest order significant digit in the divisor field one or more of the R magnets would be energized. With the Nth magnet energized, the contacts controlled thereby in the relay unit are tripped to reverse position from that shown on the diagram.

As in regular multiplying operations a further card feed cycle now ensues and the card is traversed past the main sensing brushes. The amount of the divisor is entered into the divisor multiple receiving devices ML and the dividend is entered into the RD receiving device.

For entry of the divisor amount the relay coil Tt becomes energized in the same manner as described for regular multiplication. With such coil energized the Tt—2 contacts (Fig. 22a) close and permit entry of the divisor amount into the ML devices. The entry is substantially the same as the entry of the multiplicand amount in such devices for multiplication.

It may be mentioned that with the problem under consideration (Fig. 39) there is no shift of the divisor on entry, but the machine provides for such shift of the divisor on entry. Assume, for example, that in place of 49 as the divisor that the divisor was 09. In this event magnet Rt (Fig. 22g) would be energized. With Rt energized contacts Rt—1 (Fig. 22c) will be tripped to reverse position from that shown. Accordingly, in place of energizing relay coil Tt relay coil Tu would be energized. Such relay energization would be during the card analyzing cycle. Now referring to Fig. 22a with relay coil Tu energized the Tu—2 contacts would be closed and if the entry circuit from these contacts be traced it will be noted that the 9 amount, in place of being routed to the units order 313ML—1—2 accumulator magnet, would be routed to the tens order of such accumulator. The 9 likewise would also be routed to the tens order of the other multiple receiving accumulators which receive the amount direct from the card upon the entry cycle.

Considering now the entry shift of the dividend amount it has been previously explained that relay coil Nth (Fig. 22g) was energized in the pre-sensing cycle. Such relay when energized trips the Nth—1 contacts (Fig. 22c) to a reverse position from that shown. On the cycle when the card is analyzed and the dividend entry is made a circuit is established from ground through the now closed G—2 contacts, through FC—11, through either of the contacts NN—5 or AH—2, through the non-shifted NN—3 contacts and the AN—2 contacts, through the now closed AK—11 contacts, to and through the tripped Nth—1 contacts, through the non-tripped Nh—1 contacts to the Sh relay magnet and back to line 301. Energization of Sh (Fig. 22c) will close the Sh—2 contacts and will establish a shifted entry relation for the dividend entry between lines 374 and lines 351a, which lines 351a (see Fig. 22g) utimately connect to the 351 lines which lead to the 313RD accumulator magnets. By reason of the column shift contacts Sh—2 (Fig. 22c) the dividend amount of 864 will be entered as far to the left as possible in the RD accumulator.

Summarizing, the foregoing includes a column shift arrangement between the lines coming from the reading brushes through the plugboard and the lines which lead to the RD accumulator. Selective column shift will be effected according to the number of zeros preceding the highest order significant digit. For example, if in place of one zero there were two zeros preceding the highest order significant digit of the dividend there would be a further column shift, this being effected by closure of the St—2 group of contacts.

At this point it may be explained that it is necessary to retain a set up which corresponds to the entry column shift control for controlling final recording operations after the division calculation is complete. Such set up is retained on selected V and W relay coils (Fig. 22c). Relay coil Sh was energized and with such coil energized there will be an energization of Vh which relay is retained energized for controlling shift back upon recording. Likewise relay coil Tt was energized so there is a corresponding energization of Wt which relay is retained energized for controlling recording.

Referring to Fig. 22c before contacts FC—11 open a circuit is established from ground through the XC—4 contacts, the AN—19, AL—4, AM—5 contacts in the position shown, through the now closed Sh—1 contacts, through the AR—7 contacts in nonshifted position, through the Vh relay coil, through the AR—13 contacts in the position shown, through the now closed AK—10 contacts and back to line 301. This will energize relay coil Vh and such coil, upon being energized, closes its stick contacts Vh—1, the return circuit being completed to ground through cam contacts FC—5 now closed. A branch circuit also extends through the now closed Tt—1 contacts, through the non-shifted AN—15 contacts to and through the Wt relay coil and back to line through the non-shifted AN—21 contacts and the now closed A—10 contacts to line 301. Relay coil Wt once energized is maintained energized through the stick contacts Wt—1 and the return circuit extends through the non-shifted AL—5 contacts and FC—5 cam contacts to ground.

After the foregoing operations are effected and during the following machine cycles which ensue, multiples of the divisor amount are built up on the various ML devices and since this build-up is effected exactly in the same manner as for regular multiplying it need not be described in detail.

It should be mentioned that during the second half of a card feed cycle there is a reset of the N—R set-up unit. Late in the first half of the card feed cycle cam contacts XC—5 close (Fig. 22d) and a circuit is completed from ground through relay contacts AN—20 and AL—3, now in position shown, through the reset clutch magnet 321N—R through the now closed AK—25 contacts to line 301. Energization of 321N—R releases the one revolution clutch (see Fig. 1a) so that any previously tripped N—1 and R—1 contacts may be latched up in order that they may again be tripped near the end of the card feed cycle when pre-sensing of a following record card is effected.

On multiplying operations the 321LQ reset relay was energized to initiate computing operations under the control of cam contacts CC—27, through a circuit fully traced. On dividing calculations relay coil AK is energized. Accordingly, the circuit to 321LQ is from the CC—3 cam contacts, through the now shifted AK—1 contacts and through the circuit previously traced for multiplying operations down to and through the 321LQ reset relay coil. With 321LQ energized, reset of LQ occurs in the same manner as explained for multiplying. Such reset brings about energization of the computing initiating coil JJ (Fig. 22d) in the manner previously explained. Also upon LQ reset the LQ—12 contacts (Fig. 22f) are closed. Accordingly, inasmuch as the machine is set for dividing and contacts AK—7 are closed, current will be supplied through cam contacts CC—17, through AK—7, through LQ—12 to the divisor reset coils 321—AZ in the comparing units (see Fig. 14). This will release all of the divisor side sectors and allow them to be restored so as to be in position to receive a setting of the divisor multiples thereon.

The machine is now ready to compare the comparison portion of the dividend with all of the divisor multiples. In general this is effected by reading out a comparison portion of the dividend from the RDR device, setting such portion of the dividend up on one side of all sections of the comparing units and at the same time reading out from the multiple readouts the various divisor multiples, each of which multiples becomes set up on one section on the other side of the comparing units. This operation will now be traced on the circuit diagram.

It will be recalled that during multiplying operations the comparing units CU were not in operation. In dividing computations, however, such units are placed in operation. This is effected by maintaining energized the clutch magnet 342, (Figs. 1a and 22d). The circuit for energizing clutch magnet 342 is completed from line 301 through the closed AK—25 contacts, through 342 and to ground. The maintained energization of 342 releases a one revolution clutch to place the drive shafts 94 and 97 of the Cu units (Fig. 1a) in timed operation with shaft 50.

A comparing cycle is initiated by the energization of relay coil LL (Fig. 22f) which becomes energized in the following manner. As previously explained, the computing initiating relay JJ was energized upon LQ reset. Energization of such relay closed contacts JJ—3 (Fig. 22f). A circuit is completed from line 301 (Fig. 22f) through the now shifted AK—9 contacts, through the CC—9 contacts, and through all of the 0—Cu—1, 0—Cu—1, etc., transfer contacts now in the position shown and finally through the 0—Cu—1 contacts, through the JJ—3 contacts now closed, through the LL relay coil and back to ground. LL once energized is provided with a stick circuit extending back to line 301 through stick contacts LL—1 and cam contacts CC—13. After the foregoing stick circuit is established cam contacts CC—14 close and establish a circuit through the non-shifted H—2 contacts to energize magnet 340SB of the SB stepping switch. With magnet 340SB energized the switch arms SB of this relay (Fig. 22f, top) are stepped to the first contact position.

Shortly after the switch arms of the stepping relay have advanced to this position, a circuit is completed from line 301, through the H—4 contacts now closed, through cam contacts CC—8, through the switch arm of the stepping relay, through the CSa column shift relay coil and back to ground. Another circuit is established through the CC—11 contacts, through the LL—2 contacts now closed, through the stepping relay switch arm, through the BB relay coil and back to ground. A branch circuit is also established to energize relay coil DD. With coils BB and DD energized, they are maintained energized by their respective stick contacts BB—29 and DD—1, the stick circuit extending back to line through cam contacts CC—10.

It may be explained that column shift relay CSa and relay coil DD cooperate to control the readout of the dividend comparison portion from RDR and contacts BB are utilized to control the readout of the various divisor multiples from the MLR readout devices.

The manner in which a comparison portion of the dividend is set up on the comparing units will now be described. It will be understood that the comparison portion of the dividend includes a selected number of columns. The number of columns selected is determined by the CSa relay. Referring to Fig. 22c a circuit is completed from line 301, via wire 347 (see also Fig. 22g) to and through the now shifted DD—9 contacts, to an add emitter 348. With such emitter in circuit, impulses are emitted through RDR, through the non-shifted RD—1—4 contacts, via a set of lines 385, through the now shifted DD—5—8 contacts, through the now closed CSa—1—2 contacts, via lines 386, through the shifted DD—2—4 contacts, via lines 387 (see also Fig. 22c) and to the dividend side comparing magnets generally designated 1—AW, 2—AW, etc.

It will be understood that the comparison portion of the dividend is set up in multiple in the comparing units, that is to say, there are nine identical set-ups, of the comparison portion of the dividend in order that there can be comparing between each set-up and nine different divisor multiples. In the typical problem under consideration, the comparison portion of the dividend which was so set up is the amount of 86 (see Fig. 39). The set-up of the multiples of the divisor on the other side of the comparing unit sections will now be described.

It has been previously explained how relay coil BB (Fig. 22f) becomes energized. With such relay coil energized all of the contacts BB—1—27 (Fig. 22b) become closed. In addition the BB—28 contacts shift to a reverse position. Add emitter 314 will be placed in circuit in the following manner: From line 301 to the non-shifted MM—1 contacts, through the shifted BB—28 contacts, through the non-shifted AM—4 and ML—19 contacts to the add emitter 314. Such add emitter will emit impulses to and through all of the MLR readout devices and the multiple amounts available on such readouts will be individually transmitted through the now closed BB—1—27 contacts, to the various divisor multiple comparing magnets 1—AZ, 2—AZ, 3—AZ, etc. It will be understood that the divisor multiple side of the comparing units will receive settings of the different divisor multiples. The comparing units operate in the manner previously explained to make suitable settings of the brushes upon the comparing commutators.

Having entered both the dividend comparison portion in a multiple manner into the comparing units and having entered the various multiples of the divisor in the other side of such comparing units the brush devices of the comparing units receive their settings, in the manner previously explained, to indicate a greater than, an equal to or a less than condition. As shown in Fig. 22c, the comparing unit commutators are in sections, one section being provided for each multiple.

Referring to Fig. 22c top, it will be noted that the comparing unit commutators are shown as sectionalized one for each multiple. For each section there is an associated relay coil such as 9—CU for a 9 multiple, an 8—CU for an 8 multiple and so on. The brush action of the comparing devices is adapted to prevent energization of all magnets relating to multiples which are higher than the comparison portion of the dividend and to permit energization of magnets related to multiples equal to or less than the comparison portion of the dividend.

With the problem of Fig. 39, the only magnet which will be energized is relay magnet 1—CU. The circuit energizing this magnet is from line 301 (Fig. 22g), via wire 388 (see also Fig. 22c), through cam contacts CC—12, relay contacts DD—22 now closed, through the commutator associated with 1—CU, through contacts AM—8 in non-shifted position, through 1—CU and back to ground. At this point it may be explained that if the 4 multiple was the selected multiple, the 4—CU coil, the 3—CU coil, the 2—CU coil and the 1—CU coil would be energized and all higher number magnets above 4—CU would not be energized.

It may be explained that on a comparing cycle which takes a single machine cycle the set-up of the comparison portion of the dividend and of all the divisor multiples is made during the first portion of the comparing cycle. Immediately after the set-up is made and in the same machine cycle testing is effected. All testing is done concurrently for all multiples.

Referring now to Fig. 22f the energization of relay coil 1—CU will have shifted relay contacts 1—CU—1 to reverse position from that shown and upon closure of CC—9, current flows through contacts 1—CU—1, to and through the 1—X multiple selecting relay and through the MM relay to ground. The multiple selecting relay 1—X is maintained energized through stick contacts 1—X—1, the stick circuit extending back to line through CC—15. It may be mentioned that this 1—X relay coil is energized in one cycle just after the commutator test is made and that such relay is maintained energized through a portion of the next cycle to select the 1 multiple which is to be read out from the MLR—1 device and which multiple is to be subtracted from the dividend comparison portion of the divisor. The 1—X multiple selecting relay also selects a related quotient digit for entry into the quotient receiving device LQ. Relay coil MM is maintained energized as long as the 1—X coil is maintained energized, being in circuit therewith.

Previously when subtractive entries were made for resetting purposes the elusive 1 which was introduced into the accumulator to bring the all 9 setting of the accumulator wheels to a zero setting was introduced after the complementary entry. In subtracting the divisor multiple, however, the elusive 1 entry is made during a comparing cycle. In this connection it is to be noted that such elusive 1 is only introduced into the RD accumulator in the event that a multiple is to be subtractively introduced into such accumulator in the following cycle. If no such multiple is to be introduced the entry of such elusive 1 in the comparing cycle is suppressed.

At the carry time in the comparing cycle, the carry impulse flows from line 324 (Fig. 22g) through the now closed MM—2 contacts, through the AK—21 contacts now in shifted position, through the CSa—3 contacts now in shifted position, to and through the 313RD accumulator magnet in the hundreds order. It may be explained that the order in which such entry is made is selected under control of coil CSa, in this instance, by the CSa—3 contacts. Such carry impulse for subsequent steps of the computation will be introduced into other orders.

It has been explained that if there was no going multiple for any given comparison portion of the dividend that no elusive 1 entry would be made. Such entry is suppressed because of the fact that, in the event that no going multiple is found on test none of the X magnets will be energized because none of the 0—CU, 1—CU to 9—CU relays will be energized. With no X coil energized there will be no energization of coil MM and accordingly with MM de-energized the MM—2 contacts will remain open and no elusive 1 entry can be effected. On a comparing cycle with a relay coil such as 1—CU energized, the energizing circuit to coil LL (Fig. 22f) will be interrupted, since a shift of contacts 1—CU—1 cut off the circuit.

Unless LL is energized it is impossible to energize the stepping switch magnet SB. All of the SB switch arms remain on their first contact position and inasmuch as contacts LL—2 are open, even though cam contacts CC—11 close, there will be no energization of either BB or DD. However, relay coil CSa will be energized again under the control of CC—8 on the next machine cycle following the above described comparing cycle. Accordingly, the CSa1—2 contacts (Fig. 22g) will be again closed on the following machine cycle after the comparing cycle. In such cycle, the relay MM is maintained energized as explained before. Accordingly, relay contacts MM—1 (Fig. 22b) will shift to reverse position from that shown and a circuit will be established from line through the MM—1 contacts in shifted position to the subtract emitter 344.

Such emitter will emit nines complemental impulses through the MLR—1 readout only. Impulses flow out of this readout, through the 1—X—2—4 contacts which are maintained closed by the energization of 1—X during this cycle. Nines complementary impulses representative of the nines complemental of 49, i. e., 50, flow over the lines 333 (Figs. 22b, 22f and 22g), through the contacts DD—2—4, in the position shown, over the lines 386, through the now closed CSa1—2 contacts, through the non-shifted DD—5—8 contacts and into the proper columnar orders of the RD accumulator energizing the proper of the 313RD magnets. This operation will deduct the amount of 49 from the amount of 86, the comparison portion of the dividend in this accumulator (see Fig. 39). It will be recalled that the elusive 1 entry into this accumulator has been previously made and that the regular transfer mechanism of the accumulator will provide for transfer to higher orders when required.

*Entry of quotient digit*

With the multiple selecting relay coil 1—X energized a supplemental contact 1—X—5 (Fig. 22g) will be closed. The DD—9, the AM—2 and the RD—6 contacts are now in the position shown and accordingly add emitter 348 is in circuit. A "1" impulse is emitted through the 1 bus of RDR, through the now closed 1—X—5 contact, through the AK—22 and CSa—4 contacts now closed, through ZZ—2 contact in the position shown, to the left hand accumulator magnet of LQ. This will enter the quotient digit of 1 in such accumulator.

On the quotient entering and subtracting cycle, inasmuch as the DD relay coil was not energized, contacts DD—22 (Fig. 22c) are in open position. Accordingly, even if CC—12 contacts close there will be no energization of any of the CU relays. Accordingly with none of such coils energized the 0—CU—1, the 1—CU—1, etc., contacts of Fig. 22f remain in the position shown and upon closure of CC—9 current supply is afforded through the JJ—3 contacts to energize relay coil LL. Relay coil LL when energized will close its stick contacts as before described and there will be another energization of stepping relay coil 340 SB under the control of contacts CC—14. Accordingly, switch arms of SB will step to the second contact position. After comparison is made with one dividend comparison portion at the time the multiple selecting relays are energized under control of contacts CC—9 a supplemental circuit is established through coils 321—AW to ground. These coils are the reset coils of the comparing unit pertaining to the comparison portion of the dividend (see Fig. 14). With such coils energized the dividend comparison side of the comparing units becomes restored so that a new dividend comparison portion can be introduced therein. It will be understood that the divisor multiple side of the comparing unit retains the divisor multiples during all deducting and quotient entering operations.

Referring to Fig. 39, the RD accumulator now has standing in it the remainder amount of 3740. There is now to be another comparison operation and with such comparison operation there is a different comparison portion of the dividend which is selected for comparison. In Fig. 39 it will be noted that the first comparison which has been previously described pertains to the two extreme left-hand orders of the dividend and the second comparison pertains to the next three orders. There must, accordingly, be a column shift to take a different comparison portion of the dividend from the RD receiving device.

It has been previously explained how the SB stepping switch was brought to the second contact position. It was also explained that the relay coil LL was energized. With relay coil LL energized relay contacts LL—2 (Fig. 22f) are closed and accordingly upon closure of cam contacts CC—11 a circuit is completed through a switch arm of the stepping switch to energize relay coil DD. It will be noted that there is no energization of relay coil BB because the second contact of the stepping switch and those thereafter are not wired in circuit to relay coil BB. Accordingly, at this time there is no energization of relay coil BB. With relay coil DD energized, it is maintained energized in the customary manner and following its energization cam contacts CC—8 close and a circuit is established to energize column shift coil CSb. It will be noted that relay coil CSa is not now energized since the switch arm of the stepping switch is in the second contact position and out of circuit with CSa. With the coil CSb and relay coil DD energized, their associated contacts shift to a reverse position from that shown in the circuit diagram.

Referring to Fig. 22g with coil CSb energized, contacts CSb—1—3 close and there is a new readout relation established with RDR. The readout relation is now such that the three left hand columns of RDR are selected for readout and for controlling the entry into the dividend side of the comparing units. The entry circuit will now be traced. From line 347 (Figs. 22c and 22g), through the DD—9 contacts now shifted, to the add emitter 348, from the add emitter impulses are emitted through the three left hand columns of RDR, through the contacts RD—1—3 in the position shown, to lines 385, thence through the DD—5—7 and AK—18—20 contacts now shifted, through the closed CSb—1—3 contacts, through the shifted AK—15—17 contacts, lines 386, thence through the now shifted DD—2—4 contacts, to lines 387, thence to Fig. 22c and to the various 1—AW, 2—AW, etc., comparing unit magnets. This operation will have set up the new comparison portion of the dividend, viz. 374 in the various comparing units.

It will be recalled that the divisor multiples still remain set up in the divisor side of the comparison units. There is then a further comparison effected and the comparison commutators and circuits of the comparing unit bring about an energization of all of the CU coils from 1—CU up to and including 7—CU but leaves coils 8—CU and 9—CU de-energized. With the 7—CU comparison relay coil energized, the related relay coil 7—X (Fig. 22f) becomes energized under the control of CC—9, over the circuit previously described, but which in this instance, is completed through the now shifted 7—CU—1 contacts to the multiple selecting relay 7—X. When relay coil 7—X is energized relay coil MM likewise becomes energized in the manner previously explained. Both 7—X and MM are held energized through the 7—X—1 stick contacts.

In the comparing cycle and at the carry time in such cycle, provision is made for introducing an elusive 1 into the RD accumulater in the third order from the left. Such elusive 1 entry is made generally in the manner previously explained except that at this time the CSb—4 (Fig. 22g) contacts are in shifted position due to the energization of CSb. With relay coil MM energized, the MM—2 contacts are closed and a circuit is completed from line 324 at the carry time, through MM—2, through the now shifted AK—38 contacts, through the now shifted CSb—4 contacts, down to and through the tens order 313RD accumulator magnet. This will enter the elusive 1 in such order. On the following cycle the 7 divisor multiple is entered subtractively into the RD accumulator and the 7 quotient digit is entered into the proper columnar order of LQ.

Referring to Fig. 22b energization of the 7—X multiple selecting relay coil, brought about as previously explained, will close the 7—X—2—4 contacts. The energization of relay coil MM will shift MM—1 contacts to reverse position and place the nines complementary emitter 344 in circuit with line 301. Nines complementary impulses flow from the 344 emitter, through the MLR—7 readout, out through the 7—X—2—4 contacts to the lines 333 (see also Figs. 22f and 22g), through the non-shifted DD—2—4 contacts (DD having now become de-energized), through the shifted AK—15—17 contacts, through the shifted CSb—1—3 contacts, CSb having been re-energized in such cycle since the stepping relay SB remains on the two contact position, through the AK—18—20 contacts now shifted, through the DD—5—7 contacts in the position shown, to lines 351, to the three left hand accumulator magnets of the RD accumulator. This will enter the nines complement of the 7 multiple of the divisor into such accumulator. Concurrently with the foregoing deducting operation the 7 quotient digit is entered into RD. The energization of relay coil 7—X will have closed contacts 7—X—5 (Fig. 22g). Add emitter 348 will now be in a circuit which extends through the DD—9, AM—2, and the RD—6 contacts in the position shown. A current impulse will be emitted from the 7 spot of the add emitter 348 to and through the RDR readout and through the closed 7—X—5 contacts, through the AK—22, the CSb—5, and the AK—12 contacts now closed, down to the hundreds order of accumulator magnet of the LQ accumulator. This will enter the 7 quotient digit in such order of this accumulator.

Referring to Fig. 39, it will be noted that in the typical computation there illustrated, there was a half entry of 5 in the third from the left quotient place. It will be assumed that the calculation being effected does not involve such half entry. The computation then is completed and termination of the computation is to be controlled by the place limiting device which is provided for this purpose.

*Place limiting device*

Referring to Fig. 22f, the insertible plugboard will have provided a plug connection from socket 389 to the second socket 390 from the left. The second socket from the left is plugged up because the computation is to be carried to two quotient places. If the computation was to be carried to further quotient places the third or fourth socket 390 from the left would be plugged up. During the multiple deducting cycle just described, relay coil DD will be de-energized and accordingly the DD—22 contacts (Fig. 22c) remain in open position. There will accordingly be no energization of any of the CU relay coils. With none of such relay coils energized, the 0—CU—1 to 9—CU—1 contacts (Fig. 22f) will remain in the position shown so that upon closure of cam contacts CC—9, relay coil LL will become energized. With such relay coil LL energized, the relay contacts LL—3 will be closed and upon closure of CC—17, the circuit will be completed through LL—3, through the switch arm of the stepping switch now still in the second contact position, through the J—4 contacts in the position shown, through the plug connection from socket 390 to socket 389 to energize relay coil H. H being energized, closes its stick contacts H—1 and the stick circuit is completed back to line through the AK—37 contacts now in shifted position and through the RD—11 contacts which are in the position shown, to line 301.

The energization of relay coil H will have shifted relay contacts H—2 to a reverse position from that shown at a time prior to the closure of cam contacts CC—14. Accordingly, with such CC—14 contacts closed, a circuit is completed through the stick contacts of LL—1 of LL, through the CC—14 contacts, to the release magnet 341SB of the stepping switch. With this operation, due to the shift of contacts H—2, the stepping switch magnet 340SB will be out of circuit. Energization of the 341SB release magnet will release the stepping switch and allow it to return to normal home position, i. e., the position shown in the circuit diagram. It may be mentioned that no circuits are inadvertently established by the switch arms on SB on restoration because on restoration the H—4 relay contacts are in open position. The foregoing restoration of the stepping switch and opening of contacts H—4 terminates further energization of the CS magnets, the BB or the DD magnets.

The machine has now reached the stage in its operation in which it is ready to record the quotient upon the record. The various ML multiple receiving accumulators can now be reset and the RD device can also be reset. Before recording is effected there must be a change in the readout relation between LQR and the punch, according to the entry shift which was previously made upon entry of the divisor and dividend amounts. Reset of the ML devices is brought about in the following manner. Energization of relay coil H (Fig. 22f) in the manner previously explained will have caused closure of relay contacts H—3 (Fig. 22e). Upon closure of CC—3, a circuit is established from line 301, through the AK—1 contacts now in shifted position, through contacts H—3 and AK—2 now closed, to line 337.

Line 337 ultimately extends to Fig. 22h and the circuit from such line is completed through the now closed J—2 contacts, through the switch arm of the stepping switch SE now in the position shown, back to line 338 which ultimately extends to Fig. 22e. From line 338, the circuit is completed through the now closed G—3 contacts, to and through the 321ML reset relay coil to ground. A branch circuit is also completed from line 338 to the AE—5 contacts now in the position shown, through the AK—5 contacts now shifted, through the XC—9 cam contacts, to and through the 321RD reset relay coil and back to ground. Energization of 321ML and the 321RD reset coils will bring about electric reset of the corresponding accumulators. The detailed reset circuits will not be traced as these have been previously traced. The energization of the 321RD relay also serves to deenergize the computing initiating relay coil JJ as follows: Opening of contacts RD—9 (Fig. 22d) breaks the stick circuit for coil JJ, which stick circuit extends to the now shifted AK—24 contacts. Actual de-energization of coil JJ is timed by the CC—18 cam contacts following the opening of RD—9.

It will be recalled that upon multiplying operations relay coils AAu and Zu were only energized just prior to recording. On dividing operations however, due to a shift in the entry of the divisor and dividend there must be a selected energization of the Z and AA coils. With the computation under consideration the coils which will be energized on dividing are AAt and Zh. The selected energization of the Z and AA coils is brought about under control of the pre-sensing control, which pre-sensing control it will be recalled, has effected certain selected energization of W and V relay coils, viz., the W$t$ and V$h$ relay coils in the example under consideration.

The energization of 321RD (Fig. 22e) brought about as previously explained, will have caused closure of contacts RD—7 (Fig. 22c). Upon closure of cam contacts CC—4, the circuit is established through the now closed RD—7 contacts, through the AE—6 contacts, through the AS—5 contacts, through either of the AT—16 or AK—35 contacts, through the W$t$—2 contacts to energize relay coil AA$t$. There is also an energizing circuit for relay coil Z$h$ through the V$h$—2 contacts. It will be recalled that relay coils V$h$ and W$t$ will have been energized under the presensing control previously described to bring about closure of V$h$—2 and W$t$—2. A branch circuit is also completed through RD—7, AE—6, to line 352, which circuit extends to Fig. 22d and brings about energization of relay coils A and AB in the manner previously explained.

All of the relay coils A, AB, AA$t$, Z$h$ will be maintained energized through the A—1 stick contacts, the circuit extending back to line through the LQ—7 contacts, the AS—7 contacts in the position shown, to ground.

Referring to Fig. 22h, it will be noted that there is a column shifting arrangement intermediate plug sockets 355, which are sockets which are connected to the punch readout strip sockets 356 (Fig. 22d) and LQR (Fig. 22h). Such column shifting arrangement is provided by the multi-contacts controlled by the various Z relays and the AA relays. The AA relays are selectively energized according to the entry shift of the divisor upon entry and the Z relay coils are selectively energized according to the entry shift of the dividend upon entry. With relay coils AA$t$ and Z$h$ energized, there will be a closure of the related contacts AA$t$—1—7 and Z$h$—1—7 and the closure of these contacts in combination will establish a readout relation between LQR and the sockets 355 so that there will be a punching not in the extreme left hand field of the record card, but in a field shifted two columns to the right from the extreme left hand field.

It will be assumed that all of the seven sockets labeled 355 (Fig. 22h bottom) are connected to sockets 356 (Fig. 22d). If the circuits from the two left hand sockets of the 355 group and the extreme right hand 355 sockets are traced it will be found that their circuit extends back to a line 391, which line connects to a line 392 and that this circuit is completed back to line 301, through the now closed AB—1 and AB—2 contacts to and through the zero interposer magnet 353. This will provide for punching zeros on the record card in columns of the quotient field not controlled by LQR.

Now referring to the third socket from the left of the 355 group, it will be noted that this circuit is completed through the AA$t$—2 contacts, through the Z$h$—4 contacts, to a line which extends up to the thousands order of LQR. Inasmuch as the brush in this order is standing upon the one punch selecting interposer magnet 1, the one punch selecting interposer magnet 353 will be energized during the punching operation. If the line from the fourth socket from the left of the 355 sockets be traced, it will be noted that this circuit is completed through the AA$t$—4 contacts, through the Z$h$—5 contacts, through the non-shifted GG—1 contacts to the hundreds order of LQR. In this order, the brush is standing on the 7 spot so that the line will be completed through AB—9 contact to and through the seven interposer magnet 353.

Referring now to the two sockets 355, which are in the second and third columns from the right of the group, it will be noted that circuits are completed through AA$t$—5—6 and Z$h$—6—7 through the non-shifted FF—1 and EE—1 contacts to the tens and units orders of LQR. The brushes in these orders stand at zero, therefore there will be a circuit completed from both orders back to the zero interposer punch selecting magnet 353.

The law of operation which the present machine has for controlling shift back upon recording may be expressed by the following formula: The number of columns in which the quotient amount is shifted back to the right upon final recording is determined by the following:

$S_{DD} + (S_{DR} - S'_{DR})$, where $S_{DD}$ = The number of positions, the dividend (DD) is shifted to the left upon entry.

This amount of shift may also be taken to be the maximum number of dividend places available in RD less the actual number of dividend places in the dividend amount and where $S_{DR}$ equals the maximum number of available divisor places in the divisor entry receiving divisor minus one and where $S'_{DR}$ equals the number of columns, the divisor is shifted to the left upon entry. This number of columns may also be taken to be the number of columns the actual divisor is less than the maximum number of available places in the ML entry receiving devices.

Substituting the above values in the formula, we have $1+1-0=2$, which is the number of places that the quotient is shifted back to the right upon final recording under the pre-sensing control.

The foregoing description has explained the circuits for selectively reading out amounts to the punch on final recording. Punching occurs successively column by column in the usual way, the control circuits being those traced in detail for result recording or multiplying, but it may be mentioned that the return circuit from any plug socket 356 is via the punch readout brush to the common strip of the readout, thence via wire 357 (Fig. 22d), through the the SS—2 contacts, the AS—8 contacts, the usual escapement contacts 358 of the punch, through the stick contacts A—1 and thence back to ground. The energization of any interposer magnets 353 (Fig. 22h) closes the interposer controlled punch magnet contacts 359 (Fig. 22g) and energizes the punch magnet 360 in the usual manner. Punching then proceeds in the usual way column by column and eventually the card reaches the beyond last column position and closes P—5 energizing coil B. Energization of B closes contacts B—1 and energizes the eject magnet 361 of the punch. Card eject then occurs and contacts P—3 and P—4 become closed to condition control circuits for a succeeding computation.

It may be explained that with the present embodiment punching operations occur during a cycle in which not only the reset of the ML and the RD devices is effected, but also during a cycle in which card feed of a succeeding card is effected. In this way operating time is saved since recording operations are overlapped with resetting and card feeding operations. Heretofore in dividing machines such an overlap has not been attained. Such overlap is afforded with the instant arrangement because of the fact that the quotient is contained in the LQ accumulator which receives no entry from the card on a card handling operation. Furthermore, such LQ accumulator can be subsequently reset after controlling quotient punching.

Card feed of a new card is brought about in the cycle which immediately follows the ML and RD reset cycle and such card feeding operation is initiated during the ML and RD reset cycle in the following manner. Upon energization of 321RD (Fig. 22e) contacts RD—8 (Fig. 22d) close and upon closure of cam contacts CC—20 a circuit is completed through RD—8, XC—10, AK—23 in shifted position, to and through relay coil E. Coil E is maintained energized by a stick circuit previously described through E—1 and FC—2. Energization of relay coil E closes relay contacts E—2 to condition the circuit for subsequent energization of card feed clutch magnet 304 and the XC clutch magnet 312. Energization of these two magnets occurs upon closure of cam contacts CC—29 (Fig. 22h) which complete a circuit in the manner previously explained.

Inasmuch as a new computation is to follow, provision is made to de-energize the previously energized shift control relays V and W (Fig. 22c). Such de-energization is effected in the beginning of the card feed cycle upon opening of cam contacts FC—5 which interrupts the stick circuits to any of the V or W relay coils which have been previously energized. This operation will place these relays in condition to be set up again under the pre-sensing control of the next card. Computations proceed card by card until all computations on all cards are complete. Following the computation of the last card while there is an energization of the card feed clutch magnet 304 (Fig. 22d) there will be no energization of the XC clutch magnet 312 in view of the fact that the relay contacts G—4 are now open, these being open because coil G is now de-energized, card lever contacts 305 having opened on such last card condition. This prevents unwanted XC cam contact operations.

Rounding off device

In calculating machines, particularly multiplying machines rounding off devices have been utilized to carry a particular calculation to the nearest unit in a particular order. This has been accomplished by entering an amount, say 5, in one order to the right of the order which is to be rounded off and which order is the last order to be recorded by punching. In the present machine rounding off mechanism is also employed but supplemental controls have to be provided in connection with such rounding off for the following reason. Let it be assumed that a computation is to be carried to two quotient places only and that the place limiting devices of the machine are set for such two place quotient. However, if the rounding off feature is employed, the 5 increment must be introduced in an order to the right of the last desired quotient place and if such 5 is introduced into such order then the machine must carry the computation further and terminate the computation not in the last desired quotient place, but in a place or order beyond such last desired place. The place limiting control therefore has to be modified to allow the machine to carry the computation one step or order further than is desired for the last quotient place itself. This change of control brings about and makes necessary a further control. In view of the fact that the machine has computed beyond, say, two orders of quotient digits and in view of the fact that it is only desired to record two orders of quotient digits, provision must be made for preventing recording beyond the last significant quotient place and for entering a zero in such order in which recording of remainder digits is not desired.

The foregoing can best be understood by reference to Fig. 39. In Fig. 39, considering the rounding off or one-half entry, the calculation is there shown as being limited to two places of the quotient. The augmented entry of 5 is placed in an order of LQ just to the right of the order which receives the 7 quotient digit entry. The computation is then carried on beyond this order and a 6 quotient digit entry is made in the next column to the right. The 6 added to the 5 gives a result of 11 giving a carryover of one into the next higher order and producing a final quotient amount of 18. There is, however, a remainder standing in LQ of 10. It is not desired to record the 1, because as regards a quotient result, such 1 is meaningless. Therefore in recording, provision is made for suppressing the recording of the 1 standing in LQR and for recording in lieu thereof a zero derived from another source.

In connection with the rounding off feature, it should be further noted that rounding off is of no consequence or utility unless the quotient result is computed to at least two places. Accordingly, if dividing calculations are made to less than two orders, provision is made for wholly suppressing the rounding off operation, including the entry of a 5 in a selected order.

With dividing calculations, the rounded off order of the quotient may assume a variable column relation on the final record. This will directly depend on the relative magnitude of the entered divisor and dividend and such rounding off column may vary from card to card due to the variable change of the reading out relation in recording the quotient. In short, in dividing, rounding off may occur in a variable final column of the result whereas previously in multiplying, such rounding off column is in a fixed column of the result. In dividing, rounding off is effected in a selected fixed column of the LQ accumulator, but between the LQ accumulator and the punch there is a column shift mechanism so that the ultimate effect on final recording is to vary the column in which rounding off is effected.

To prepare the machine for rounding off operations, the insertible plugboard utilized for such operations will have established a plug connection between socket 393 (Fig. 22g) and one of the group of the 394 sockets. The particular one of the 394 sockets which is plugged for the computation on Fig. 39 is the second socket from the right. Another plug connection will be established between sockets 395 and 396 (Fig. 22d). This latter plug connection will bring about a maintained energization of relay coil J inasmuch as contacts AK—25 are closed throughout all dividing operations.

Referring now to Fig. 22f, with relay coil J energized, relay contacts J3—6 will be in reverse position from that shown and accordingly, with a plug connection between socket 389 and the second 390 socket from the left, signifying a two place quotient computation, the machine will not terminate its computing operations with the arm of the stepping switch SB establishing contact with the second contact spot, but in contradistinction the machine will continue computation until the switch arm establishes contact with the third contact spot. The foregoing control will carry the computations performed by the machine on division to one further cycle beyond that required for the second quotient place.

Referring now to Fig. 22f, energization of relay coil J will shift the J—1 contacts to reverse position from that shown. Such contact shift will place the 340SD stepping switch coil in parallel with the 340SB stepping switch coil so that upon each energization of 340SB there will be an energization of 340SD.

As shown in Fig. 39, the 5 entry is made in the second comparing cycle, viz., the cycle in which the amount of 374 is the dividend comparison portion. Such 5 entry is always made during such comparison cycle. The 5 entry into the selected column of the LQ accumulator is brought about in the following manner. During the cycle mentioned relay coil CSb becomes energized, closing contacts CSb—6 (Fig. 22g). Likewise during the portion of the cycle in which the dividend is being compared, relay coil DD is energized causing closure of contacts DD—14. Cam contacts CC—22 are timed to close at the "5" index point in the cycle. Accordingly, a current impulse will flow at such time from line 301, through CSb—6, through DD—14, through CC—22, via plug connection from socket 393, to the selected socket 394 and thence down to the related columnar order of LQ, in this instance, the third accumulator magnet from the extreme left. This will enter 5 in such accumulator during the above mentioned comparison cycle.

According to the rounding off operation as shown in Fig. 39 relay coil H will become energized not in the second quotient entry cycle, but in the following or third quotient entry cycle. This will be effected by the control which is afforded by relay coil J, J3—6 contacts and the SB stepping relay. By the time the H relay coil has become energized, the quotient digit of 6 (see Fig. 39) will have been entered in the order of LQ which receives the 5 entry. The usual carry will take place and the setting in the hundreds order of LQ will be augmented from 7 to 8.

It has been explained heretofore that the stepping relay magnet 340SD will be energized concurrently with the energization of stepping magnet 340SB. Inasmuch as the SB switch steps to the third contact position, the SD switch (Fig. 22h) will likewise step to the third contact position and place relay coil FF in circuit with line 301. It has been previously explained that under control of contacts RD—7 (Fig. 22c) relay coils AAt and Zh (Fig. 22c) and relay coils A and AB (Fig. 22d) were energized to control punching. At the time such relay coils become energized, a circuit is also completed through relay coil FF (Fig. 22h), via wire 397 (Fig. 22d) to the right side of coil A. Such coil is maintained energized throughout punching operations by the stick circuit extending through contacts A—1 as previously explained. With relay coil FF energized (Fig. 22h), the contacts FF—1 will shift to reverse position and with such contacts shifted, the circuit from the common readout segment in the tens order of LQR will be cut off and such circuit will be completed over to line 392, which it will be recalled, is a circuit to the zero 353 interposer punch selector magnet. Thus in lieu of punching a 1, the amount standing in the tens order of the LQ accumulator, there will be a zero punched on the record card in the related order.

Provision is made to delay release of the SD stepping relay switch arms until after punching is completed in this type of operation. Referring to Fig. 22e, the manner of energization of 321LQ has been previously explained. When such coil becomes energized, a circuit is completed from the AS—9 contacts in the position shown, over through the AK—6 contacts now closed, through cam contacts CC—21, to energize the 341SD release magnet. While there is also an energization of 341SE at this time, this is without effect because the SE relay is now in home position. Energization of 341SD, however, will release the arms of this stepping switch (Fig. 22h) and allow them to return to home position as shown.

*Automatic place limiting controls*

It will be appreciated that the number of quotient places which the machine is adapted to compute depends upon several factors, viz., the number of available places or orders in the dividend receiving device and the number of orders in the divisor. For example, with a dividend receiving device of four orders as here shown with a one place divisor, the machine can compute to four places and no more. On the other hand, if the divisor is a two place divisor, the computing capacity will be limited to three orders. It will also be appreciated that the place limiting plugging previously described can be set say to compute to four orders of quotient places, but the computing capacity of the machine might be reached before such four orders are computed. Such capacity would be reached if a two place divisor was encountered. To take care of such conditions an automatic place limiting mechanism is provided. This automatic place limiting mechanism terminates computing operations in any event when the computing capacity of the machine is reached irrespective of whether this capacity is reached before the pre-set or pre-plugged place limiting order is reached. The automatic place limiting mechanism will also be effective to limit the number of orders computed, even if there be no pre-plugging place limiting.

As previously explained, when rounding off is employed, the computing capacity is automatically increased to an additional quotient place. However, if that quotient place cannot be computed without exceeding the computing capacity of the machine the automatic place limiting mechanism will be in control and will prevent computing when the computing capacity is reached, irrespective of the rounding off mechanism calling for a further order of quotient order computing.

In the previous explanation of dividing computations, it was explained how the W relay coils (Fig. 22c) were selectively energized depending upon the size of the divisor amount. In the particular computation explained, Wt was energized. Such relay coil remains energized during all dividing calculations. With such coil maintained energized, relay contacts Wt—3 (Fig. 22f) become closed and with such contacts closed, it will be appreciated that an energizing circuit is established to relay coil H when the third step of movement of the SB has taken place. Coil H will thus be energized to terminate computing, even though there be no connection whatsoever from the 389 socket to one of the 390 sockets or even if there be a connection from the 389 socket to the extreme right-hand 390 socket. Such connection from 389 to the extreme right-hand socket 390 would tend to call for a four place computation, but the W*t*—3 contacts would terminate such series of computations after three quotient places had been calculated, which is the limit obtainable with a two place divisor amount in this machine. If the divisor amount were one place, relay coil W*u* would be energized and would be maintained energized throughout dividing calculations. Such energized relay would close contacts W*u*—3 and dividing calculations would then be invariably terminated when the stepping switch arm of SB reached its last contact position.

It will be furthermore appreciated that the foregoing controls afforded by contacts W*t*—3 or W*u*—3, will be effective irrespective of the shift of the J3—6 contacts, which contacts assume a shifted position on rounding off operations. Accordingly, the automatic place limiting controls have a predominating control even when augmented calculating is being effected under rounding off control.

Rate dividing

In rate dividing operations the divisor amount is derived from a leading rate or master card which card contains a special perforation in one of the extra index point positions of the card. The dividend amount is on each of the following group of interspersed detail cards. On such rate dividing operations the machine builds up the multiples once for each group of detail cards and retains the build-up until a new master card appears in a run. Upon such master card being reached, the previous build-up is broken down and a new build-up made. Furthermore on rate dividing operations, the pre-sensing control is somewhat modified. Both the divisor field and the dividend field are pre-sensed for every card. However, when the master card is pre-sensed, provision is made to disregard the pre-sensing control derived from the dividend field, but to only take into account the pre-sensing control taken from the divisor field. Thereafter, upon pre-sensing the detail cards of a run, provision is made to disregard any pre-sensing control derived from the divisor field, but to retain the pre-sensing control which was derived from the dividend field. The control setups which are obtained from pre-sensing the divisor field from the master or rate cards are also changed so that the divisor pre-sensing control is retained for all of the following detail cards of the group. This divisor pre-sensing control is thereupon correlated with the dividend pre-sensing control which is individually derived from each detail card. When rate computations pertaining to one group have been completed and the new rate or master card is encountered the previously mentioned controls are broken down and new controls set up.

Special controls are also provided effective on rate dividing whereby idle dividing and recording operations pertaining to master cards are eliminated.

On rate dividing, the insertible plugboard (Fig. 26) will have established a plug connection between socket 364 (Fig. 22*h*) and socket 391. This connection will maintain relay coil AL energized through all rate dividing operations. With relay coil AL energized, relay contacts AL—8 will close and maintain the dividing relay coil AK energized also throughout all rate dividing operations. With both of the coils AL and AK energized, their associated contacts will shift to reverse position from that shown. The regular entry circuits for rate card dividing are the same as for regular dividing. The pre-sensing circuit plug connections for the divisor and dividend fields are also the same. There is, however, a supplemental plug connection provided by the insertible plugboard to enable receipt of a reading from the extra index point position. This plug connection is made between the particular socket 367 in the column in which the extra index perforation occurs to socket 368 (Fig. 22*d*). With cards in the supply hopper the machine is started in the same way as in regular dividing operations.

As the master card traverses the pre-sensing brushes the pre-sensing relays of the N and R groups will be selectively energized as in regular dividing. It will be understood that selected ones of the R magnets will be energized according to the location of zeros in the divisor field of the card and that selected ones of the N magnets will be energized according to the location of zeros in the dividend field of the card. If the leading master card contains no perforations in the dividend field none of the N magnets will become energized.

As in rate multiplying a circuit is completed from the extra index point position through the plug connection from the socket 367 to socket 368. Relay coil NN will become energized since the AL—1 contacts are now closed.

It will be appreciated that as a detail card traverses the pre-sensing brushes the pre-sensing relays of the N and R groups will also be selectively energized. As will be explained later the energization of selected ones of the R relays is ineffective as long as the machine handles detail cards. The energization of selected ones of the N magnets is, however, effective to control shift to the left of the dividend entry from each detail card.

As previously explained for dividing, relay coils R, according to their energization, control the selective energization of relay coils T; likewise relay coils N control the selective energization of the S coils. There are further controls based upon the energization or non-energization of relay coil NN which determine whether an amount derived from the dividend field of the card is to be entered in its receiving accumulator or not. On rate card operations the S relay controls should be rendered ineffective when a master card is being read by the regular reading brushes. Upon analyzing a rate card relay coil NN will be maintained energized during the reading cycle. With such relay coil energized, relay contacts NN—3 (Fig. 22*c*) shift to reverse position. Thus the circuit will be cut off to the various S relay coils. However, with such contacts shifted even though the relay contacts AL—6 are open, the regular circuit is afforded to the T relay coils so that these may become selectively energized to control the selected shift to the left of the divisor entry. In the card feed cycle the amount of the divisor will be entered into the respective ML receiving devices in the manner previously explained and in the following cycles on account of the fact that the XC cams are rotating, there will be the usual build-up of multiples of the divisor in the ML devices as previously explained.

As in regular dividing, provision must be made to store the setting of the T relay coils on selected ones of the W relay coils. Unlike regular dividing operations the divisor relay coil (W) setting must be retained throughout all of the computations pertaining to the following group of detail cards. In order to change the control of the W relay coils from one in which they become de-energized following a computation pertaining to one card, to a different condition in which they remain energized for a run of a group of detail cards, the stick circuit for relay coils W is modified as follows: Such stick circuit extends from contacts such as Wu—1, etc., back to line, through relay contacts AL—5. However, such contacts AL—5 are now in shifted position so that the stick circuit, in place of extending back to ground through cam contacts FC—5, extends back to ground through the now shifted AL—5 contacts and through the ML—5 contacts. Accordingly, the selectively energized relays W will not become de-energized until contacts ML—5 open at the time when the multiple receiving devices are being reset. Contacts ML—5 open upon the energization of 321ML.

Early in the master card reading cycle cam contacts FC—12 (Fig. 22d) close, causing energization of relay coils RR and SS. The stick circuit for coil RR is through the RR—1 contacts, being completed to line through the supplemental punch controlled contacts P—2a. The stick circuit for relay coil SS is through the now closed eject contacts P—4 and contacts RR—1. The master card ultimately reaches the receiving tray of the punch closing card lever contacts 317 and energizing relay coil D. With P—5 closed, relay coil B is also energized and with B and D energized contacts B—2 and D—2 (Fig. 22e) become closed and accordingly there is an energization of the 321LQ reset relay coil as described in regular dividing.

With the master card in the punch tray and with relay D energized, the D—1 contacts (Fig. 22d) shift and upon closure of CC—1, with contacts B—1 closed, there is an energization of the punch rack trip magnet 318 to feed the master card to the first punching position. Upon feed of such card the P—5 contacts open de-energizing coil B allowing closure of contacts B—3. With B—3 closed the SS—1 contacts are now effective to afford a stick circuit for relay coil SS. During card feed of the master card the eject contacts P—4 are open. This breaks the circuit connection between coils RR and SS.

Relay coil H (Fig. 22f) will become energized before RR becomes de-energized. The circuit for energizing coil H is through the RR—2 contacts, through the LQ—9 contacts, coil H, to ground. With H energized, its stick circuit is completed back to line through contacts H—1 and through the AK—37 contacts now shifted, through RD—11 to line.

It will be recalled that in rate card multiplying that such stick circuit was completed through ML—26. It will be recalled that relay coil JJ (Fig. 22d) initiates dividing calculations. Such relay coil on regular dividing is energized upon LQ reset upon closure of contacts LQ—8 and CC—8. However, upon rate dividing operations with relay coil H energized, relay contacts H—5 will be open at the time CC—7 close and there will accordingly be no energization of coil JJ.

On regular dividing operations it was explained that for each card feed there was an energization of 321ML concurrently with an energization of 321RD. Upon rate dividing operations it is desired to reset the ML receiving devices only prior to the reading of a master card. Accordingly, the energizing circuit to 321 ML is interrupted upon detail card operations. This is effected by the opening of the AL—7 contacts. With cards in the machine relay coil G will be energized and contacts G—3 will be open, and as long as detail cards appear in a run relay coil NN will not be energized so that contacts NN—4 will be open. Accordingly, the control of energization of reset relay 321ML is brought about for a master card under control of contacts NN—4 and suppressed for detail cards, inasmuch as NN—4 are open and AL—7 are also open. Any time a master card is encountered, even if two master cards are in direct succession, reset coil 321ML will become energized and reset of the multiple receiving devices will be effected.

On rate card operations the master card should be skipped out of the punch just as in multiplying rate card operations. During the RD reset cycle relay coil 321RD is energized. Energization of such coil will close relay contacts RD—7 (Fig. 22c) and there will be the energization of relay coils A and AB in the manner previously explained. There will also be a selective energization of AAu or AAt (Fig. 22c) as previously explained. Relay coil SS (Fig. 22d) is still energized and the SS—2 contacts will have shifted to cut off the circuit to the readout strip of the punch and to establish a circuit to the punch magnet 360. With the circuit thus established to the punch magnet 360, the master card will be escaped through the punch as in rate multiplying. With the SS—2 contacts in shifted position all punch circuits to LQR will be cut off so that this readout will be wholly ineffective during the escape of the master card through the punch. Card feed of the detail card is brought about as in regular dividing, that is, with coil 321RD energized, contacts RD—8 (Fig. 22d) close and there is a circuit ultimately established to energize relay coil E which in turn brings about an energization of the 304 card feed clutch magnet.

On rate card operations, upon feed of the detail card, provision is made to suppress the operation of the XC cam contacts. Such cam contacts have as one of their functions, the control of build-up of multiples of the divisor. Such build-up control is not desired for a detail card on rate dividing because it is effected for a master card only and the build-up is retained for detail cards. Build-up is permitted for master card operations because contacts NN—2 (Fig. 22d) are closed. Such contacts are, however, open on detail card operations because relay coil NN is de-energized. Relay contacts AL—2 are open throughout all rate card dividing operations so that the control of clutch magnet 312 is solely through contacts NN—2.

On rate dividing operations, provision is made upon feed of a detail card to suppress energization of any of the T coils, but to permit the selective energization of the S coils. The energizing circuit for any of the T coils is through the relay contacts NN—3 when these are in shifted position. Such contacts are in the position shown when a detail card is fed. Accordingly, no T coil can become energized upon such detail card feed, but with such contacts NN—3 in the position shown there can be a selected energization of the required S coils. Selected ones of the S coils will be energized as explained for regular dividing and according to which of these coils the dividend entry will be permitted and shifted to the left in the dividend accumulator as in regular dividing operations.

On regular dividing operations the pickup circuit for energizing selected ones of the V and W relay coils was via the XC—4 cam contacts. Such contacts it was explained, close upon the feed of a master card to energize a selected one of the W relay coils. Such contacts XC—4, however, do not close on the feed of a detail card and accordingly, inasmuch as selected ones of the V relay coils must be energized for each detail card a supplemental pickup circuit must be provided for such relay coils. This supplemental circuit is provided as follows: From ground through the contacts G—2 now closed, through cam contacts FC—8, through contacts AL—4, which are in shifted position, through the now closed contacts AM—5, through one of the Su—1 to Sth—1 contacts to the proper V relay coil. This supplemental circuit will allow the selected energization of the requisite V coil. The stick circuit for any energized V coil extends through cam contacts FC—5, back to line which circuit is different from the stick circuit for the W relay coils.

Dividing operations pertaining to each detail card occur as previously explained for regular dividing. Computations ensue for the detail cards of a group and upon a new master card being encountered in a run, relay coil NN becomes energized (Fig. 22d). With relay coil NN energized, there is initiated an ML reset as previously explained, that is, contacts NN—4 (Fig. 22e) close. Upon such ML reset, the contacts ML—5 (Fig. 22c) open so that upon the opening of cam contacts CC—23, the stick circuit for the W relay coils is broken and any energized W relay is de-energized so that another such relay can be re-energized under the control of the succeeding master card.

Summarizing—on rate card dividing operations, the master card controls both the taking in of the divisor amount and the shift of such amount to the left. The following detail cards control the taking in of a dividend amount and the shift of the dividend entry to the left. Multiple building up operations are effected once under the control of a master card and building up operations are thereafter suppressed until a new master card comes along in a run.

On master card operations, dividing calculations are suppressed and the master card is skipped through the punch without recording. On detail card operations, on the other hand, computing is brought about for each detail card with the recording for each detail card.

As in regular dividing the shift back of the quotient amount on final recording is under the conjoint pre-sensing control afforded by the divisor and dividend amounts. As stated before, the divisor control is from the master card and the dividend control is from each detail card. Stated otherwise, the shift back control for quotient recording is a conjoint control based upon one master card taken with dividend data from each detail card of a run and this shift back control may vary from detail card to detail card, notwithstanding the divisor control is fixed for a group of detail cards.

Checking dividing

It will be recalled that in regular dividing operations the procedure was to first build up and render available for comparison all multiples of the divisor, thereafter these multiples were successively compared with successive comparison portions of the dividend and following each comparison the selected divisor multiple was deducted from the comparison portion of the dividend. The related quotient digit was then entered and these operations repeated until the division calculation was complete.

When it is desired to check dividing, it is desirable that a different computation be carried out using different digits. In this way the accuracy of the first computation on the original run may be more accurately checked. Generally, the procedure on checking dividing is to change not only the comparison by comparing different but related digits, but to also change the former deducting operation to an adding operation to add any divisor multiples in place of subtracting them as the computation proceeds. To illustrate, assume a divisor amount of 12 and a dividend amount of 144. The quotient is obviously 12 and the going multiples of the divisor are respectively 12 and 24 for the two steps of the computation.

On checking division, the various divisor multiples will be built up on the ML devices as before. For example, there will a build up of 12, 24, 36, etc. The dividend amount in place of being entered directly into RD as in regular division will be entered from the record into the SP accumulator. Following the entry, a nines complement of the divided is read out from SP and entered in RD. Then in setting up the various comparing units for comparison the nines complement of the dividend will be set up on one side of the comparing units and on the other side of the comparing units the nines complements of the different divisor multiples will be set up. To illustrate, with the dividend amount of 144, the nines complement of such amount is 855. The nines complement of the 1, 2 and 3 multiples of the divisor is 87, 75, 63, etc. The first comparison portion of the dividend to be compared is 85. This is compared with the available nines complemental multiples of the divisor and it is found by such comparison that 87 is the complement of the multiple which is just equal to or greater than the nines complemental dividend comparison portion.

When such comparison is made the machine selects the corresponding divisor multiple, viz., 12, and enters 12 into the RD accumulator, adding the amount of 12 to 85. While this amount is being added, there is also an entry of the nines complement of the related quotient digit, i. e., 8, into the LQ accumulator which accumulator previously had the quotient amount entered therein. Such entry of 8 would bring the highest order wheel of the accumulator to a 9 position. Column shift then ensues and 75 becomes the next comparison portion of the nines complement of the dividend. By comparison, it is ascertained that 75 is the nines complemental multiple which is just equal to the complemental dividend comparison portion. Following such comparing, the related direct divisor multiple, viz., 24, is entered into RD, which brings the RD accumulator to an all 9 position. Likewise, the nines complement of the 2 multiple is entered into LQ in proper columnar order, viz., there is an entry of 7 in the column of LQ already containing a 2 so that this wheel of the LQ accumulator also is brought to a 9 position. When the wheels of the LQ accumulator reach an all 9 condition this signifies that the computation has checked, the checking computation is complete, and a new checking operation can be effected.

Summarizing: For checking dividing the operations are to compare successive nines complements of dividend comparison portions with nines complements of the divisor multiples and then to add to the dividend accumulator the related direct multiple of the divisor. This is dedetermined according to which complemental divisor multiple is just equal to or greater than the related complementary dividend comparison portion. There is also an entry of the related nines complement of the going divisor multiple into the LQ accumulator. Stated another way, the multiple which is added following comparison is that multiple whose nines complement is the lowest, that is, just equal to or greater than the nines complement of the comparison portion of the dividend.

In regular dividing, division proceeds by a series of deducting operations towards a terminating zero point. The dividend is a positive amount and the divisor multiples are negative and are subtracted to reduce the dividend amount to a limit which is or approaches zero. On checking dividing, the dividend amount is a negative amount and the divisor multiples are positive amounts. These amounts are added successively to cause the dividend amount to become less and less negative so that a limit equal to or approaching zero is finally obtained.

It will be noted that on checking dividing nines complements are always used and there is no elusive one entry in the checking process at all. This materially simplifies the circuits and mechanisms.

Before explaining in detail the checking dividing operations, it may be mentioned that the cards are introduced into the machine on a rerun in reversed end to end relation just as in checking multiplying. This obtains the same advantages previously explained for checking multiplying. Likewise in checking dividing, in view of the end to end reversal of the cards, special insertible plugboards are used according to Fig. 28. The insertible plugboard provides a plug connection between socket 364 (Fig. 22h) and socket 398. This connection maintains relay coil AM permanently energized during all checking operations. Upon energization of AM, relay contacts AM—17 and AM—18 close to maintain relay coils AK and AS, respectively, energized throughout checking dividing operations. It will be recalled that AK was previously maintained energized during regular dividing and that relay coil AS was maintained energized upon checking multiplying. With these coils AM, AK and AS energized, their respective contacts shift to reverse position from that shown.

As in regular dividing, plug connections are established between sockets 367 pertaining to the divisor field, to sockets 383 (Figs. 22a and 22g) and plug connections are made from 361 pertaining to the dividend field (Fig. 22a) to sockets 384 (Fig. 22g). Plug connections are also made from the sockets 367 pertaining to the quotient field to the sockets 399 (Fig. 22h). The foregoing plug connections are for pre-sensing purposes. To route and afford entries of the dividend, divisor and quotient amounts, plug connections are established from sockets 309 (Fig. 22e) pertaining to the divisor field to sockets 311 (Fig. 22a) and connections are made between sockets 309 pertaining to the dividend field to sockets 373 (Fig. 22g). For quotient entries, plug connections are established between sockets 309 (Fig. 22e) pertaining to the quotient field, to sockets 400 (Fig. 22d).

As explained on checking multiplying, the cards are placed in the hopper in reverse end to end relation. The machine is started up in operation just as in regular dividing and for the first card cycle there is the pre-sensing of the divisor and dividend fields just as in regular dividing. There is also a pre-sensing of the quotient field and this pre-sensing selectively energizes selected ones of the relay coils TTa—g (Fig. 22h). As in the customary pre-sensing control such of the TT relay coils are energized which are related to columns of the quotient field where zeros appear. When any one of the TTa—g coils is energized its related contacts with the suffix "1" (Fig. 22c) is shifted to reverse position from that shown, and accordingly, a selected one of the VVa—g coils will be energized. Assuming a quotient entry of 18 (see Fig. 40), the TT coils which will be energized will be TTa, TTb, TTc, TTf and TTg. The energization of TTg and TTf will have shifted contacts TTg—1 and TTf—1 (Fig. 22c) and with such contacts shifted there will be an energization of relay coil VVe.

There will be an energization of coil VVe at the time the card is analyzed by the regular reading brushes. It will be noted that the non-shift of contacts TTe—1 cuts off the circuit to all of the VV relays to the right of coil VVe (Fig. 22c). The second card feed cycle following pre-sensing on the first card is brought about as in regular dividing. On such card feed cycle the divisor amount is entered into the ML devices in shifted over relation just as in regular dividing. Following entry the multiples are built up in the various ML devices as in regular dividing. The dividend amount on the other hand, in place of being entered into RD in shifted over relation as in regular dividing, is entered into SP in shifted over relation. As in regular dividing the Sh relay coil (Fig. 22c) becomes energized under pre-sensing control. Such relay when energized shifts the Sh—2 group of contacts to reverse position from that shown.

The entry circuits for the dividend amount are in part the same as for regular dividing and will be traced only from sockets 373 (Fig. 22g) through the non-shifted AN—7—10 contacts, via the lines 374 (Fig. 22c), through the closed Sh—2 contacts, through the now shifted AS—1—4 contacts, directly to the 313SP accumulator magnets. This will enter the amount of the dividend into SP and shift it over in columnar relation therein. At the time the FC—11 cam contacts close to energize relay coils Sh and Tt, a branch circuit is established via line 401, through the now closed AM—7 contacts, through the TTg—1 and the TTf—1 contacts in shifted position, through the relay coil VVe and back to line. The energization of VVe closes the group of contacts VVe—1 (Fig. 22d). These VVe—1 contacts selectively determine the shift of the quotient entry to the left upon entry into the LQ accumulator. With contacts VVe—1 closed, the quotient entry from the quotient field of the card is made as far to the left in the LQ accumulator as possible. The entry circuit is from sockets 400 which are plugged up to the quotient reading brushes, through contacts VVe—1 over a group of lines 402 (see also Fig. 22h), through the non-shifted AT—4—7 contacts, via a group of lines 403, up over the group of lines 323 (see also Fig. 22g), to and through the 313LQ accumulator magnets. This will enter the amount of the quotient in the LQ accumulator in shifted to the left columnar relation.

In the machine cycle following the card analyzing cycle, i. e., the second half of the card feed cycle, provision is made to transfer over the nines complement of the dividend amount from the SP accumulator to the RD accumulator. This is brought about in the following manner. During this machine cycle, since relay coil AS is energized, contacts AS—12 (Fig. 22d) are closed and a circuit is established at the proper time through cam contacts XC—6, through the AN—17 contacts in the position shown, to energize relay coil WW. With this relay coil energized, relay contacts WW—3—6 (Fig. 22g) and WW—2 (Fig. 22c) are shifted. With WW—2 shifted, a circuit is established from line 341 to the nines complementary emitter 375. The nines complementary impulses are emitted through SPR (Fig. 22g), through the non-shifted SP—1—4 contacts, through the shifted WW—3—6 contacts, through the AN—3—6 and AJ—1—4 contacts in the position shown, to the lines 351 and thence to the 313RD accumulator magnets. This impulse emission through SPR will enter the nines complement of the dividend amount in RD. It may be mentioned that an elusive 1 entry or entries is not made into RD under this particular operation, since even though the contacts WW—1 are closed, the contacts AM—21 are in open position and therefore no elusive 1 entry is possible.

By the usual card controls which are effective when the card reaches the receiving tray of the punch, and as in regular dividing operations, relays B and D (Fig. 22d) ultimately become energized. As in regular dividing the card is fed to the first punching position. The machine is now ready to initiate its checking calculating operations and this is brought about by a reset of the SP accumulator. In regular dividing, it will be recalled that dividing calculations will be initiated by reset of the LQ accumulator. Initiation of SP reset is brought about as follows: Contacts B—2 and D—2 (Fig. 22e) are now closed and a circuit is established through relay contacts AS—10 now closed, to the 321SP reset relay. The energization of relay coil AS will have shifted the AS—9 contacts and thus prevent energization of 321LQ. The reset of the SP accumulator takes place in the manner fully explained for such reset on checking multiplying operations. SP reset brings about energization of relay coil JJ. The circuit is established through the now shifted AS—11 contacts, through the SP—1 contacts, through cam contacts CC—7, through the closed H—5 contacts, to relay coil JJ. JJ once energized is maintained energized by the stick circuit previously traced for dividing operations. With relay coil JJ energized relay contacts JJ—3 (Fig. 22f) close and a circuit is established serially through the various CU—1 contacts now in the position shown to energize the relay coil LL when cam contacts CC—9 close. With relay coil LL energized its stick circuit is established through LL—1 and CC—13. Shortly after LL becomes energized, cam contacts CC—14 close and circuits are established for energizing the stepping relay magnets 340SB and 340SE. Energization of the latter magnet is afforded since contacts AM—6 are closed and contacts J—1 are in the position shown. The arms of the SB and SE stepping switches will thereupon advance to their first contact position. As in regular dividing there will now be an energization of coils CSa, BB and DD, but since the contacts AM—1 are now closed and also relay contacts DD—10 are closed, there will be a concurrent energization of CSa' with the energization of CSa.

The machine is now ready to set up the nines complement of the dividend or more exactly, the nines complement of the comparison portion of the dividend on one side of the comparing units and to set up the nines complements of the various divisor multiples on the other side of the comparing units. The setup of the nines complement of the dividend comparison portion will first be explained.

Referring to Fig. 22g, the add emitter 348 will be brought in circuit with line 347 upon shift of contacts DD—9. Impulses will be emitted through RDR and will flow by the circuits previously traced to the various selected ones of the 1—9AW comparing magnets. These circuits are the same as in regular dividing, but it will be recalled that the nines complement will be read out instead of the comparison portion of the dividend as in regular dividing. With this particular operation, however, provision is made for filling out nines to the left on the comparing magnets. A special nines to the left circuit is therefore provided which is established through the now closed CSa'—1 contacts. These contacts are in a circuit 404 leading to the 9 bus of RDR and the circuit beyond the CSa'—1 contacts extends to each of the left hand comparing magnets 1—AW to 9—AW inclusive. While the nines complement of the comparison portion of the dividend is being set up on one side, the nines complement of the various multiples of the divisor are being set up on the other side.

Referring to Fig. 22b, relay contacts BB—28 and AM—4 are in shifted position. Accordingly, nines complementary emitter 344 is in circuit with line 301 and nines complementary impulses are emitted from this emitter through the various MLR readouts down through the now shifted BB—1—27 contacts to selectively energize at differential times the various 1—AZ to 9—AZ comparing magnets according to the divisor complemental multiples.

In the comparing cycle and after the set-up of the comparing units is effected, the actual comparing operation takes place on the comparing commutators (Fig. 22c). It will be noted, however, that the contacts AM—8—16 are now in shifted relation. With such contacts shifted, the comparison will be such that all CU relays pertaining to lower multiples (greater complements) than the comparison portion of the dividend and possibly the CU relay pertaining to an equal complementary condition, will be energized. For the problem of Fig. 40, the 1—CU relay will be the only relay energized. Energization of this relay is effected upon closure of cam contacts CC—12, through contacts DD—22, which are closed (Fig. 22c).

Figure 40:
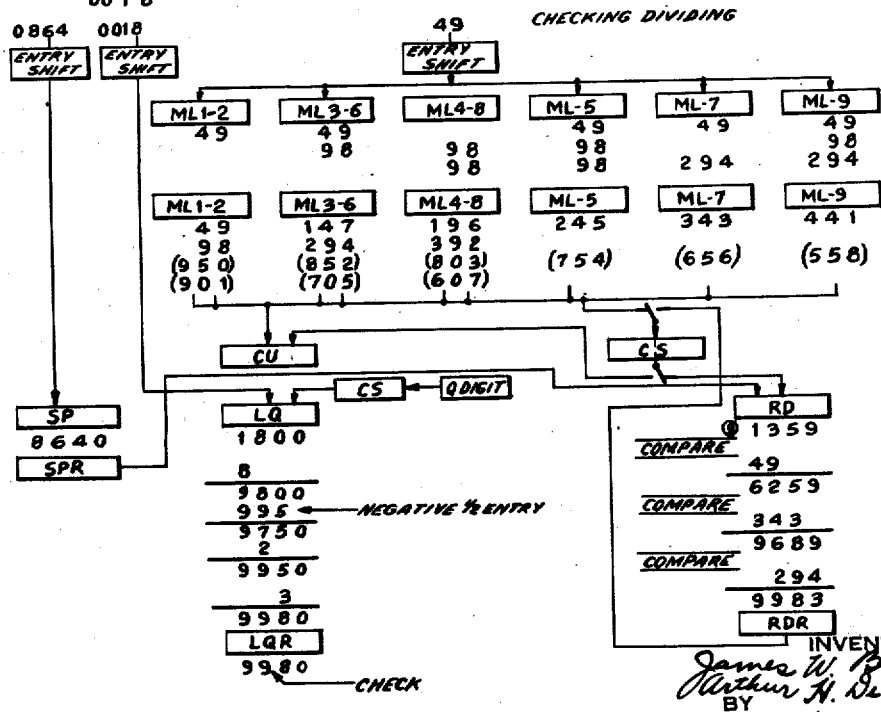

Referring to the problem of Fig. 40, the dividend comparison portion complement is 913 and the only complemental multiple which is greater than this amount is 950, the complement of the one multiple of the divisor. This one multiple is accordingly the selected multiple.

Having selected the related multiple, the machine is ready to add the related direct multiple and to add the nines complement of the related quotient digit to the quotient digit already standing in the left-hand order of LQ. As in regular dividing at the end of the comparing cycle relay coils BB and DD become de-energized. In the instant machine cycle when the above entries are made, the relay coil CSa (Fig. 22f) becomes again energized. However, relay coil CSa' does not become energized, because relay contacts DD—10 are open, DD having now been de-energized. With relay coil BB de-energized, relay contacts BB—28 (Fig. 22b) are in the position shown and the circuit from line 1s to add emitter 314. The energization of 1—CU in the manner previously explained, will have shifted contacts 1—CU—1 (Fig. 22f) and energized the 1—X multiple selecting relay. Coil I—X being energized it will be maintained energized in the manner previously explained. With I—X energized, the I—X—2—4 contacts (Fig. 22b) are in shifted position and the impulses flowing from the add emitter 314 will flow through the MLR—1 readout and will ultimately reach the proper columnar orders of the 313RD accumulator magnets (Fig. 22f) via the circuit paths described for subtracting the first multiple in regular dividing.

The entry circuit for effecting an entry into LQ of the nines complement of 1 or 8 will now be explained. Referring to Fig. 22g, subtract emitter 350 is in circuit and add emitter 348 is out of circuit with line 347, since contacts DD—9 are in the position shown, AM—2 are shifted and RD—8 are in the position shown. With emitter 350 in operation an impulse representative of 8 will be emitted over the eight bus of RDR through the now closed I—X—5 contacts, through the contacts AK—22 now closed, through CSa—4 now closed, through ZZ—2 in the position shown, down to and through the highest order 313LQ accumulator magnet. This will enter 8 in such order and inasmuch as 1 already stands in such order, the accumulator wheel or element unit will be brought to a 9 position.

Further complemental comparing operations, adding of direct divisor multiples to the comparison portion of the dividend and further entries of nine complements of quotient digits take place for following comparison portions of the dividend. These need not be traced in detail as they are substantially like those explained for regular dividing except for the difference in sign of entry which has been explained for one operation.

Terminating of calculating operations on checking dividing take place under the control of the place limiting devices. There is an ultimate energization of the terminating relay H as in regular dividing, it being assumed that the place limiting devices are set for the same number of places as on the original run.

The machine is now ready to test the LQ accumulator to ascertain whether the wheels of this accumulator are in a 9 position. After such wheels are in such 9 position it signifies that the checked computation is correct and there is then initiated a reset of the ML devices and the RD and LQ accumulators. If the test detects a condition in which one or more of the wheels of LQ do not stand on 9, the foregoing resetting operations are deferred until a manual operation ensues and during which the incorrect card may be removed. Assuming that the LQ accumulator shows an all 9 condition, resetting operations are initiated under the control of this test circuit and the card in the punch is skipped through the punch without recording. The test circuit and reset initiating control circuits will now be traced.

Referring to Fig. 22e, upon closure of cam contacts CC—3 a circuit is established through the shifted AK—1 contacts, through AK—2 contacts now closed, to line 337. Line 337 ultimately extends to Fig. 22h, through the now closed J—2 contacts through the switch arm of the SE stepping switch to say the third contact position, through the non-shifted ZZ—7 contacts, to the second from the left readout segment of LQR, thence via the various brushes and contact spots of the relatively higher orders of the readout which are on an all 9 position to line 338. Line 338 ultimately extends back to Fig. 22e and energizing circuits are established to energize reset relays 321ML, 321LQ and 321RD. The circuit to coil 321ML is through the AL—7 contacts now closed. The circuit to 321LQ is through the contacts AK—4 and AS—9 which are both shifted. The circuit to 321RD extends through contacts AE—5 in the position shown, through AK—5 in shifted position, through XC—9, to 321RD. In the event that one of the accumulator elements of the LD accumulator is off the 9 position, this circuit will not be established since it will be broken at the LQR readout. Such circuit, however, can be established to bring about reset by depression of the supplemental reset key 405 (Fig. 22h).

It may be explained that throughout the checking dividing computations stepping switch SE will advance the same number of steps as stepping switch SB. It will be understood that the stepping switch SE cuts off testing and exploration of unnecessary columns to the right in LQ. As in checking multiplying, RD reset through the closure of RD—7 ultimately causes energization of relay coil A (Fig. 22d). However, on the energization of A there is no energization of any of the AA, Z or AB coils (Fig. 22c) since contacts AS—5 and AS—6 are now in open position. Since contacts AS—8 are in shifted position (Fig. 22d) a circuit for advancing the card step by step through the punch is completed as in checking multiplying operations. Ultimately the closure of contacts RD—8 brings about energization of relay coil E' whereupon the E—2 contacts close and there is an energization of the card feed clutch magnet 304 and the XC clutch magnet 321. Operations pertaining to a new card are then initiated.

*No-go condition on checking dividing*

On regular dividing operations, conditions are encountered where on a certain comparison the comparing devices ascertain that there is "no-go" condition. Such condition means that the quotient amount for such quotient place is zero. Upon checking dividing, however, if upon a comparison a "no-go" condition is established, provision must be made to enter a 9 in such non-going quotient order. This is necessary since the entries into LQ on checking are in nines complementary relation. To provide for the introduction of a 9 into LQ on a "no-go" condition, the following controls and circuits are provided. If on checking operations a "no-go" condition is determined by the comparing devices, none of the relays I—CU to 9—CU (Fig. 22c) will be energized, but relay 0—CU will become energized.

With relay 0—CU energized, which is permitted inasmuch as relay contacts AM—20 are closed and because relay contacts CSa'—2 are also closed, contacts 0—CU—1 (Fig. 22f) shift. Accordingly, there is an energization of the 0—X relay with the usual stick circuit established through contacts 0—X—1. With 0—CU—1 shifted, the energizing circuit to relay coil LL is broken. Therefore, on a "no-go" comparison upon checking dividing, the machine does not immediately follow with another comparing cycle as in regular dividing. In lieu thereof, the energization of the 0—X relay closes relay contacts 0—X—5 (Fig. 22g) and a circuit is established from the nine spot of emitter 350, through the now closed 0—X—5 contacts, through AK—22 now closed, through one of the closed CS contacts, down to one of the 313LQ accumulator magnets. This will provide for the entry of a "9" in the "no-go" order of LQ. On a "no-go" comparing condition of checking, since the related multiple is zero, there is no additive entry of any multiple into RD.

In regular dividing operations it is possible, according to the relation of the divisor and the dividend to have quotient amounts such as 0387 (first condition) and 3870 (second condition). The relation of quotient digits for the first condition occurs when there is a "no-go" comparison for the highest order of the quotient, i. e., a "no-go" condition on the first comparing cycle. The relation of quotient digits such as 3870 for the second condition occurs when a comparison is effected on the first comparing cycle to signify that there is a going multiple.

In recording back on the record card for both of the foregoing first and second conditions, it is possible, due to the relative size of the divisor and dividend amounts to record the quotient amount of 387 for either condition in an identical columnar relation on the record card. For example, the recording for both conditions might be 0038700.

In recording the quotient amount for the first condition mentioned above, the zero preceding the 3 will be derived from LQR. However, when recording for the second condition, this same zero in the same column will be derived not from LQR, but from the zero wiring 391, etc. (Fig. 22h), previously described.

When such a record is re-run through the machine for checking dividing, the pre-sensing control cannot ascertain whether the zero preceding the 3 comes from LQR or from the 391 zero wiring. Therefore, the 387 is entered clear from the card to the left in LQ when checking either under condition one or condition two. When entering re-computed complementary quotient into LQ digits a control must be provided to take into account that such shift has occurred clear to the left under condition one or condition two. When operating under condition one there will be a "no-go" condition on the first comparing cycle for the first quotient place.

While the machine controls under this "no-go" condition would tend to enter a "9" in such place, such "9" entry in such place is undesired and is accordingly suppressed. It will be recalled that if 387 is shifted clear to the left there will be no zero in LQ for the 9 to match with. Accordingly, on such first condition on checking dividing this "9" entry in the first quotient place is suppressed. However, on the second checking condition there is a going condition established on comparison for the first quotient place and therefore a complementary quotient digit is entered in such place. Furthermore, under condition one, provision is made for shifting the entries of all complementary quotient digits relatively one place to the left so they will enter in the proper orders of LQ. On condition two, on the other hand, this shift to the left of the entry of complementary quotient digits is suppressed.

On the first comparing cycle upon checking dividing, relay coil CSa' (Fig. 22f) becomes energized concurrently with the energization of relay coil BB in the manner previously described. The energization of CSa' opens contacts CSa'—2 (Fig. 22c) and accordingly relay coil 0—CU does not becomes energized. Furthermore on a "no-go" condition none of the relay coils 1—CU to 9—CU will become energized. Accordingly, all of the 0—CU—1 to 9—CU—1 contacts (Fig. 22f) remain in the position shown and LL becomes energized. With LL and BB energized, contacts LL—4 and BB—30 (Fig. 22d) are in closed position and upon closure of cam contacts CC—25, a circuit is established through the now closed AS—12 contacts, through the non-shifted AR—12 contacts, through CC—25, LL—4, BB—30 to energize relay coil ZZ. The contacts ZZ—1 close and a stick circuit for coil ZZ is maintained in the same manner as for the JJ relay. With relay coil 0—CU not energized, contacts 0—X—5 (Fig. 22g) wil remain open and accordingly there will be a suppression of the entry of the 9 in the first quotient place. The energization of coil ZZ will shift the ZZ—2—5 contacts (Fig. 22g) and the effect of the shift of these contacts is to cause shift of the entry of the complementary quotient digits which are obtained thereafter in orders of LQ which are relatively one higher. The shift of the ZZ—2—5 contacts will be maintained throughout all succeeding computing operations, ZZ only becoming de-energized when relay coil JJ de-energizes after the termination of computing.

Under the first condition mentioned above, when complementary quotient entries are shifted relatively one place to the left, provision must be made for shifting the test circuits for testing for all nines in LQ relatively one place to the left. This is provided for by shift contacts ZZ—6—9 (Fig. 22h) which shift the circuits between the SE stepping switch and LQR to limit the number of columns explored for all nines and to cut off exploring unwanted columns to the right.

Under the second condition, that is a going condition, one or more of the relay coils 1—CU to 9—CU will become energized (Fig. 22c). With one or more of such relays energized, the associated 1—CU—1, 2—CU—1, etc. (Fig. 22f) contacts shift so that the energizing circuit to coil LL will be broken. Accordingly, referring to Fig. 22d, contacts LL—4 will remain open and there will accordingly be no energization of relay ZZ. With relay ZZ de-energized, there will be no shift of complementary quotient digit entries and no shift of the test circuit for testing for an all nine condition.

In dividing calculations where rounding off is employed there is an entry of a 5 in a selected order of LQ. Having provided for such 5 entry for rounding off on an original run which 5 entry it will be recalled occurs for every card, provision must be made to deduct such 5 on the checking operations. Such deduction of 5 in the proper order of LQ is obtained as follows:

Upon checking dividing the insertible plugboard will have established a plug connection between socket 393 (Fig. 22g) and the same socket 394 which was plugged up on the original dividing run. In addition plug connections are made by the insertible plugboard from sockets 406 to sockets 394 to the left of the one which is plugged up to 393.

On regular dividing it was explained how the plug connection to socket 393 through cam contacts CC—22 and the relay contacts DD—14 effects an entry of 5. This same 5 entry is made on checking computations in the second comparing cycle, but in addition in the same second comparing cycle there is a further entry of a set of nines to the left of the order of LQ which receives the 5. The nine entries originate at commutator 343 and flow through the DD—11—13 contacts and via the plug connections previously explained, to the selected higher orders of LQ. Such entry of 995 into LQ compensates for the addition of 5 on the original run, in effect causing the deduction of 5 from the LQ accumulator.

The features just described form the subject matter of another co-pending application Serial No. 439,454, filed April 18, 1942.

Special computation $$\frac{A \times B}{C}$$

The foregoing description has explained the manner of use of the machine for multiplying and dividing. Previously the machine was set to run for a series of multiplying computations only with the one multiplication being performed for each record or alternatively the machine was conditioned to perform dividing operations with a dividing calculation performed for each record card. The present invention however, contemplates a combined operation wherein there is both a multiplying operation and a dividing operation performed for each record card. Commercial transactions frequently involve the multiplication of two terms and the division of the result by a third term. Typical calculations are those of the general form A:X::C:B. Here the machine is to compute the value of X which equals $$\frac{A \times B}{C}$$

A typical problem will be first briefly explained with reference to Fig. 41. In handling this type of computation, the multiplicand amount (A) is entered into the ML devices just as in regular multiplying. The multiplier amount (B) is entered into MP. The C term, i. e., the divisor, of the calculation, is entered into SP, but such entry is governed by a pre-sensing control so that there is a shift to the left upon entry of C into SP from the record card. The machine thereupon proceeds to carry out a regular multiplying operation, finally obtaining the product result in LQ. After the product is obtained in LQ controls come into action which automatically shift the machine to another status in which division is carried out. Before division is initiated, the ML and MP devices will have been cleared, and likewise the RD accumulator will have been cleared. Accordingly, the amount of the divisor (C) can now be transferred over from SP into the various ML devices after which multiple build-up is effected. The amount of the previously computed product can be derived from LQR, but in deriving such amount therefrom there will be a pre-sensing of LQR to set up controls to govern the entry shift of this amount which now becomes a dividend amount. The machine accordingly shifts the product, now the dividend, upon entry into RD and dividing operations then ensue as in regular dividing following LQ reset. Upon completion of such operations there is a recording of the result back on the card and an initiation of operations pertaining to a following card. As in previously described regular dividing recording on the card overlaps the reading in of the amounts from a following card.

When dividing operations pertaining to one card are completed, controls come into action which automatically shift the machine back to a multiplying condition for performing the multiplying calculation upon the following card. Provision is also made to clear the various accumulators and multiple receiving devices at the proper times for effecting both kinds of operations. On this conjoint operation there is a relative shift on final result recording and this shift is based conjointly on the pre-sensing control derived from one term entered from the card itself and derived for another term, an amount which is computed by the machine. That is to say, the shift back of final result recording is controlled by pre-sensing control which takes into account the position of zeros and significant digits in a divisor amount on the record and which control operates with another control which takes into account the presence of zeros and significant digits in an intermediate amount which is computed by the multiplying portion of the problem.

Figure 29:
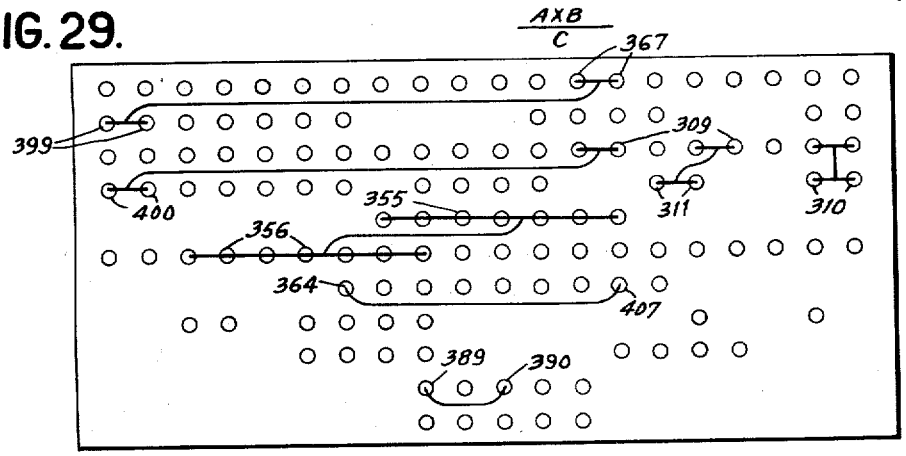

On computations of this type, the insertible plugboard of Fig. 29 will have established a plug connection between socket 364 (Fig. 22h) and socket 401. This will maintain relay coil AN energized throughout computations on all cards of a run. With coil AN energized, its related contacts will shift to reverse position from that shown. Energization of AN will close contacts AN—1 and energize relay coil AT which will remain energized throughout computations on all cards of a run. Energization of coil AT will shift its related contacts to reverse position from that shown.

The insertible plugboard will also establish connections between the 309 sockets (Fig. 22e) and the 310 sockets and also the 311 sockets (Fig. 22a), the entries flowing through 310 pertaining to the B amount and those through 311 pertaining to the A amount. Other entry circuit plug connections will be made from sockets 309 to sockets 400 (Fig. 22d) to afford entry of the C amount into SP. In order that such C amount may be pre-sensed, the insertible plugboard affords suitable plug connections between the 367 sockets (Fig. 22a) and the 399 sockets (Fig. 22h). With this type of calculation, multiplication of the factors A×B takes place in identically the same manner as described for regular multiplying.

As explained before, however, there must be a pre-sensing control established for the C term as read from the record and such pre-sensing control not only selectively directs the shift to the left of the entry of C into SP, but it also sets up controls which are retained until final result recording. These pre-sensing controls will now be briefly described.

When the record card is pre-sensed, the presence of zeros in the field containing the C term of the calculation are detected by the pre-sensing brushes and there is a selective energization of the TTg to TTa relays (Fig. 22h). The C term is considered as limited to two orders, but obviously it can be of larger magnitude. If there is one zero preceding the significant digit of C, the TTg relay would be energized and TTf would remain deenergized.

When the card passes the regular reading brushes, the A term goes into the ML devices, the B term into MP and the C term is routed to SP with a shifted entry relation.

In the typical problem of Fig. 41, the C term involves no zeros so neither of the coils TTg or TTf are energized. With such relays both deenergized, the TTg—1 contacts (Fig. 22c) are in the position shown so that there will accordingly be an energization of coil VVg. In this instance, however, the energizing circuit for this relay is through the now closed AT—3 contacts. The energization of VVg closes the VVg—1—4 contacts (Fig. 22d) affording an entry circuit for the C amount from the sockets 400 through these contacts to the lines 402. The entries flow over lines 402 (Figs. 22d and 22h), through the now shifted AT—4—7 contacts, via the lines 408 (see also Fig. 22g) and lines 377 (see also Fig. 22c) to the 313SP accumulator magnets. The entry is made into SP clear to the left and such entry is always so made. With the computation being explained there is no shift called for and the entry is direct from the brushes under the control of the VVg—I group of contacts.

As previously explained for the particular computation under consideration coils TTg or TTf were not energized. Accordingly, contacts TTg—2 (Fig. 22c) remain in the position shown and in the card feed cycle in which the C amount is analyzed and when XC—4 cam contacts close, a circuit is completed from ground through XC—4, through the non-shifted AK—33 contacts, through the shifted AN—19 contacts, through the normally closed AK—34 contacts, through the TTg—2 contacts in the position shown, through the shifted AN—15 contacts, to and through relay coil Wt, through the shifted AN—21 contacts and back to line 301. Coil Wt remains energized by virtue of stick contacts Wt—I, the stick circuit extending to ground through cam contacts FC—5. Relay coil Wt remains energized during the succeeding multiplying and dividing portions of the calculation.

In order to permit pre-sensing of the C field of a following record, it is necessary to reset the TT set-up unit in the second half of a card feed cycle. Such reset is brought about by the energization of the set-up unit reset clutch magnet 321TT (see Figs. 1a and 22d). The energizing circuit extends from line 301 through the closed AK—36 contacts, the now shifted AT—15 contacts, clutch magnet 321TT, through cam contacts XC—5, to ground.

As in regular multiplying operations, LQ reset initiates multiplying calculations and multiplication proceeds as previously explained. Upon completion of the multiple entry operations there is an RD to LQ transfer and a reset of the ML and MP receiving devices.

After the product is obtained in LQ, the machine is ready to shift automatically to a dividing status and to pre-sense the product amount in LQ to ascertain the column position of the amount in such accumulator. As in regular multiplying, upon RD to LQ transfer, relay coil CA (Fig. 22e) becomes energized. With such coil energized, relay contacts CA—4 (Fig. 22d) are closed and the circuit is completed from ground through the now closed AT—8 contacts, through the closed CA—4 contacts, through cam contacts CC—30, to energize relay coil AE. AE is retained energized through the stick circuit including contacts AE—1 and cam contacts CC—31.

Energization of relay coil AE closes contacts AE—4 (Fig. 22h) and a circuit is completed from ground through the now closed AT—2 contacts, through the cam contacts CC—33, through the AE—4 contacts, to and through relay coil AK to line 301. Relay coil AK upon being energized is maintained energized through contacts AK—26, the circuit being completed to ground through the closed ML—24 and AT—2 contacts. It will be recalled that relay coil AK is the relay which adjusts the machine to a dividing status and this relay on regular straight dividing was maintained energized constantly throughout dividing calculations. On regular dividing the energization of this relay was afforded by means of a plug connection. Upon energization of coil AK as just explained its related contacts shift to reverse position from that shown in the circuit diagram.

On regular dividing, relay coils N (Fig. 22g) were selectively energized under control of the pre-sensing brushes and in accordance with the pre-sensing of the dividend field of the card. With the present type of calculation this pre-sensing of the card is eliminated and in lieu thereof the control of the energization of the N relays comes from LQR. This shift of control is brought about in the following manner: Shortly after relay coil AE (Fig. 22d) becomes energized, relay coil AF energizes under control of cam contacts CC—35. Energization of coil AF closes contacts AF—1—4 and AF—5 (Fig. 22h). With such contacts closed a circuit is completed from line 301 to the zero bus of LQR, and for the orders in which the brushes of the readout stand at zero, circuits are completed through the non-shifted LQ—1—4 contacts via lines 409, through the now closed AF—1—4 contacts, through the now shifted AN—11—14 contacts (Fig. 22g) to the proper N relays. It will be understood that the N relays energized will be for the orders wherein zeros appear in the product amount in LQ. The N relays in question are in the N—R unit (Fig. 1a).

In regular dividing, building up of multiples was brought about under control of the XC cam contacts and such cam contacts were brought into rotation concurrently with card feed. Under the present type of operation card feed must be suppressed at this time, but the XC cam contacts must be brought into operation to afford build-up of multiples. Also with this type of operation certain XC cam contacts are utilized to control transfer of the amount from SP into the multiple devices and transfer of the product amount from LQ into RD.

As in regular multiplying the ML devices become reset following multiple entries. Such reset on regular multiplying causes energization of relay coil E (Fig. 22d) and E on energizating closes contacts E—2, bringing about energization of the card feed clutch magnet 304 and the XC cam clutch magnet 312. Under the present type of operation, contacts AE—2 are open due to the energization of coil AE at the time the contacts ML—22 close on ML reset. Accordingly, there is no energization of relay coil E and therefore there is no circuit completed to clutch magnets 304 or 312 under the control of the E—2 contacts. Upon energization of relay contacts AE, relay contacts AE—3 close and prior to the closure of cam contacts CC—32 relay contacts AK—27 will have shifted to reverse position. Furthermore, at this time the AT—1 contacts will also be shifted to position so that a circuit is established from ground through cam contacts CC—32, through contacts AE—3, through the now shifted AK—27 contacts, through contacts G—4 and AL—2 now closed, to energize the XC cam clutch magnet 312. However, a possible energizing circuit to 304 will be interrupted in view of the shift of the AT—1 and AK—27 contacts. It may be mentioned that the AT—1 contacts remain shifted throughout all computations of this type and such contacts are in shifted position at the time AK—27 shift, which shift occurs before CC—32 close.

RD reset may now be effected and the amount of the divisor standing in SP may be entered into the proper ones of the ML accumulators. RD reset is brought about in the following manner:

Early in the first XC cam cycle relay coil AE still remains energized. Accordingly, upon closure of cam contacts XC—8 (Fig. 22a) a circuit is established from line 301 through contacts AE—5 and AK—5 in shifted position, through the XC—9 cam contacts to and through the 321RD reset relay coil. RD reset then takes place in the manner previously explained. Shortly after coil 321RD is energized, the initially closed XC—9 contacts open up and such contacts when open interrupt a possible circuit to the 321ML reset relay coil, which circuit would be completed when the AE—5 contacts shift back to the position shown in the diagram.

During the RD reset cycle, upon closure of the XC—1 contacts (Fig. 22d) relay K becomes energized. Current supply is also afforded through XC—1, via a branch circuit 413 which extends through the now closed AK—29 contacts, through the now shifted AN—17 contacts, to and through relay coil WW. Accordingly, coil WW becomes energized concurrently with the energization of relay K. With relay coils WW and K thus energized, readout circuits and entry circuits are established from SPR to the proper ML receiving devices. Referring to Fig. 22c, the WW—2 and AT—9 contacts are now both in shifted position and current supply is afforded from line 347 through these contacts, and contacts SP—10 which are in the position shown, to add emitter 410. The impulses emitted by the add emitter flow through SPR and out through the SP—1—4 contacts in the position shown, through the now shifted WW—3—6 and AN—3—6 contacts, to lines 411 and 412, which lines extend via Figs. 22c, 22b and 22a to the K—1—8 contacts. Branch lines also extend directly to the 313ML—1—2 accumulator magnets. The circuits from the K—1—8 contacts, now closed, extend to the 313 line.

Figure 35:
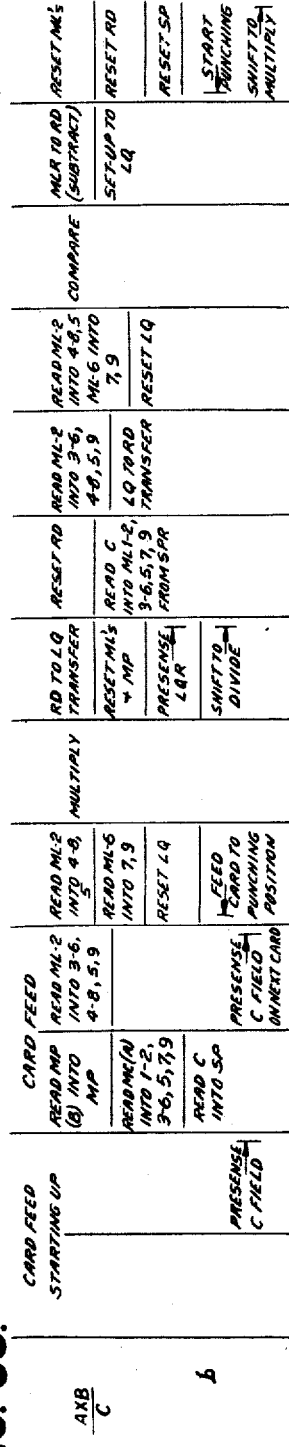

On the two succeeding machine cycles build up of multiples is effected in the manner previously explained (see also Fig. 35). In the first of the succeeding cycles or the second XC cycle, LQ to RD transfer is effected. It will be recalled that there was a sensing of LQR and a control set-up in accordance with the location of zeros in LQ. This control which was set up included the energization of coil Nth in accordance with the problem of Fig. 41. Accordingly, contacts Nth—1 are in tripped (shifted) position. A circuit is established from ground through cam contacts XC—14, through contacts AN—2 now shifted, through contacts AK—11 now closed, through the shifted Nth—1 contacts, to energize relay coil Sh. Concurrently, with this operation the XC—11 cam contacts (Fig. 22d) close and establish a circuit to energize relay coil AG through the AN—18 contacts now closed.

Referring to Fig. 22h, energization of relay AG closes contacts AG—7 and places add emitter 414 in circuit. This emitter emits impulses through LQR and proper impulses flow through contacts LQ—1—4 in the position shown to lines 409, thence through the AG—1—4 contacts now closed, to lines 415 (see also Fig. 22g), through the now shifted AN—7—10 contacts, via lines 374 (see also Fig. 22c), through the now closed Sh—2 group of contacts (which effect a shift to the left of the ultimate entry into RD), through the non-shifted AS—1—4 contacts, via lines 351a, (see also Fig. 22g), via lines 351, to the proper 313RD accumulator magnets. This will have entered the amount of the former product into RD which amount now becomes the dividend for succeeding dividing calculations.

Provision must be made to retain a control based on the pre-sensing of the computed product in LQ during dividing calculations in order to correctly effect shift back on final recording. Such control involves an energization of one of the V relays (Fig. 22c). The manner in which this retained control is set up is as follows: A circuit is established from ground through the XC—15 cam contacts, through the AK—33 and AN—19 contacts both in shifted position, through the AL—4 and AM—5 contacts in the position shown, through the Sh—1 contacts now closed, through the AR—7 contacts, to and through the Vh relay, through the AR—13 contacts in the position shown, through the now closed AK—10 contacts to line 301. This will energize relay Vh which is retained energized through the stick circuit including the Vh—1 contacts and the FC—5 cam contacts.

During the last multiple buildup cycle following the cycle in which the amount in LQ is transferred to RD, the LQ accumulator may be reset. This is brought about in the following manner: Referring to Fig. 22e, upon closure of cam contacts CC—3, a circuit is established from line 301, through the now shifted AK—1 contacts, through the XC—13 cam contacts, through the AK—30 and AT—11 contacts now closed, through the non-shifted AS—9 contacts, to and through the reset relay coil 321LQ. LQ then becomes reset and such reset initiates the dividing calculations which take place in succession in the manner previously explained for regular dividing.

In order that an intermediate product amount, obtained during computations on a succeeding card, may be pre-sensed, it is necessary to reset the N—R setup unit. Such reset is effected during the third XC cam cycle, or final divisor multiple build up cycle, by bringing about an energization of the 321N—R reset clutch magnet (see Figs. 1a and 22d). The energizing circuit is from line 301 through the closed AK—25 contacts, clutch magnet 321N—R, contacts AL—3 in the position shown, contacts AN—20 in shifted position, through cam contacts XC—16 to ground.

As in regular dividing LQ reset brings about energization of relay coil JJ (Fig. 22d) and the various dividing operations then ensue as previously described. Upon completion of the customary dividing cycles the ML and RD devices are reset. In addition, during such reset cycle provision is made to reset the SP accumulator.

Referring to Fig. 22e the reset initiating circuit for 321ML and the 321RD reset relays as previously explained for regular dividing includes lines 337 and 338. In order to reset SP concurrently with the reset of the ML and RD devices, a supplemental branch circuit is provided which is established for this special type of computation. Commencing with circuit 337, contacts AK—3 are in shifted position and a circuit is completed through the AT—10 contacts now closed, to and through the 321SP reset relay coil. Energization of 321SP brings about SP reset in the customary manner. The AK—3 contacts also have another function at this time, viz., to cut off the reset circuit to 321CY and 321MP.

Recording operations are brought about as in regular dividing and the relative shift on result recording will be controlled by the selective energization of the Z and AA relay coils. Such coils are selectively energized under the control of the V and W relay coils. For the computation under consideration, since coil V$h$ is energized, contacts V$h$—2 are closed and coil Z$h$ is energized. Also since coil W$t$ is energized, contacts W$t$—2 are closed and coil AA$t$ is energized. Having completed operations pertaining to one card provision is made to automatically shift the controls of the machine back to a status in which multiplication is effected on the following card in the run. This control for shifting back from a dividing to a multiplying status following dividing computations, includes means to de-energize the relay coil AK which was maintained energized throughout dividing. De-energization of coil AK (Fig. 22$h$) is brought about as follows: The stick circuit from AK extends back through the AK—26 contacts. Upon ML reset, contacts ML—24 open and at the time cam contacts CC—34 open, the stick circuit for AK will be broken to de-energize such relay. The associated contacts of AK then return to the position shown in the circuit diagram and the machine is ready for multiplying operations on the succeeding record.

Energization of card feed clutch for a new multiplying computation is under the control of relay coil E (Fig. 22$d$) and contacts E—2. Contacts E—2 are now closed and during ML reset the ML—22 contacts close to afford an energizing circuit for coil E, through the AK—23 contacts which are in the position shown. On such card feed clutch energization it will be understood that there is also an energization of the 312XC cam clutch magnet.

Special computation $$\frac{A}{B \times C}$$

Referring to Fig. 42, the machine is also adaptable for effecting computations of the general form $$\frac{A}{B \times C}$$

Generally the operation for this type of computation is as follows: The A amount is read from the record and is also pre-sensed. The pre-sensing control shifts the entry of the A amount into SP on the card reading cycle. The C amount is entered into MP and the B amount is entered into the ML devices. Multiplying operations then follow, the B×C part of the calculation being effected first. Ultimately the product of B×C becomes set up in LQ. There is thereupon a pre-sensing of this amount in LQ and controls are set up to afford a selected shift back of the product amount in LQ upon transfer into the ML devices. Also, after multiplication is completed the machine is adjusted for division calculations and the A amount in SP is transferred over into RD, this amount now becoming the dividend. Thereafter the usual build-up of divisor multiples and division operations occur and there is the final recording of the result on the record with a shift on final recording based conjointly on the pre-sensing of the A term from the record and the sensing of the computed product in LQ. Following the completion of operations pertaining to one card, the machine automatically shifts back to a multiplying condition and proceeds with the following computation on the next card.

Upon this type of computation, the plugboard slide of Fig. 30 is inserted in the machine and such plugboard established a plug connection between socket 364 (Fig. 22$h$) and socket 416, thereby maintaining relay coil AR energized throughout all computations of this type. Relay coil AR upon energization shifts all of its contacts to reverse position from that shown. Contacts AR—1 when closed, cause energization of relay coil AT, whose contacts then assume a reverse position from that shown in the diagram.

The insertible plug unit establishes entry pre-sensing circuits as in the previous example. The entry circuits for the B amount are like those for A in the previous example, those for C are like those for B and those for A are like the entry and pre-sensing circuits previously used for C.

With this type of computation, the pre-sensing and entry of the A amount are effected in exactly the same manner as for the pre-sensing entry and of the C amount in the previous problem. Entry of B and C occur in the same manner and over the same circuits as entry of A and B for the previous problem. In this previous problem the pre-sensing of the C amount brought about a selected energization of the TT relays, which in turn, selectively energized W relays, the W relays pertaining to a divisor shift. With the present problem it is desired that the selected energization of the TT relays energize not the W relays, but the V relays in a selected manner.

For the previous problem the energizing circuits for the W relays extended through the shifted AN—15—16 contacts (Fig. 22$c$). With the present problem these contacts are in the position shown and therefore there cannot be any energization of the W relay coils. On the other hand, the AR—6—9 contacts are in shifted relation, and with such contacts shifted there is a selected energization of the V relay coils under the control of the TT—2 contacts.

With the problem of Fig. 42, the pre-sensing control will have tripped the TT$g$—2 contacts (Fig. 22$c$). Accordingly, a circuit is established from ground through cam contacts XC—4, through contacts AN—19 and AK—34 in the position shown, through contacts TT$g$—2 in shifted position, through contacts TT$f$—2 in the position shown, through the shifted AR—7 contacts, to relay coil V$h$. Relay coil V$h$ will remain energized throughout all computing operations.

All operations occur as in the preceding problem to and including the RD to LQ transfer, the reset of the ML and MP devices and a shift to a dividing status. A change occurs in the controls which are set up upon pre-sensing LQR. These controls will now be explained. In the previous problem on sensing LQR, there was a selective energization of the N relays of Fig. 22$g$. With the present type of computation, the AN relay is not energized and accordingly the contacts AN—11—14 are in the position shown so that there is no energization of the N relays. The AR relay is energized and accordingly the AR—3—4 contacts are in shifted position. Accordingly, there will be a selected energization of the R magnets under the control of LQR. With the problem of Fig. 42, there will be no energization of either the R$t$ or the R$u$ coils. When the machine shifts to a dividing condition the XC cam contacts will be clutched up in the manner explained for the preceding problem. In the first XC cycle RD reset will be brought about in exactly the same manner as explained for the previous problem. However, in lieu of entering an amount from SPR into the ML receiving devices such amount is derived from the LQ accumulator for entry into the ML devices. In transferring such amount there is a shift of the ent into the ML devices under control of the T relay coils. Such T relay coils are selectively energized under the control of contacts which are tripped or untripped according to the energization or non-energization of the R coils.

Referring to Fig. 22d with the AR relay energized, contacts AR—11 are closed and upon closure of cam contacts XC—12 relay coil AG becomes energized. Now referring to Fig. 22c, since contacts AK—28 and AR—2 are in shifted position, when cam contacts XC—7 close a circuit will be established through such contacts, through the non-tripped Rt—1 contacts, to energize relay coil Tt. Relay coil K also becomes energized under control of cam contacts XC—1. Now referring to Fig. 22h, inasmuch as relay coil AG is now energized, the AG—7 contacts are closed and add emitter 414 is in circuit. Such emitter emits impulses through LQR, through the LQ—1—4 contacts in the position shown, via lines 409, through the AG—1—4 contacts now closed, via lines 417 and 418 (see also Figs. 22d, 22c, 22b and 22a), through the now shifted AG—5—6 contacts, through the closed Tt—2 group of contacts direct to the 313ML—1—2 accumulator magnets or through the closed K—1—8 contacts to the other ML devices.

Provision must be made to retain a control based on the pre-sensing of the computed product in LQ during dividing calculations in order to correctly effect shift back on final recording. Since coil Tt is energized, contacts Tt—1 are closed. Accordingly, when cam contacts XC—4 close, a circuit is completed to energize relay coil Wt through the non-shifted AN—19 contacts. Such relay will remain energized, to the end of the dividing operations.

In the succeeding or second and third XC cam cycles, multiple build-up occurs in the manner previously described. In the second cycle of the XC cam cycle, the amount standing in SP is transferred over to RD. Referring to Fig. 22d, relay contacts AS—12 are in closed position and upon closure of the XC—6 cam contacts, a circuit is completed through the AN—17 contacts in the position shown to energize relay coil WW. With coil WW energized, the WW—2 contacts (Fig. 22c) are in shifted position. Likewise contacts AT—9 are shifted so that a circuit is completed to the add emitter 410 from wire 347. This emitter emits impulses through SPR which flow out through the non-shifted SP—1—4 contacts, the now closed WW—3—6 contacts, the AN—3—6 and AJ—1—4 contacts both in the position shown, via lines 351, to the 313RD accumulator magnets. This will have transferred the amount of the A term from the SP accumulator into the RD accumulator. During this same cycle the N—R set-up unit is reset. Such reset is brought about by the energization of the 321N—R clutch magnet upon closure of cam contacts XC—5, the circuit to 321N—R extending through the non-shifted AL—3 and AN—20 contacts.

In the final XC cam cycle, LQ reset is initiated in the manner explained for the previous computation. LQ reset thereupon initiates the usual dividing cycles which follow one after another until the computation is complete. There is a final reset of the ML devices, a reset of the SP and RD receiving devices and also there is initiating of the recording of the result and a shift back to a multiplying status. All of the foregoing operations are exactly the same as described for the previous special computation.

Sequence of operations

Figures 31, 32, 33:
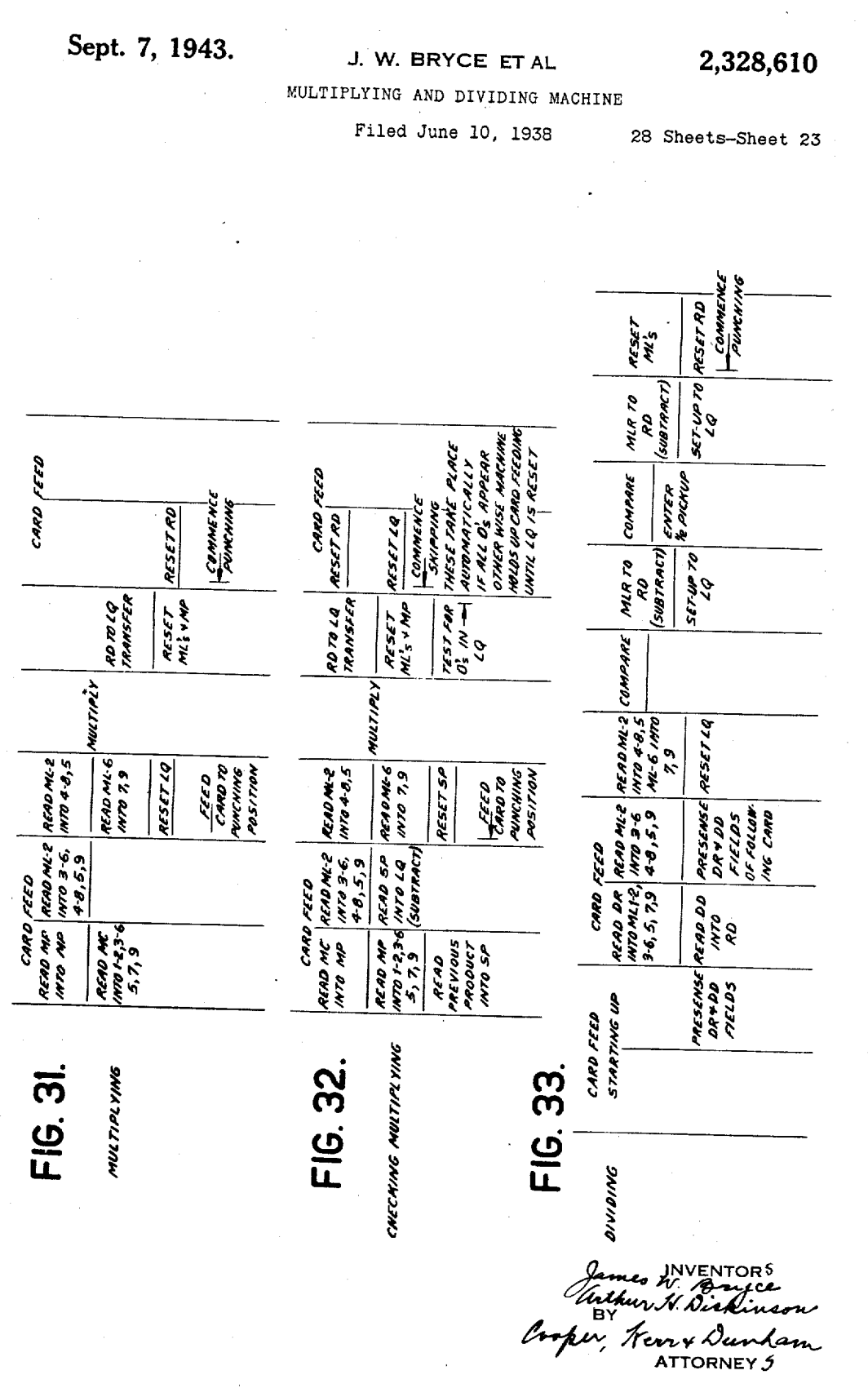

When the machine is adjusted for multiplying operations the sequence of machine cycles and the operations performed therein are shown diagrammatically in Fig. 31. During the card feed cycle which comprises two machine cycles, the amounts are read from the card and a build-up cycle takes place. In the third cycle build-up is completed and there is a reset of the LQ accumulator provided recording on the previous record is completed. If recording requires more than two machine cycles, LQ reset is delayed. Multiplying or computating machine cycles follow in which multiple amounts are selectively entered into the product accumulators under the control of the MP amount. Finally there is a gathering together cycle in which the amount in RD is transferred to LQ and during this same machine cycle there is a reset of the ML and MP devices. Card feed for the following record is then effected during which punching on the previous record takes place.

The diagram of Fig. 31 applies for detail card operations when the machine is adjusted for a rate multiplying condition except there is no MP reset. When a master card is handled in this type of run no computing or recording operations are effected. Accordingly when a master card appears in the run Fig. 31 is modified in that a machine cycle or cycles labeled "Multiply" are eliminated. In lieu of a "Commence punching" operation in a card feed cycle there is a "Commence skipping" operation for a master card.

Upon checking multiplying the sequence of machine operations is that shown in Fig. 32. It will be observed that many of the operations which take place during this type of run are similar to those which occur in regular multiplying. In check multiplying, however, any previously recorded product is entered from a card into the SP accumulator in the first machine cycle of a card feed cycle. Following this there is a transfer of the true complement of the product from SP into LQ. In lieu of initiating computing operations by a reset of LQ a reset of SP effects such computing initiation. In the reset and RD to LQ transfer cycle the LQ device is tested for an all zero condition. Such all zero status indicates a check condition and a following card feed cycle takes place automatically during which the checked card is escaped without recording through the punch. If a non-check condition is detected such card feed and skipping operations are held up until there is manual intervention.

In Fig. 33 the sequence of operations is shown when the machine is adjusted for a dividing operation. In first card feed cycle (occurs in starting up only) the dividend and divisor fields of each record are pre-sensed for the highest orders containing significant digits. During the first machine cycle of the next card feed cycle the divisor is entered into the ML devices and the dividend is entered into RD, both in shifted to the left relationship in accordance with the previous pre-sensing. In the two following cycles divisor multiple build-up is effected. In the first of these, or the second half of the card feed cycle the succeeding record is pre-sensed. Provided recording is completed on a previous record during the second of these cycles LQ reset occurs during the next machine cycle to initiate dividing operations. As has been previously explained, a significant quotient digit is obtained in two machine cycles. In the first of these comparison is effected between all nine divisor multiples and a selected comparison portion of the dividend. In the second of these a divisor multiple, selected in accordance with the comparison, is subtracted from the dividend and there is an entry of a related quotient digit in LQ. Such comparing, deducting and quotient digit entering cycles follow until computing operations are terminated by the place limiting devices. It may be mentioned that if a non-comparison condition exists this is indicative that the quotient digit is zero and the machine automatically eliminates the deducting cycle which normally follows and immediately follows with another comparing cycle. It will be observed that if the rounding off device is utilized the entry of a 5 takes place during a second comparison cycle provided such occurs. Upon termination of computing operations, there is a machine cycle in which reset of the ML and RD devices and initiation of punching occur following which card feed of the succeeding record takes place.

When the machine is adjusted for rate dividing operations the sequence of operations shown in Fig. 33 applies to detail cards except there is no divisor entry and build-up. When a master card appears in a run the operations shown in Fig. 33 are somewhat modified. The cycles in which divisor multiple build-up is effected take place for such master cards only. Inasmuch as computing cycles do not take place for master cards comparing and divisor multiple deducting and quotient digit entering cycles are also eliminated. Reset of the ML devices occurs only when the machine is apprised that a new master card is about to be analyzed.

Figure 34:
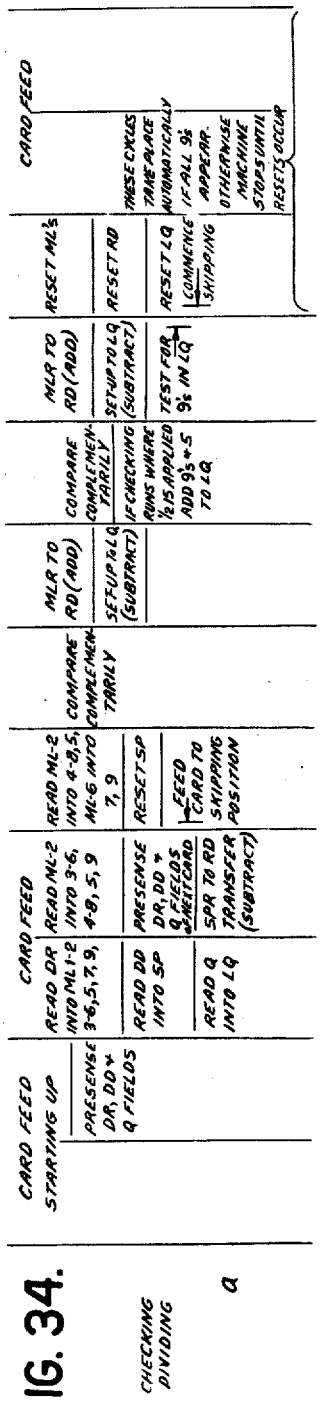

When the machine is set for checking dividing operations Fig. 34 shows the sequence of machine cycles. In addition to pre-sensing the dividend and divisor fields the previously recorded quotient field is also pre-sensed so that in the entry cycle of a card feed cycle such quotient amount may be entered clear to the left in LQ. In lieu of entering the dividend amount into RD it is entered into SP. Divisor multiple build-up cycles are effected just as in Fig. 33. In the second half of a card feed cycle, however, there is a transfer of the nines complement of the dividend amount from SP to RD. Instead of initiating checking dividing computations by a reset of LQ such computing is now initiated by a reset of the SP device. As explained in detail previously, in the computing operations the nines complements of the divisor multiples are compared with the nines complement of the dividend comparison portion. In lieu of deducting a selected divisor multiple, in checking dividing such selected divisor multiple is added to the nines complement of the dividend. Also the nines complement of the related quotient digit is entered into LQ. Complementary comparison and multiple adding and complementary quotient digit entering cycles follow until the place limiting devices terminate computing operations. In the final multiple adding cycle the LQ device is tested for an all nine condition. If such condition exists it is an indication of a check condition and machine automatically follows with a cycle in which the ML, RD, and LQ devices are reset and the checked card is skipped through the punch. Thereafter card feed of a following record takes place. If however an all nine status is not detected indicating a non-check condition the aforementioned reset and card feed cycles are held up until there is a manual intervention.

When the machine is adjusted to perform the special computation $$\frac{A \times B}{C}$$

the sequence of operations is that shown in Fig. 35. It will be noted that during the first series of machine cycles the machine performs the multiplying portion of the computation. It then shifts to a dividing status and effects build-up of divisor multiples, in this instance for the amount C, and thereafter performs the dividing portion of the problem. Dividing computations are terminated by the place limiting devices and upon termination there is a cycle in which the ML, RD, and SP devices are reset, recording of the result is initiated, and the machine is returned to a multiplying status. It should be mentioned that in the second half of a card feed cycle the C field of the record is pre-sensed to determine the highest order containing a significant digit so that in the feed cycle in which the C term is entered into SP it may be so entered in shifted to the left relationship. In the transfer and reset cycle following the multiplying portion of the problem the LQ device is pre-sensed to determine the highest order of the intermediate product amount which contains a significant digit. Also in this same machine cycle the machine is adjusted to a dividing status. In the first of the three cycles which then follow there is a reset of RD and a transfer of the C amount from SP to the ML devices. In the second and third of these cycles multiple build-up takes place and in the second the intermediate product amount is transferred to RD from LQ. In the third of these the LQ device is reset to initiate dividing computations.

Figure 36:
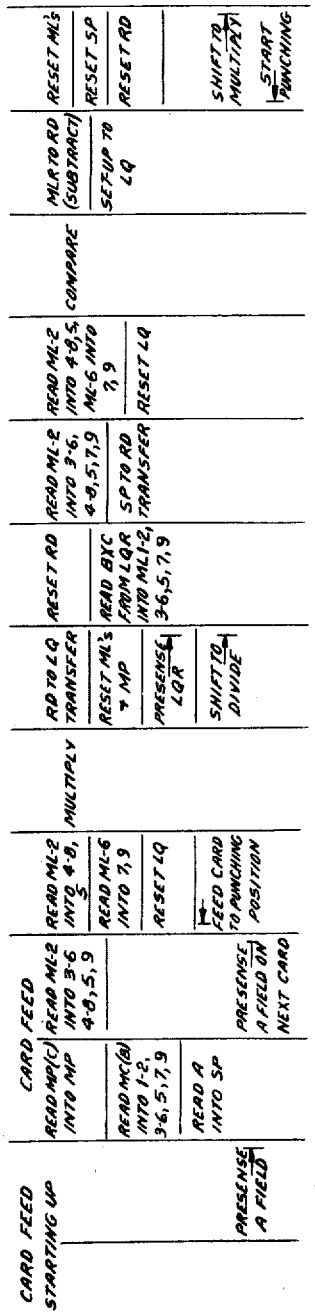
Figure 37:
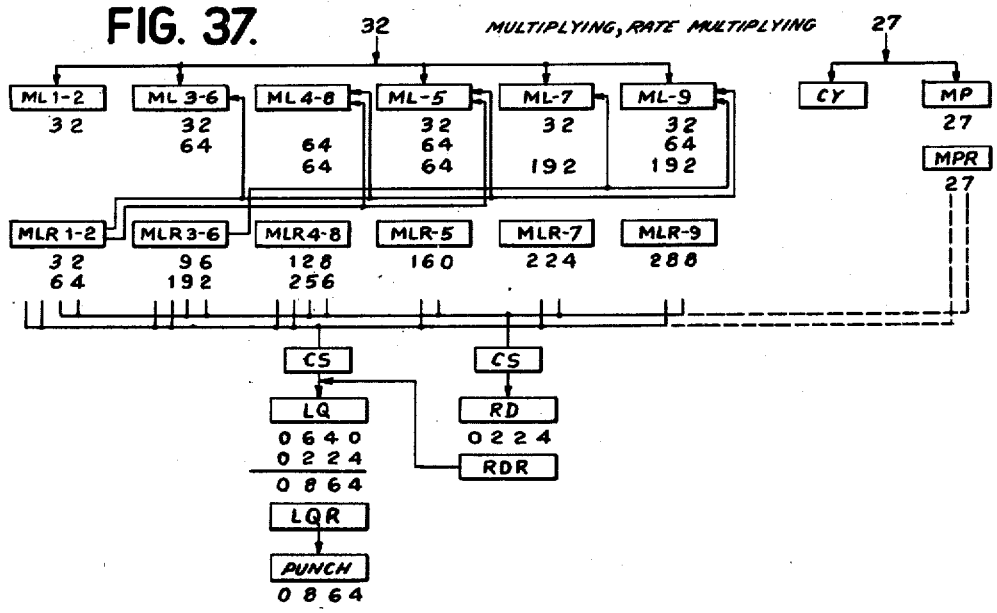
Figure 38:
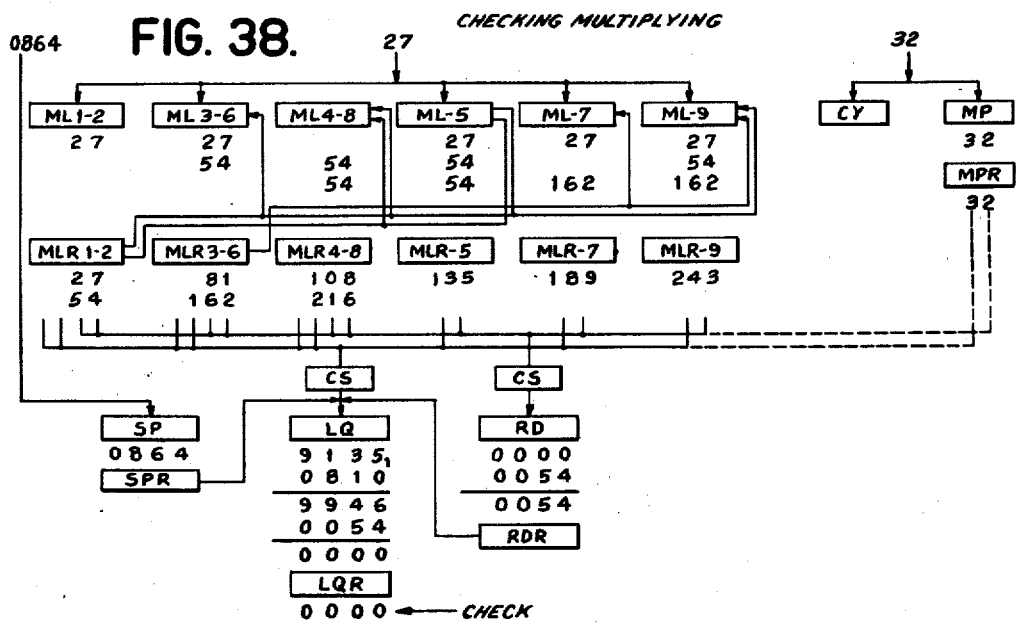

Fig. 36 shows diagrammatically the sequence of operations when the machine is set to perform the special computation $$\frac{A}{B \times C}$$

As in the case with the previous special computation the multiplying portion of the problem is performed first. Thereupon the machine shifts to a dividing status and effects multiple build-up. Following this the dividing portion of the problem is performed. In the second half of a card feed cycle there is a pre-sensing of the A term field of the record to determine the highest order in which a significant digit occurs so that upon entry of the A term into SP in a following card feed cycle such entry is effected with a shift to the left relationship. During the first of the three machine cycles which follow the machine cycle in which the machine adjusted for a dividing status the RD device is reset and there is a transfer of the intermediate product amount from LQ to the ML devices. In the two following machine cycles multiple build-up is effected. In the first of these two cycles there is a transfer of the A term from SP to RD and in the third of these the LQ device is reset to initiate dividing computations.

Certain features of the present invention relating to division forms the subject matter of our divisional copending application, Serial No. 284,188, filed July 18, 1939.

What we claim is:

1. In a multiplying machine, a multiplying control means for multiplication comprising multiplier digit readout means, means for entering therein multiplier digits including significant digits and possible zeros in one or more orders of said readout means, a switch invariably operable step by step concomitant with successive machine cycles for causing the successive readout of said multiplier digits in said readout means, means for causing upon the presence of zeros in the multiplier and by a single stepping movement of said switch a readout of a non-adjacent order of said readout means, and record controlled means for controlling the operation of said last named means selectively according to the presence or absence of zeros in the multiplier.

2. A cycle controller for a multiplying machine for in succession, establishing circuits to different orders of a multiplier readout and for causing operations only for significant digit containing orders, said cycle controller comprising in combination a stepping switch which invariably steps from contact to contact once for each machine cycle, changeable circuit routing means intermediate the contacts of the stepping switch and the orders of the multiplier readout for changing the connection relations between the switch contacts with respect to the orders of the readout whereby upon a single step of advance of the switch circuits may be established successively in non-adjacent orders through the readout, and record controlled means for controlling the said circuit routing means selectively according to the presence or absence of zeros on a record.

3. A calculating machine for performing multiplication and division, comprising factor receiving means to receive a divisor or a multiplicand factor, settable source means for different amounts representing the divisor or multiplicand and multiples thereof, means to set all said settable source means so that different complete multiples based upon a received divisor or multiplicand can be concurrently derived therefrom, said setting means including the aforesaid factor receiving means, means to receive dividend and multiplier factors, entry receiving means, dividing mechanism including comparing means coacting with the second-named factor receiving means according to a dividend factor and with the settable source means to select one of the concurrently available multiples and entry effecting means for entering a quotient, determined as to amount by the comparing means according to the selected multiple, into the entry receiving means, alternative entry effecting means coacting with the second-named factor receiving means according to a multiplier factor to enter multiplier-selected multiples of a multiplicand from the source means into the entry receiving means to form a product result therein of the multiplication of the multiplicand and multiplier factors, selectively conditionable means to initiate division or multiplication, and means controlled by the conditionable means when conditioned to initiate division for rendering the first-named entry effecting means effective and when conditioned to initiate multiplication for rendering the alternative entry effecting means effective.

4. A calculating machine including calculating devices including multiplying devices and dividing devices; said multiplying devices performing a first step of a calculation which involves a multiplication of two terms and said dividing devices performing a second step of a calculation involving division wherein a third term and the product obtained by said multiplying devices are terms of the division calculation, said calculating devices including; entry receiving means for all three terms, multiple settable source means for all digital multiples of one term, means controlled by the receiving means receiving one term for building up and rendering concurrently available upon said source means all digital multiples of said one term, and intermediate result receiving means and final result receiving means which receive digital multiples under the control of the multiple source means and under the selective control of the entry receiving means for a second term, means to bring the calculating devices for the first step of the calculation into operation to finally set up the product result in the final result receiving means as a computed term to enter into the division calculation with the third term, means to clear the intermediate result receiving means and the multiple receiving and settable source means, means to transfer one of the latter two terms from the receiving means in which such term stands to the intermediate result receiving means and the other of the latter two terms to the multiple receiving and source means, means to cause multiples of the said other term to be built up and rendered available upon the source means, and means to bring the calculating devices for the second step of the calculation into operation, with said dividing devices comprised in the calculating devices acting during the second step of the calculation and including means to effect comparison of each of the latter multiples of said other term, serving as a divisor, with a comparison portion and one or more successive remainder comparison portions of the term now serving as a dividend in the intermediate result receiving means so as to select multiples and corresponding quotients and means to subtractively enter the selected multiples in the latter receiving means after each comparison operation to obtain the next remainder comparison portion and means to set up the final quotient result in the final result receiving means.

5. A calculating machine including calculating devices including multiplying devices and dividing devices; said multiplying devices performing a first step of a calculation which involves a multiplication of two terms and said dividing devices performing a second step of a calculation involving division wherein a third term and the product obtained by said multiplying devices are terms of the division calculation, said calculating devices including; entry receiving means for all three terms, multiple settable source means for all digital multiples of one term, means controlled by the receiving means receiving one term for building up and rendering concurrently available upon said source means all digital multiples of said one term, and intermediate result receiving means and final result receiving means which receive digital multiples under the control of the multiple source means and under the selective control of the entry receiving means for a second term, means to bring the calculating devices for the first step of the calculation into operation to finally set up the product result in the final result receiving means, means to clear the intermediate result receiving means and the multiple receiving and settable source means, means to transfer the computed product term and the third term from the receiving means in which such amounts stand to the intermediate result receiving means and to the multiple receiving and source means respectively, means to cause multiples of the third term to be built up and rendered available upon the source means, and means to bring the calculating devices for the second step of the calculation into operation to set up the final quotient result in the final result receiving means, said dividing devices being active during said second step of calculation and including means to effect comparisons of the latter multiples with a comparison portion and one or more successive remainder comparison portions of the computed product term transferred to the intermediate result receiving means, and now serving as a dividend, so as to select multiples and related quotients, and including means to subtractively enter the multiple, selected by each comparison operation, in the intermediate result receiving means to obtain the next remainder portion for the next comparison operation.

6. A calculating machine comprising calculating mechanism for performing multiplication and division, said mechanism including as common means therefor factor multiple providing devices, including a plurality of settable source means from which each of all of the different complete digital multiples of a factor may be concurrently derived, said factor being the multiplicand upon multiplying computations and the divisor upon division calculations, said mechanism also including receiving means for the multiplier and for the dividend which constitute the other factor in either calculation, result receiving means for products and for quotients, said calculating mechanism also including comparing mechanism which is utilized for dividing calculations, factor determining means for determining pre-represented multiplicand and multiplier factors or dividend and divisor factors, of which the multiplier or dividend factor is entered into the said receiving means therefor and of which the multiplicand or divisor factor is entered into certain of the multiple providing devices, means to transmit and route entries from all of the settable source means to the comparing mechanism upon dividing calculations and means also effective on dividing calculations controlled by the comparing means to transmit and route entries from a selected settable source means to the dividend receiving means, means under the control of the receiving means for the multiplier factor to selectively transmit and route entries from the settable source means to the product receiving means upon multiplying calculations, and shiftable connecting devices conditioned during division calculations to enable the first mentioned transmitting and routing means to be effective to route entries to the comparing means and dividend receiving means from the settable source means and to suppress entries to the products receiving means and conditioned during multiplying operations to suppress entries pertaining to division calculations and to enable the product entry transmitting and routing means to be effective to transmit and route selected product entries and common control means for determining the status of the aforesaid shiftable connecting devices.

7. A calculating machine comprising calculating mechanism for performing multiplication and division, said mechanism including as common means therefor factor multiple providing devices, including a plurality of settable source means from which each of all of the different complete digital multiples of a factor may be concurrently derived, said factor being the multiplicand upon multiplying computations and the divisor upon division calculations, said mechanism also including receiving means for the multiplier and for the dividend which constitute the other factor in either calculation, result receiving means for products and for quotients, said calculating mechanism also including comparing mechanism which is utilized for dividing calculations, factor determining means for determining pre-represented multiplicand and multiplier factors or dividend and divisor factors, of which the multiplier factor or dividend factor, whichever is represented, is entered into said receiving means therefor and of which the multiplicand or divisor factor, whichever is represented is entered into factor, whichever of the multiple providing devices, shiftable connecting devices for selectively connecting the settable source means of the common means to the comparing mechanism for dividing calculations and for disconnecting them from the result receiving means utilized for multiplication or for connecting them to the result receiving means for multiplication and disconnecting them from the comparing mechanism, and means operative upon multiplying calculations for further selectively controlling said shiftable connecting devices by the receiving means for the multiplier factor, control means for the shiftable connecting devices, said control means including a single operation determining relay which, when energized, brings about one type of calculation and which, when de-energized, brings about the other type of calculation and changeable circuit control means for controlling the energization and de-energization of said relay.

8. A calculating machine comprising calculating mechanism for performing multiplication and division, said mechanism including as common means therefor factor multiple providing devices, including a plurality of settable source means from which each of all of the different complete digital multiples of a factor may be concurrently derived, said factor being the multiplicand upon multiplying computations and the divisor upon division calculations, said mechanism also including receiving means for the multiplier and for the dividend which constitute the other factor in either calculation, result receiving means for products and for quotients, said calculating mechanism also including comparing mechanism which is utilized for dividing calculations, factor determining means for determining three pre-represented factors, one of which is entered into the receiving means for the other factor and another of which is entered into certain of the multiple providing devices, shiftable connecting devices for selectively connecting the settable source means of the common means to the comparing mechanism for dividing calculations and for disconnecting them from the result receiving means utilized for multiplication or for connecting them to the result receiving means for multiplication and disconnecting them from the comparing mechanism, and means operative upon multiplying calculations for further selectively controlling said shiftable connecting devices by the receiving means for the multiplier factor, control means for the shiftable connecting devices, said control means including a single operation determining relay which, when energized, brings about one type of calculation and which, when de-energized, brings about the other type of calculation and changeable circuit control means for controlling energization or de-energization of said relay, the aforesaid circuit control means including an automatically controlled relay brought into operation when the calculating mechanism completes one type of calculation and the result amount thereof is in the result receiving means and automatic means also brought into operation upon completion of the latter calculation for entering the third pre-represented factor and the result amount, one in the said receiving means for the other factor and the other in the multiple providing devices, to serve as the terms of the other type of calculation, and means under control of said relay, when brought into operation, for initiating said other type of calculation to form a new calculated result amount in the result receiving means.

9. A calculating machine for performing multiplication and division, comprising settable source means for an amount and multiples thereof, means to set said source means to render available a divisor amount and digital multiples thereof or a multiplicand amount and digital multiples thereof, means to receive dividend and multiplier terms, entry receiving means, product entry transmitting means effective during multiplication to transfer selected multiples of a multiplicand from the source means to the entry receiving means, and means controlled by the multiplier receiving means to select such multiples, comparing means effective during division to compare the multiples of a divisor set up in the source means with a comparison portion of a dividend in its receiving means, means effective during division to control the comparing means by the source means according to the multiples of the divisor set up in the source means, common calculation initiating means for both division and multiplication calculations, means conditionable selectively to cause division of multiplication calculations to be performed, means controlled conjointly by the common initiating means and by the conditionable means when conditioned for multiplication calculation to cause operation of said product entry transmitting means, and means alternatively controlled conjointly by the common initiating means and by the conditionable means when conditioned for division calculation to cause operation of the comparing means under control of the multiples source means and the dividend receiving means.

10. A calculating machine which includes dividing mechanism and multiplying mechanism, both of said mechanisms comprising common settable source means for all of the different digital multiples of the divisor or multiplicand, common calculation initiating means for both division and multiplication calculations, means conditionable selectively to cause dividing or multiplying calculations to be performed, means controlled conjointly by the initiating means and by the conditionable means when conditioned for multiplying calculations to effect operation of the multiplying means under control of said settable source means which afford different digital multiples of a multiplicand and which are selected in accordance with multiplier digits, and means alternatively controlled conjointly by the common initiating means and the conditionable means when conditioned for dividing calculations to effect operation of the dividing mechanism in accordance with a dividend and under further control of the same settable source means which afford different digital multiples of the divisor.

11. A calculating machine according to claim 10, having dividing calculation terminating means and multiplication calculation terminating means brought into operation respectively by the first and second mentioned controlled means and each terminating means including a common calculation termination control device effective after one or more steps of either a dividing calculation or a multiplication calculation have been performed.

12. A cyclically operating calculating machine in which result recording means is provided to record the result of a calculation, said calculating machine having dividing mechanism and multiplying mechanism for performing dividing and multiplying calculations in successive cycles for each calculation, each mechanism having in common, settable source means for all the digital multiples of a divisor or multiplicand, means for setting the machine to perform either division or multiplication, sequence control means effective when the machine is set for division to cause successive cycles of dividing calculations to be performed in accordance with dividend portions and under further control of the settable source means according to multiples of a divisor, sequence control means effective when the machine is set for multiplication to cause successive cycles of multiplication to be performed under control of the same settable source means according to multiplicand multiples selected in accordance with multiplier digits, calculation terminating means including a common calculation terminating device operated by either of said sequence control means after one or more cycles of either multiplication or division has been effected, and means brought into operation by the calculation terminating means upon operation of the common terminating device thereof for initiating operation of the result recording means.

13. A calculating machine in which result recording means are provided to record the result of a calculation in columns of a sheet, said machine having dividing mechanism and multiplying mechanism, common result receiving means, means for effecting operation of the dividing mechanism to obtain a quotient result and enter the quotient result in the result receiving means, means for effecting operation of the multiplying mechanism to obtain a product and enter the product into the result receiving means, means settable when the machine is performing division, in accordance with the denominational magnitude of the dividend and divisor, common selecting devices for selecting the columns of the sheet in which the result is to be recorded, means for operating said devices in one way upon terminating of multiplication calculation to select the columns in which the product is to be recorded and means under control of the said settable means for variably controlling operation of said devices to variably select the columns in which the quotient is to be recorded, and means controlled by the common result receiving means for operating the recording means to record the result in the selected columns.

14. A cyclically operable accounting machine in which record handling means are provided to feed a record to and through recording means, said machine having dividing mechanism and multiplying mechanism, common result receiving means to receive a product result formed by the multiplying mechanism or a division calculation result formed by the dividing mechanism, reset means for the result receiving means, calculation initiating means, means automatically brought into operation by said record handling means and upon the record arriving at a predetermined position with respect to the recording means for controlling said reset means and causing the calculation initiating means to be effective upon resetting of the result receiving means, calculation selecting means for determining which calculating mechanism, the dividing or multiplying mechanism is to be thus initiated and operated by the initiating means, and means controlled by the result receiving means for causing the recording means to record the calculation result of the selected calculation upon said record.

15. An accounting machine having multiplying mechanism to multiply two terms to obtain their product and dividing mechanism to divide the product into a third term, receiving means for the three terms, a common result receiving means, calculation selecting means pre-conditioned to cause operation of the multiplying mechanism to form product entries and to transmit these entries to the result receiving means with such entries being determined as to amount by the receiving means for the first two mentioned terms, means to manifest completion of the multiplication, means controlled thereby for clearing the receiving means of the multiplicand term involved in the multiplication, means also controlled thereby for automatically transferring the product from the result receiving means to the cleared receiving means and for resetting the result receiving means, means also controlled by said manifesting means for automatically reconditioning said calculation selecting means to select a dividing phase of the machine, and means automatically brought into operation under control of the reconditioned calculation selecting means and upon resetting of the result receiving means for causing operation of the dividing mechanism to form quotient entries determined as to amount by the receiving means containing the product and by the receiving means for the third term and for transmitting the quotient entries to the result receiving means, whereby the final result of the product of the first two terms divided into the third term is obtained by an automatic sequence of operations without intervening manipulative operations.

16. A calculating machine including calculating devices including multiplying devices and dividing devices; said multiplying devices performing a first step of a calculation which involves a multiplication of two terms and said dividing devices performing a second step of a calculation involving division wherein a third term and the product obtained by said multiplying devices are terms of the division calculation, said calculating devices including; entry receiving means for all three terms, multiple settable source means for all digital multiples of one term, means controlled by the receiving means receiving one term for building up and rendering concurrently available upon said source means all digital multiples of said one term, and intermediate result receiving means and final result receiving means which receive digital multiples under the control of the multiple source means and under the selective control of the entry receiving means for a second term, means to bring the calculating devices for the first step of the calculation into operation to finally set up the product result in the final result receiving means, means to clear the intermediate result receiving means and the multiple receiving and settable source means, means to transfer the computed product and the third term from the receiving means in which such amounts stand to the intermediate result receiving means and to the multiple receiving and source means, means to cause multiples of the third term to be built up and rendered available upon the source means, and means to bring the calculating devices for the second step of the calculation into operation to set up the final result in the final result receiving means, the calculating machine being provided with record controlled means to control the entry of the three terms into the receiving means therefor and including in combination therewith means to pre-sense each record to ascertain the denominational magnitude of the third term thereon, column shift means controlled by said pre-sensing means to variably direct the entry of said third term into the receiving means for such term, supplemental control means under the control of the aforesaid column shift means for retaining a control set up, means to determine the denominational magnitude of the result in the first step result receiving means when such result is obtained therein, column shift means controlled by the last mentioned determining means to control the variable denominational relation of the transferred entry into the receiving means for such entry, other supplemental control means which retain a control set up related to the second named column shift means under control of such column shift means, recording means controlled by the final result receiving means for recording the final result, and column shift means intermediate the recording means and the final result receiving means under the conjoint control of both of the foregoing supplemental control means for controlling shift back upon final recording.

17. A record controlled accounting machine with record handling means for passing a succession of separate records one by one through the machine, each separate record bearing representations of the amounts of three different factors, record sensing means for concurrently sensing each record for its three sets of factor representations, three receiving means each controlled by related sensing means and all operative in a single entry cycle to manifest the amounts of all three different factors, multiplying mechanism controlled by two of said receiving means according to amounts manifested therein for multiplying the factor amounts manifested therein, product result receiving means for receiving the products afforded by the multiplying mechanism, dividing mechanism controlled by the receiving means for the third factor according to the amount manifested therein and by the product receiving means according to the product obtained by the multiplying mechanism for effecting a dividing calculation, and quotient receiving means for receiving the final result of the combined multiplying and dividing calculation pertaining to three factors all derived from a common record, and automatic sequence control means to first cause entry of the three factors into their respective receiving means and to thereafter control the sequence of operation of the multiplying mechanism and the dividing mechanism.

18. A calculating machine having receiving means for multiplicand, multiplier and dividend terms and for computed result amounts, dividing mechanism and multiplying mechanism including common settable source means comprising electrical value readout devices, settable to concurrently render available all the different digital multiples of a multiplicand or a divisor in the receiving means therefor, said multiplying mechanism further including column shift control switch means and product entry circuits, including contacts closed under control of the column shift control switch means, further including contacts closed under control of the multiplier receiving means according to multiplier digits therein, and further including the electrical readout devices selected by and electrically connected to the contacts closed under control of the multiplier receiving means, to cause entry of product amounts in the result receiving means, said dividing mechanism further including division calculation sequence control switch means, comparing means for comparing multiples of a divisor in said source means with comparison portions of a dividend in a dividend receiving means to select quotient amounts and quotient entry circuits including contacts closed under control of the comparing means in accordance with the selected quotient amounts and contacts closed under control of the said sequence control means for entering the quotient amounts in the result receiving means, and a calculation selecting master control to select either the dividing or multiplying mechanism for operation and to cause the one or the other of said control switch means to be operative depending upon which type of calculation has been selected to be performed.

19. A cyclically operable accounting machine having multiplying mechanism to multiply two terms to obtain their product and dividing mechanism to divide the product by a third term, receiving means for the three terms, a common result receiving means, calculation selecting means initially conditioned to cause operation of the multiplying mechanism to form product entries and transmit these entries to the result receiving means with such entries being determined as to amount by the receiving means for the first two terms, means to manifest completion of the multiplication, means controlled thereby for clearing the receiving means of the multiplicand term involved in the multiplication, means also controlled thereby for automatically reconditioning said calculation selecting means to select a dividing phase of the machine, means controlled by the reconditioned calculation selecting means for automatically transferring the third term from the receiving means therefor to the now-cleared receiving means, dividend receiving means, means also controlled by the reconditioned calculation selecting means for automatically transferring the product from the result receiving means to the dividend receiving means and for resetting the result receiving means, and means automatically brought into operation under control of the reconditioned calculation selecting means and upon resetting of the result receiving means for causing operation of the dividing mechanism to form quotient entries determined as to amount by the dividend receiving means, containing said product, and by the receiving means, to which the third term has been transferred, and for transmitting the quotient entries to the result receiving means, whereby the final result of the product of the first two terms divided by the third term is obtained by an automatic sequence of operations without intervening manipulative operations.

JAMES W. BRYCE.
ARTHUR H. DICKINSON.